(12) United States Patent
Yukawa et al.

(10) Patent No.: US 7,929,287 B2
(45) Date of Patent: Apr. 19, 2011

(54) ELECTRONIC APPARATUS

(75) Inventors: Syuhei Yukawa, Tokyo (JP); Daisuke Kurosaki, Tokyo (JP); Fukukyo Sudo, Kanagawa (JP); Tooru Kuronuma, Kanagawa (JP); Akihito Shinohara, Kanagawa (JP)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 12/139,739

(22) Filed: Jun. 16, 2008

(65) Prior Publication Data

US 2009/0009944 A1 Jan. 8, 2009

(30) Foreign Application Priority Data

Jul. 5, 2007 (JP) ................................ 2007-176929
Aug. 24, 2007 (JP) ................................ 2007-218930

(51) Int. Cl.
*G06F 1/16* (2006.01)
*H05K 5/00* (2006.01)
*H05K 7/00* (2006.01)
(52) U.S. Cl. ...................... 361/679.23; 313/582; 349/58
(58) Field of Classification Search ........ 361/679.21–679.23, 679.26; 313/582; 349/58–60; 200/296, 311
See application file for complete search history.

(56) References Cited

U.S. PATENT DOCUMENTS

| | | | | |
|---|---|---|---|---|
| 5,216,411 A * | 6/1993 | Ashitomi et al. | ............. | 345/168 |
| 5,450,221 A * | 9/1995 | Owen et al. | ..................... | 349/58 |
| 5,455,743 A * | 10/1995 | Miyajima | ..................... | 361/781 |
| 5,583,742 A * | 12/1996 | Noda et al. | ............... | 361/679.21 |
| 5,999,233 A * | 12/1999 | Park | .............................. | 348/836 |
| 6,151,084 A * | 11/2000 | Goto et al. | ..................... | 348/835 |
| 6,529,145 B1 * | 3/2003 | Lin | ................... | 341/22 |
| 6,791,825 B1 * | 9/2004 | Taylor | ........................ | 361/679.6 |
| 6,894,739 B2 * | 5/2005 | Sung et al. | ...................... | 349/58 |
| 6,956,628 B2 * | 10/2005 | Huang | ................................ | 349/58 |
| 7,457,109 B2 * | 11/2008 | Goto et al. | .............. | 361/679.55 |
| 7,495,895 B2 * | 2/2009 | Carnevali | ................ | 361/679.26 |
| 7,499,113 B2 * | 3/2009 | Yokawa | ........................ | 348/836 |
| 7,570,318 B2 * | 8/2009 | Li | ................................... | 349/58 |
| 7,576,975 B2 * | 8/2009 | Tai et al. | .................. | 361/679.21 |
| 2003/0184958 A1 * | 10/2003 | Kao | ............................... | 361/683 |
| 2004/0257490 A1 * | 12/2004 | Ho | ................................... | 349/58 |
| 2005/0140662 A1 * | 6/2005 | Jayanetti et al. | .............. | 345/174 |
| 2005/0206794 A1 * | 9/2005 | Tokuda | ......................... | 348/836 |

(Continued)

FOREIGN PATENT DOCUMENTS

JP 2002-163060 6/2002

(Continued)

OTHER PUBLICATIONS

U.S. Appl. No. 12/166,514, filed Jul. 2, 2008, Yukawa, et al.

(Continued)

*Primary Examiner* — Jayprakash N Gandhi
*Assistant Examiner* — Adrian S Wilson
(74) *Attorney, Agent, or Firm* — Oblon, Spivak, McClelland, Maier & Neustadt, L.L.P.

(57) ABSTRACT

An electronic apparatus includes a display unit, a driving circuit, and a base chassis. The driving circuit is configured to drive the display unit. The base chassis is made of a transparent material and includes a first region that extends outward from at least one end on a circumference of the display unit, the first region provided with an operation button used for operating the driving circuit.

11 Claims, 52 Drawing Sheets

U.S. PATENT DOCUMENTS

| | | | |
|---|---|---|---|
| 2006/0098403 A1* | 5/2006 | Smith | 361/683 |
| 2006/0139271 A1* | 6/2006 | Okuda | 345/88 |
| 2006/0238446 A1* | 10/2006 | Takahashi et al. | 345/55 |
| 2007/0047187 A1* | 3/2007 | Kumano et al. | 361/681 |
| 2007/0247800 A1* | 10/2007 | Smith et al. | 361/683 |
| 2008/0007670 A1* | 1/2008 | Zhang | 349/58 |
| 2008/0307840 A1* | 12/2008 | Yu et al. | 70/393 |

FOREIGN PATENT DOCUMENTS

JP    2004-72239    3/2004

OTHER PUBLICATIONS

U.S. Appl. No. 12/139,739, filed Jun. 16, 2008, Yukawa, et al.

* cited by examiner

Disk-Uninserted Status

Lit in white

Disk-Inserted Status

Lit in blue

Button-Pressed Status

*10:58 AM Thu Feb 21*
FIG.41
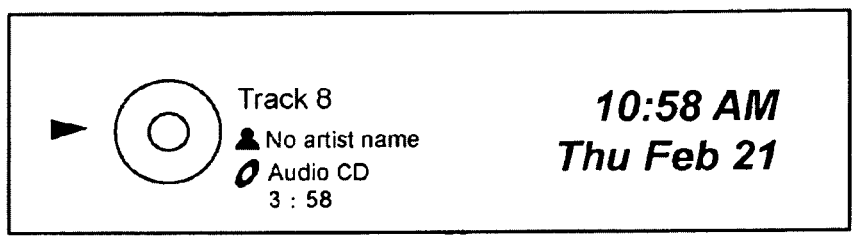
FIG.42
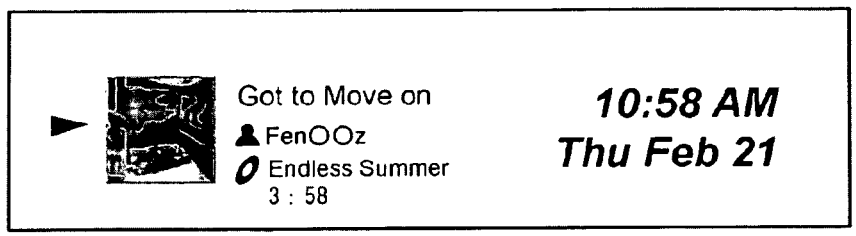
FIG.43
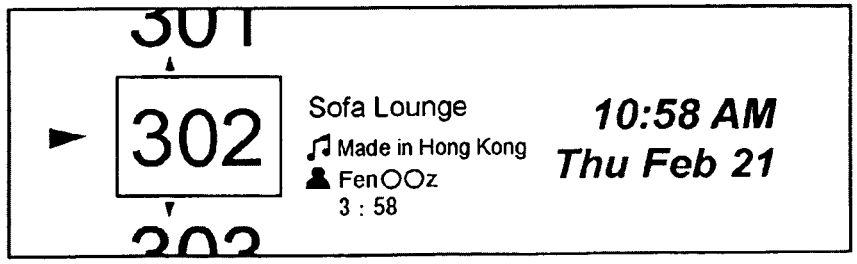
FIG.44

ELECTRONIC APPARATUS

CROSS REFERENCES TO RELATED APPLICATIONS

The present invention contains subject matter related to Japanese Patent Application JP 2007-176929 filed in the Japanese Patent Office on Jul. 5, 2007 and Japanese Patent Application JP 2007-218930 filed in the Japanese Patent Office on Aug. 24, 2007, the entire contents of which being incorporated herein by reference.

BACKGROUND OF THE INVENTION

1. Field of the Invention

The present invention relates to an electronic apparatus such as a personal computer, a television, and a PDA (Personal Digital Assistant).

2. Description of the Related Art

Televisions of related art have a display panel and an apparatus main body integrated therein, whereas recent personal computers as products have an apparatus main body mounted on a back surface of a display panel as a result of emphasizing convenience and design as household appliances.

In such electronic apparatuses, design is additionally improved by providing a panel section formed of a transparent material on a front side of the display panel (see, for example, Japanese Patent Application Laid-open No. 2004-72239) (hereinafter, referred to as Patent Document 1).

In the electronic apparatus disclosed in Patent Document 1, a display unit including a display panel is disposed inside a bracket as a rectangular frame, and a transparent front panel that covers the display unit from the front is mounted on a front surface of the bracket. An outline of the front panel is formed to be larger than that of the display panel, and an outer circumferential section of the front panel lies on an outer circumference side of the display panel.

Incidentally, recent personal computers have a music reproducing function and the like that are generally operated on a screen, but there are also apparatuses that are structured to be operated through a music reproduction operation inputting section provided on a keyboard so that convenience is enhanced as household appliances (see, for example, Japanese Patent Application Laid-open No. 2002-163060 (paragraph (0011), FIG. 2)).

SUMMARY OF THE INVENTION

Operations using the music reproduction operation inputting section provided on the keyboard, however, provide less intuitiveness in operation, and because the music reproduction operation inputting section provided on the keyboard is undistinguishable from other keys within the keyboard, the operations thereof are in most cases carried out on a screen using a mouse or the like. Moreover, simple design of the keyboard is impaired when providing the music reproduction operation inputting section on the keyboard.

In view of the above-mentioned circumstances, there is a need for an electronic apparatus capable of enhancing intuitiveness in operating operation buttons for music reproduction and the like, and improving design.

According to an embodiment of the present invention, there is provided an electronic apparatus including a display unit, a driving circuit, and a base chassis. The driving circuit is configured to drive the display unit. The base chassis is made of a transparent material and includes a first region that extends outward from at least one end on a circumference of the display unit, the first region provided with an operation button used for operating the driving circuit.

According to the embodiment of the present invention, the operation button is arranged on the base chassis made of a transparent material, and operations including music reproduction are controlled by the driving circuit in accordance with an input to the operation button. Accordingly, it is possible to carry out operations including music reproduction using the operation button provided on the base chassis adjacent to the display unit, thus improving intuitiveness in operation.

Further, in the electronic apparatus according to the embodiment of the present invention, the operation button is composed of a transparent electrode disposed in the base chassis. By thus using the transparent electrode, transparency of the base chassis in a region visible by the user can be maintained, and design of the electronic apparatus can be improved.

Further, in the electronic apparatus according to the embodiment of the present invention, the base chassis includes a second region that overlaps the display unit plane-wise, the operation button is provided in a plurality of numbers along an outer circumference of the first region of the base chassis, the plurality of operation buttons drawn to the second region by transparent first wirings having equal lengths, the first wirings are respectively connected to corresponding second wirings arranged in the second region, each of the second wirings having higher conductivity than the first wirings, and the second wirings are aggregated at at least one point in the second region. By thus providing the first wirings to be transparent and at equal lengths, and using a material having higher conductivity than that of the first wirings for the second wirings arranged in the second region as an invisible region hidden by the display unit, it is possible to realize an electronic apparatus having variations in signal response characteristics between wirings suppressed and having favorable operating characteristics regarding the operation button, while maintaining transparency of the base chassis in the visible region thereof.

Further, in the electronic apparatus according to the embodiment of the present invention, each of the first wirings is made of indium tin oxide (ITO), and each of the second wirings is made of one of silver and copper. It is thus possible to use the transparent ITO for the first wirings. Moreover, since the second wirings arranged in the invisible region hardly need to be transparent, it is possible to arbitrarily select a material having high conductivity, such as silver and copper.

Further, in the electronic apparatus according to the embodiment of the present invention, a region outside the transparent electrode is surrounded by a transparent ground electrode, and the base chassis partially functions as a touchpad due to the transparent electrode and the ground electrode. It is thus possible to provide a touchpad function to the base chassis.

Further, according to the embodiment of the present invention, the electronic apparatus further includes a retaining member made of an opaque material, which is provided to cover at least the one end on the outer circumference of the base chassis. Further, in the electronic apparatus, the base chassis includes a concave section, the transparent electrode and the ground electrode are arranged inside the concave section, and the ground electrode and the retaining member have portions that overlap each other plane-wise. Accordingly, because gaps indeliberately generated between the concave section and the ground electrode are covered by the retaining member, transparency of the base chassis is not impaired by the gaps.

Further, according to the embodiment of the present invention, the electronic apparatus further includes a substrate mounted with a detecting circuit configured to detect a change in capacitance of the touchpad, the substrate disposed between the display unit and the base chassis. It is thus possible to use a capacitance sensor to judge whether an input has been made to the operation buttons. Moreover, by providing the substrate mounted with the detecting circuit, it is also possible to mount on the substrate, for example, illuminating means such as LEDs for illuminating the operation buttons. Furthermore, when mounting on the substrate a controlling circuit configured to control lighting of the illuminating means in response to the input to the operation button, it is possible to immediately transmit a lighting signal or the like to control lighting of the LEDs, thus realizing a favorable operational response.

In the electronic apparatus according to the embodiment of the present invention, the base chassis includes guide grooves provided along the outer circumference thereof, and the electronic apparatus further includes first to fourth retaining members and coupling members. The first to fourth retaining members are each made of an opaque material and guided through the guide grooves respectively provided along an upper outer circumference of the base chassis, a left-hand side outer circumference thereof, a right-hand side outer circumference thereof, and a lower outer circumference thereof. The coupling members are configured to respectively couple the first retaining member guided along the upper outer circumference with the second retaining member guided along the left-hand side outer circumference and the third retaining member guided along the right-hand side outer circumference in the vicinity of an upper left-hand corner and upper right-hand corner of the base chassis, respectively.

According to the embodiment of the present invention, because the coupling members respectively couple the first retaining member guided along the upper outer circumference with the second retaining member guided along the left-hand side outer circumference and the third retaining member guided along the right-hand side outer circumference in the vicinity of the upper right-hand corner and the upper left-hand corner of the base chassis, respectively, it is possible to reduce gaps between the retaining members at the coupling portions without impairing an appearance as compared with a case of using screws.

In the electronic apparatus according to the embodiment of the present invention, the fourth retaining member may be screwed to the base chassis at a lower end section of the base chassis such that the second retaining member and the third retaining member are pushed upward. Thus, it is possible to eliminate gaps respectively formed between the fourth retaining member and the second and third retaining members. In addition, an appearance of the electronic apparatus is not impaired since the screws are shut at the lower end section of the base chassis where the user is incapable of seeing.

In the electronic apparatus according to the embodiment of the present invention, coupling spaces from which the guide grooves have been removed may be provided in the vicinity of the upper left-hand corner and upper right-hand corner of the base chassis, respectively. Similarly, coupling spaces from which the guide grooves have been removed may be provided in the vicinity of a lower left-hand corner and lower right-hand corner of the base chassis, respectively.

In the electronic apparatus according to the embodiment of the present invention, the coupling members may each have an inverse-L shape, and the coupling members may be provided such that the coupling members are engaged at ends thereof (horizontal section) with respective ends of the first retaining member, and the other end (vertical section) of each of the coupling members is engaged with one end of one of the second retaining member and the third retaining member.

In the electronic apparatus according to the embodiment of the present invention, each of the coupling members having the inverse-L shape may be structured to have an elastic force in a vertical direction at the one end thereof (horizontal section) (e.g., cantilever structure), the one end having on an upper surface thereof a first convex section configured to engage with a first concave section formed on the guide grooves, and may be structured to have an elastic force in at least a lateral direction at the other end thereof (vertical section) (e.g., structure such as that obtained when dividing a cantilever into two in the lateral direction), the other end having on one of a left-hand side surface and a right-hand side surface thereof a second convex section configured to engage with a second concave section formed on the guide grooves.

In the electronic apparatus according to the embodiment of the present invention, the guide grooves may each have at predetermined positions thereof third convex sections for resonance prevention.

According to another embodiment of the present invention, there is provided an electronic apparatus including a display unit, a base chassis, a keyboard, and a screen displaying section. The display unit includes a display region. The base chassis is made of a transparent material and includes a first region that extends outward from at least one of a left-hand side and a right-hand side on a circumference of the display unit, the first region provided with a plurality of operation buttons arranged vertically for operating a driving circuit. The keyboard is pivotally connected to a lower section of the basis chassis to be openable and closable, and is capable of exposing a part of the display region of the display unit when being closed. The screen displaying section is configured to display screens in the exposed part of the display region when the keyboard is closed, the screen operated by using the plurality of operation buttons. Further, in the electronic apparatus, a specific screen (e.g., menu screen) among the screens displayed by the screen displaying section is operated by at least one of the plurality of operation buttons that corresponds to the exposed part of the display region.

According to the embodiment of the present invention, the user can intuitively grasp a position of the operation button necessary for operating the specific screen displayed, whereby operability is improved.

The specific screen is desirably a menu screen with which at least an application capable of reproducing music can be executed.

When the keyboard is opened from the closed status while the application capable of reproducing music is being executed, a screen related to the application may be displayed in the display region together with a screen of the operating system. In this case, when the music is being reproduced when closing the keyboard, it is sufficient that the music keep being reproduced. When the application is executed on the screen of the operating system before the keyboard is closed, the operation screen may be displayed as the screen related to the application, and when the application is not executed on the screen of the operating system before the keyboard is closed, predetermined display may be made in a taskbar on the screen of the operating system as the screen related to the application.

When the keyboard is closed from the opened status where the screen of the operating system is displayed in the display region and the application is being executed, the screen related to the application may be displayed in the display region. When the keyboard is closed from the status where the application is not executed, a predetermined setting screen regarding date and time, for example, may be displayed.

A focus on the menu screen may be a center focus that focuses on an item arranged substantially at a center among a plurality of items displayed in the vertical direction.

In a case where the number of items exceeds a predetermined number, the items may be displayed by looping. As described above, when all the items cannot be displayed on the menu screen, a scrollbar may be displayed on a right-hand side of the screen. Thus, the user can easily grasp the number and positions of all items when the number of items is increased.

As described above, according to the embodiments of the present invention, it becomes possible to enhance intuitiveness in operating the operation buttons of the electronic apparatus, and improve design.

These and other objects, features and advantages of the present invention will become more apparent in light of the following detailed description of best mode embodiments thereof, as illustrated in the accompanying drawings.

BRIEF DESCRIPTION OF DRAWINGS

FIG. 8 is an enlarged sectional view taken along the line VIII-VIII of FIG. 7 also showing a device mounting substrate, a semiconductor light-emitting device, and the like;

FIG. 11 is an enlarged sectional view taken along the line XI-XI of FIG. 7 also showing the device mounting substrate, the semiconductor light-emitting device, and the like;

FIG. 23 are plan views showing a modification of the circuit board, in which

FIG. 41 is a diagram showing a date/time screen in the half-skin display;

FIG. 42 is a diagram showing a screen displayed when reproducing a CD in the half-skin display;

FIG. 43 is a diagram showing a screen displayed when reproducing an album in the half-skin display;

FIG. 44 is a diagram showing a screen displayed at a time of entrusted channel reproduction in the half-skin display;

DESCRIPTION OF PREFERRED EMBODIMENT

Hereinafter, an embodiment of the present invention will be described with reference to the drawings.

In the embodiment below, an electronic apparatus of the present invention is applied to a personal computer. However, an application range of the electronic apparatus according to the present invention is not limited to the personal computer, and may widely be applied to, for example, various information processing apparatuses such as a PDA (Personal Digital Assistant), a network terminal, a mobile information terminal, and a workstation, and various electronic apparatuses such as an acoustic appliance and a household electrical appliance including a television.

In descriptions below, for convenience, directions in which a user views a display screen of the personal computer are respectively set as an upward direction, a downward direction, a forward direction, a backward direction, a left-hand direction, and a right-hand direction. A front side (user side) is set as a front, and left- and right-hand directions of the user are respectively set as left and right. Further, for ease in understanding a structure, contraction scales and the number of components are differed from those of actual structural components in some cases.

Figure 1:
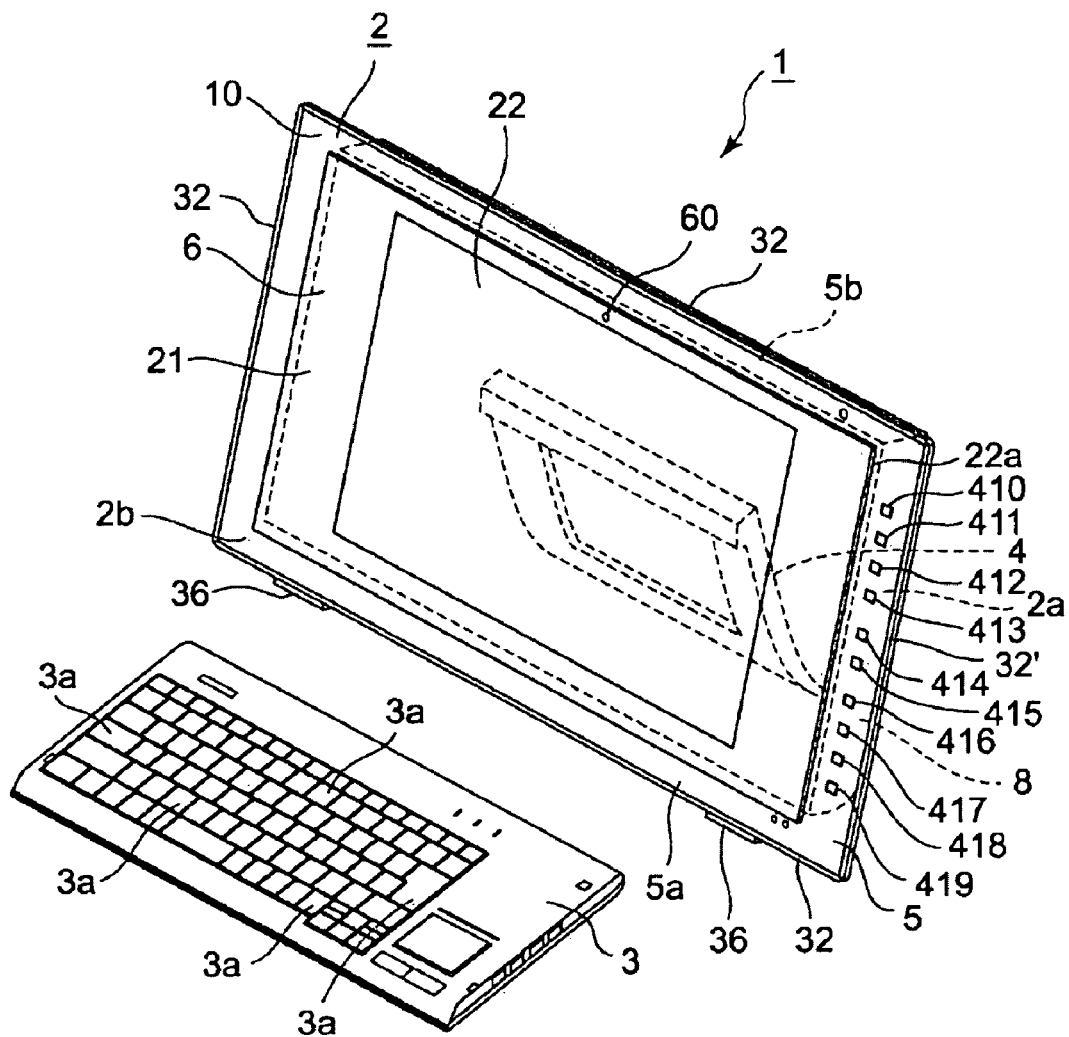
FIG. 1 is a perspective view of an electronic apparatus according to an embodiment of the present invention.

An electronic apparatus (personal computer) 1 includes an apparatus main body 2, a keyboard 3, and a stand 4 rotatably supported on a back surface 2a of the apparatus main body 2 (see FIG. 1).

The keyboard 3 is provided separate from the apparatus main body 2, for example, and predetermined operation keys 3a are provided on the keyboard 3. When the operation key 3a of the keyboard 3 is operated, a signal corresponding to the operated operation key 3a is output, which is then input to a receiving section (not shown) provided in the apparatus main body 2 through radio so that various types of processing are executed according to the operation to the operation key 3a.

As described above, in the electronic apparatus 1, because the keyboard 3 is provided separate from the apparatus main body 2, it is possible to use the keyboard 3 at arbitrary places if necessary as long as the apparatus main body 2 is within a range capable of receiving radio signals from the keyboard 3.

Figure 2:
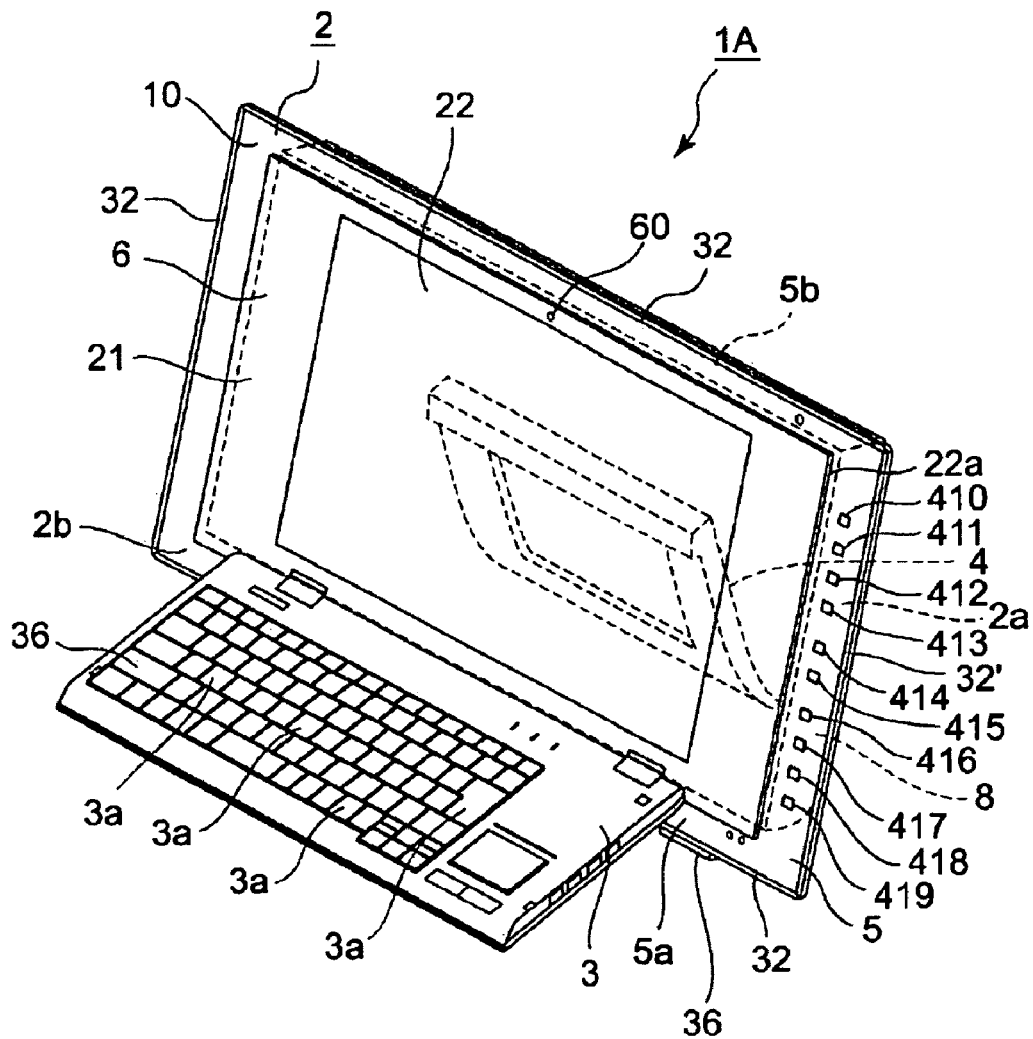
FIG. 2 is a perspective view of an electronic apparatus of a different type.

It should be noted that instead of the electronic apparatus in which the keyboard 3 is provided separate from the apparatus main body 2, there may be employed, for example, an electronic apparatus 1A including the apparatus main body 2, the keyboard 3 supported on a front surface 2b of the apparatus main body 2 so as to be openable and closable, and the stand 4 rotatably supported on the back surface 2a of the apparatus main body 2 as shown in FIG. 2. In the electronic apparatus 1A, it is possible to close the keyboard 3 when not in use, thus providing an advantage that an arrangement space for the keyboard 3 is reduced when the keyboard 3 is not in use or at a time of carrying out an operation such as reproduction of music, for example.

Figure 3:
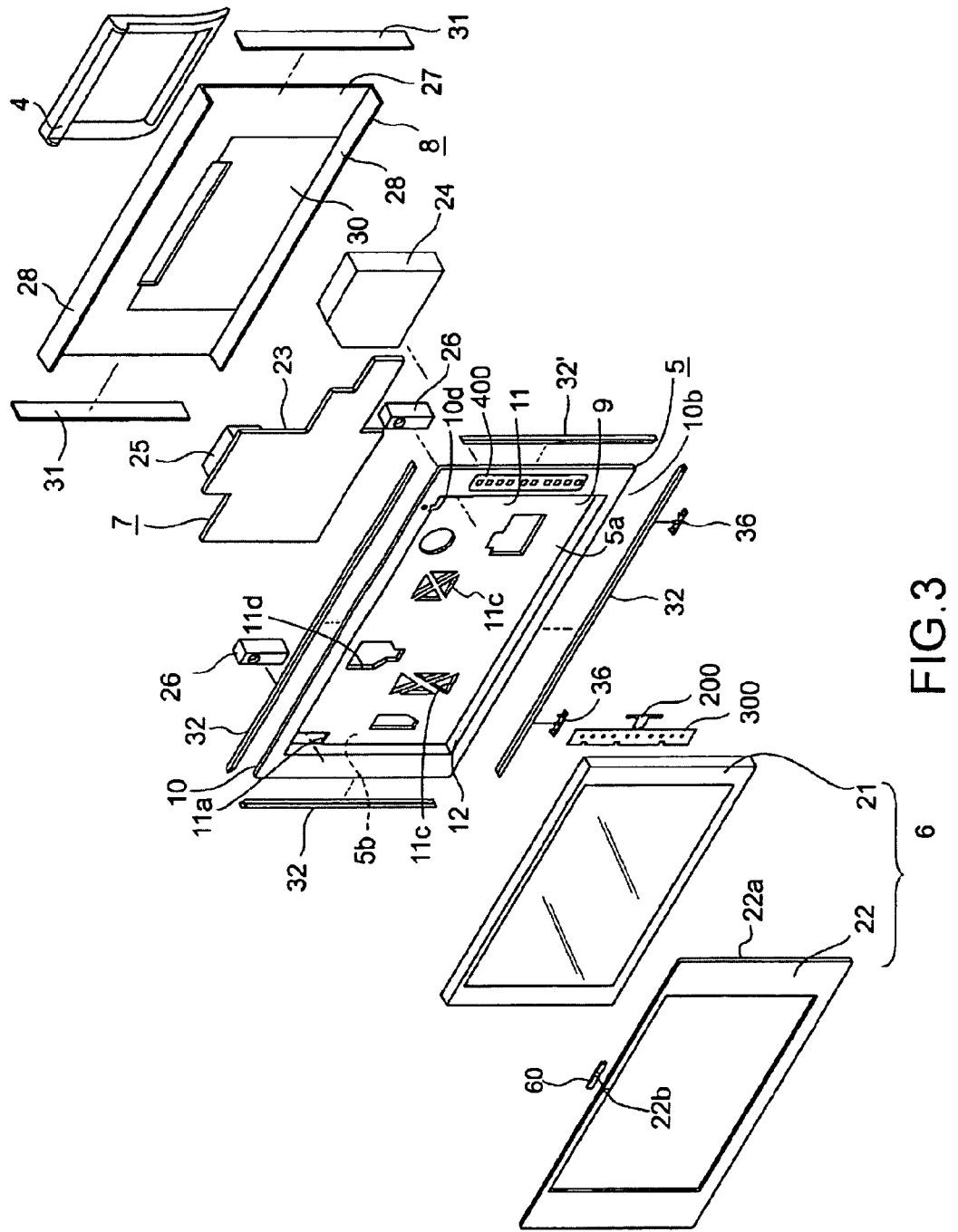
FIG. 3 is a schematic exploded perspective view of the electronic apparatus shown in FIGS. 1 and 2.
Figure 4:
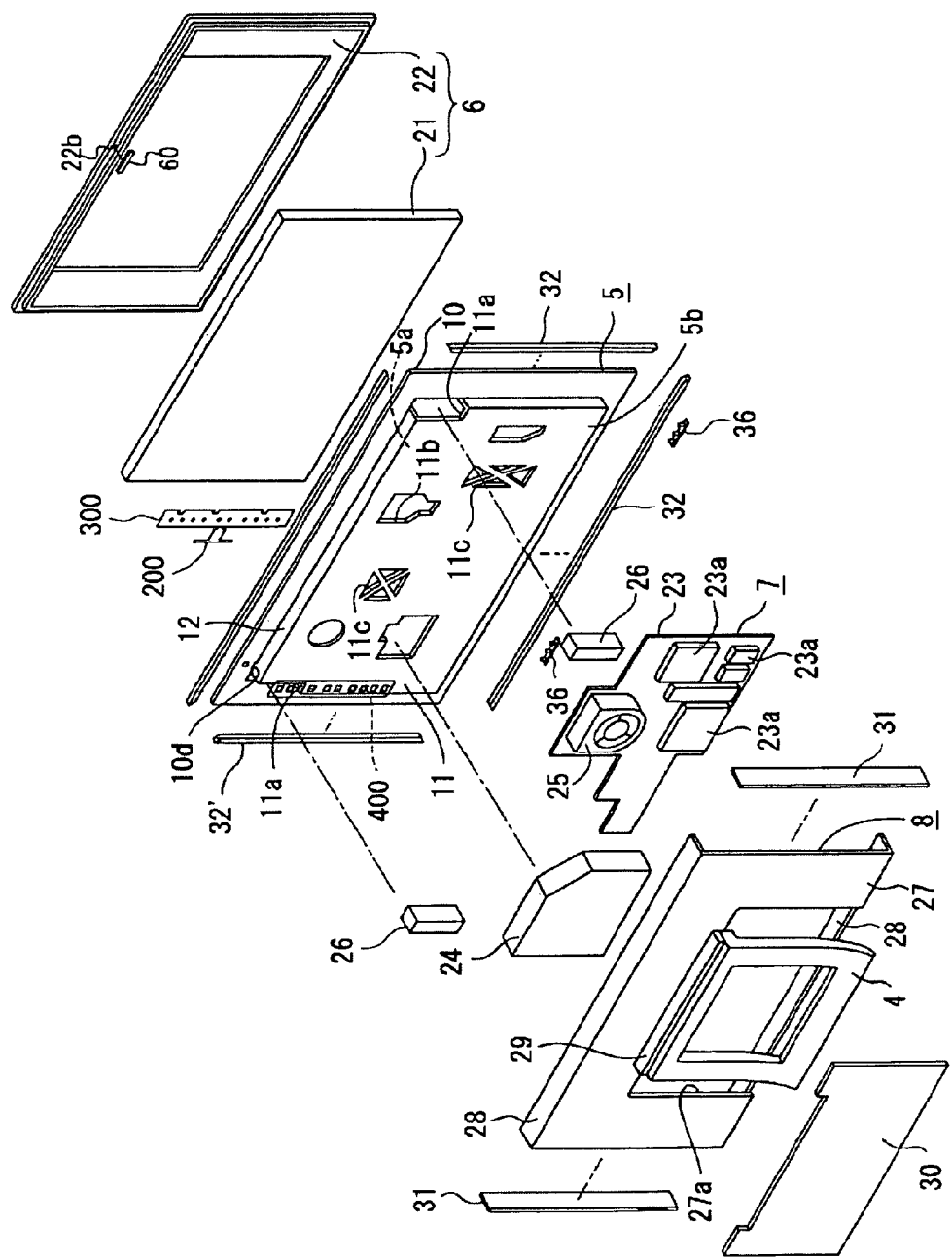
FIG. 4 is an exploded perspective view schematically showing the electronic apparatus seen from a direction opposite to that of FIG. 3.

As shown in FIGS. 3 and 4, the apparatus main body 2 is constituted by necessary components being mounted on both front and back surfaces of a base chassis 5. The apparatus main body 2 includes the base chassis 5, a display unit 6 mounted on the front surface of the base chassis 5, a control circuit board 7 mounted on the back surface of the base chassis 5, a rear cover 8, and a circuit board 300 for electrically connecting the control circuit board 7 and the base chassis 5.

The base chassis 5 is, for example, formed as a vertically-placed frame facing front and is formed by injection molding using a transparent material such as an acrylic resin. The front surface of the base chassis 5 serves as a first mounting surface section 5a and the back surface thereof serves as a second mounting surface section 5b.

Retaining members 32 and 32' each made of an opaque material are mounted to an outer circumference of the base chassis 5.

A concave mounting section 9 having a forward opening is formed in the base chassis 5. The concave mounting section 9 is formed as a space surrounded by a coupling section 12 as a sidewall section obtained by coupling an inner circumference of the base chassis 5 excluding an outer circumferential section 10 thereof and an outer circumference of a bottom surface section 11, the coupling section 12 provided substantially perpendicular to the outer circumferential section 10 and the bottom surface section 11.

By forming the base chassis 5 through coupling of the outer circumferential section 10 and the bottom surface section 11 using the coupling section 12 that bends with respect to both sections, strength of the base chassis 5 is enhanced.

Figure 5:
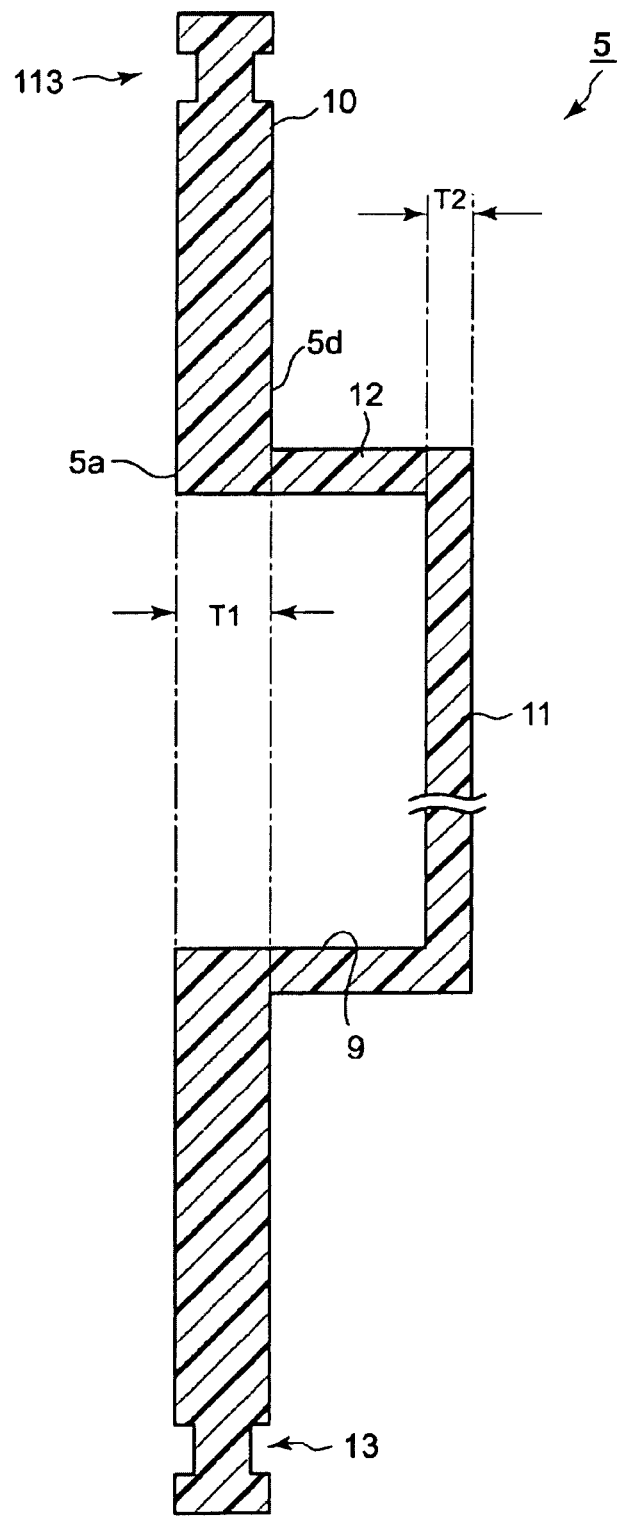
FIG. 5 is an enlarged sectional view schematically showing a base chassis.

As shown in FIG. 5, in the base chassis 5, a thickness T1 of the outer circumferential section 10 is set larger than a thickness T2 of the bottom surface section 11, that is, the thickness T1 of the outer circumferential section 10 is set to 5 mm whereas the thickness T2 of the bottom surface section 11 is set to 2.4 mm, for example.

By setting the thickness T1 of the outer circumferential section 10 larger than the thickness T2 of the bottom surface section 11, it is possible to reduce a thickness of the base chassis 5 while securing a high level of strength thereof.

Figure 6:
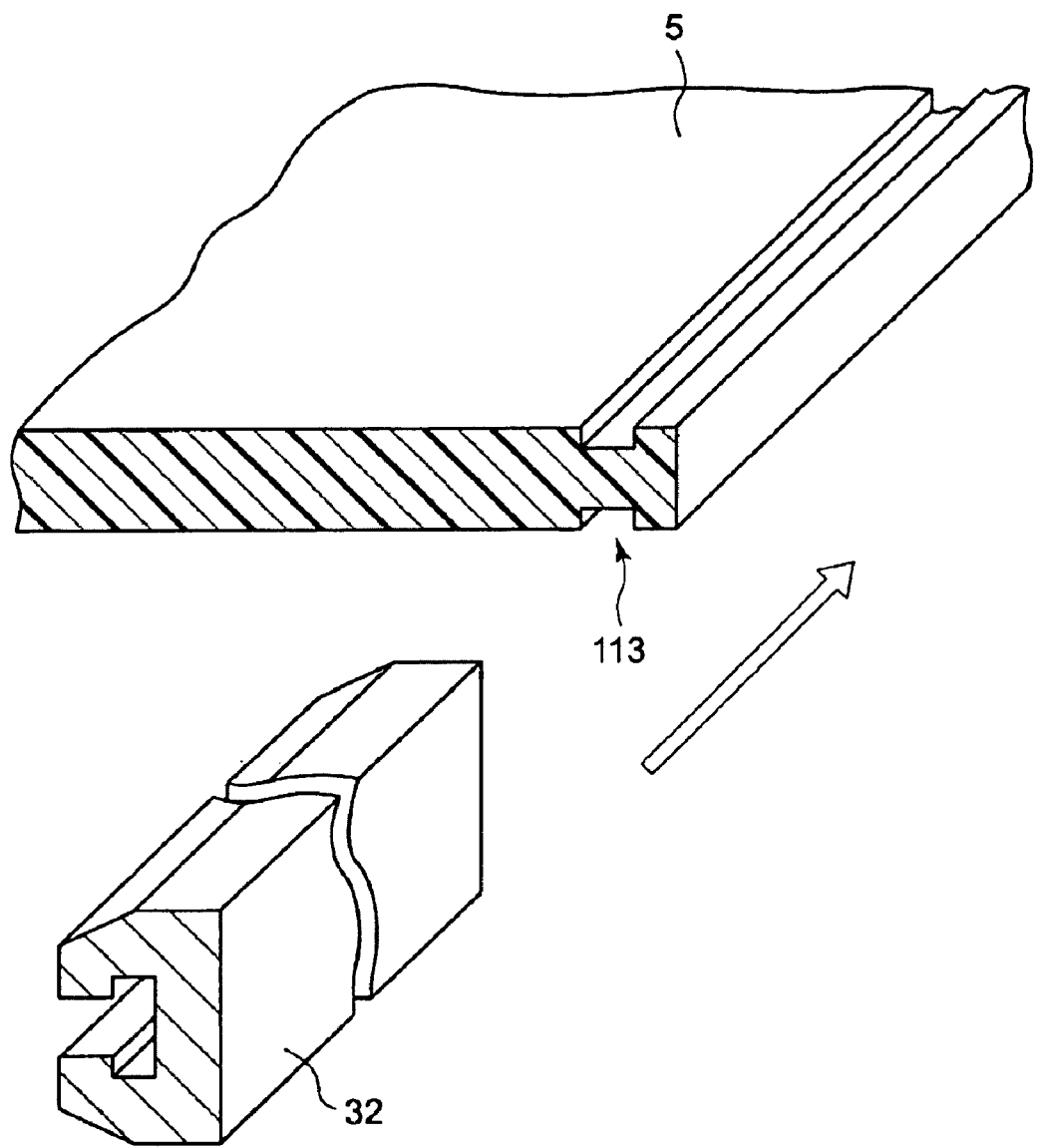
FIG. 6 is a partial perspective view schematically showing a state where a retaining member is mounted to the base chassis.
Figure 8:
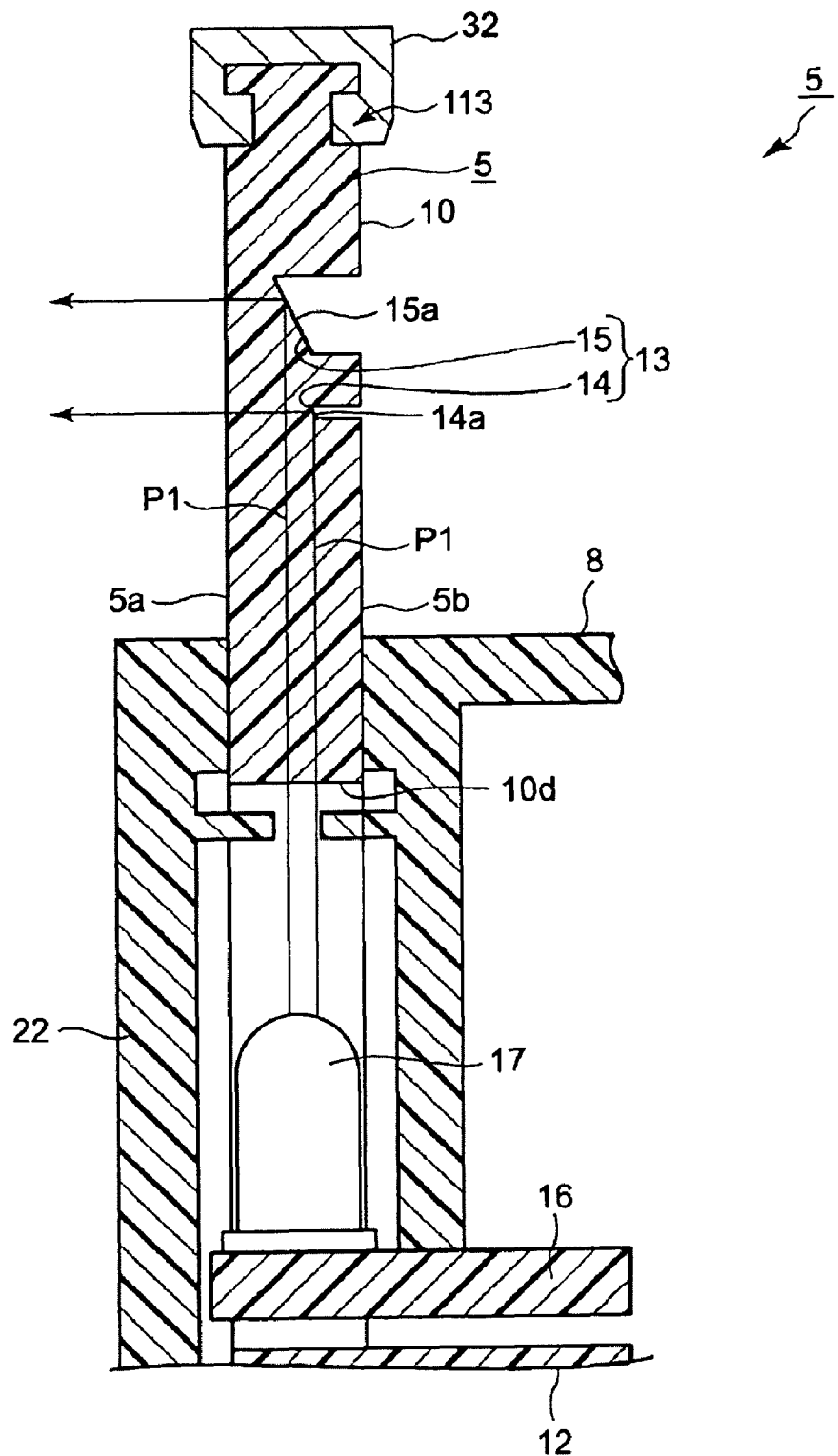

As shown in FIGS. 5, 6, and 8, an outer circumference of the outer circumferential section 10 of the base chassis 5 is formed with groove-like concave sections 113 that fit with the retaining members 32 and 32' to be described later. The groove-like concave sections 113 are respectively provided on front and back surfaces on the outer circumference of the outer circumferential section 10 of the base chassis 5, and a cross-section of the outer circumferential section 10 has a shape that looks partially bundled. Further, the concave sections 113 are provided almost along the outer circumference of the outer circumferential section 10 and provided slightly on an inner side than the outer circumference plane-wise.

Figure 13:
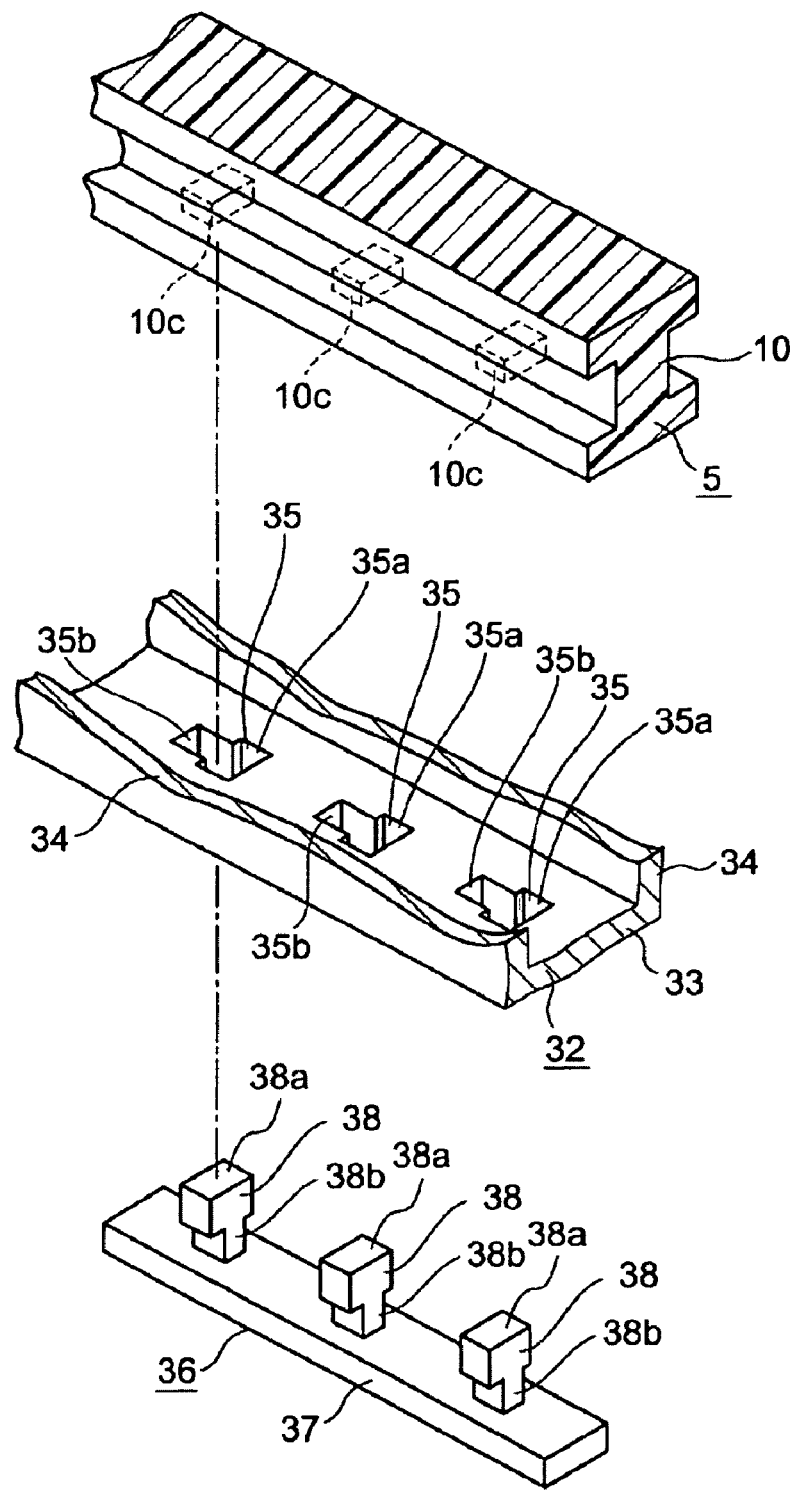
FIG. 13 is an enlarged exploded perspective view showing a lower end section of the base chassis, the retaining member, and a mounting pad.

As shown in FIG. 13, concave retaining sections 10c each having a downward opening are formed three each on both left and right end sections on a lower end section of the outer circumferential section 10 of the base chassis 5, the three concave retaining sections 10c being isolated from each other.

A light-storing lamp section 13 is formed at an upper right-hand section on the outer circumferential section 10 of the base chassis 5. The light-storing lamp section 13 is, for example, a lamp section that indicates a power on/off status, and is lit when the power is on and is unlit when the power is off.

Figure 7:
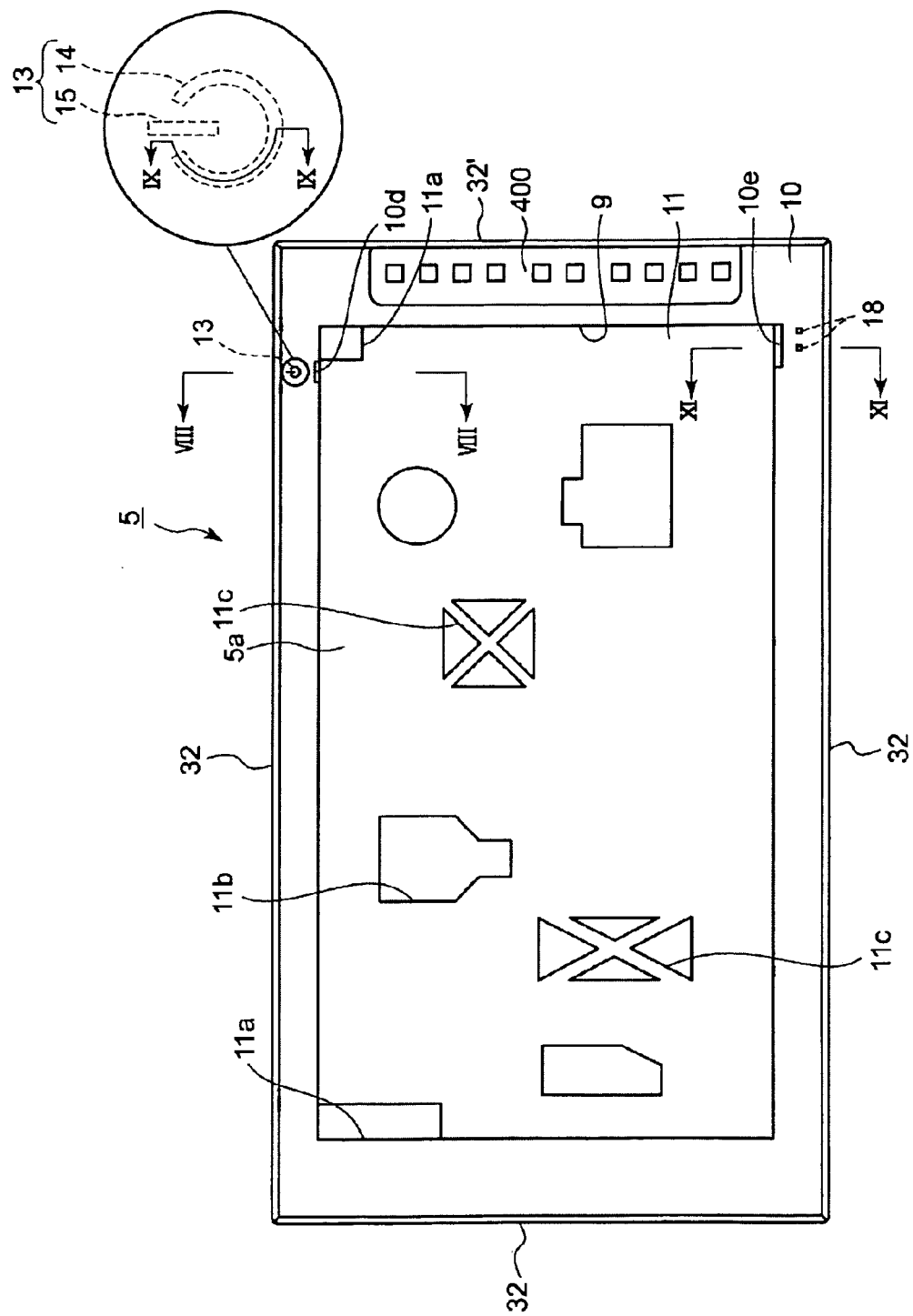
FIG. 7 is a front view showing the base chassis and the retaining members mounted to the base chassis.

The light-storing lamp section 13 is formed through formation of grooves each having a backward opening in the base chassis 5 (see FIG. 8). As shown in FIGS. 7 and 8, the light-storing lamp section 13 is composed of an arc section 14 forming an arc with an upward opening and a straight line section 15 positioned between tip ends of the arc section 14 and extends in the vertical direction.

Figure 9:
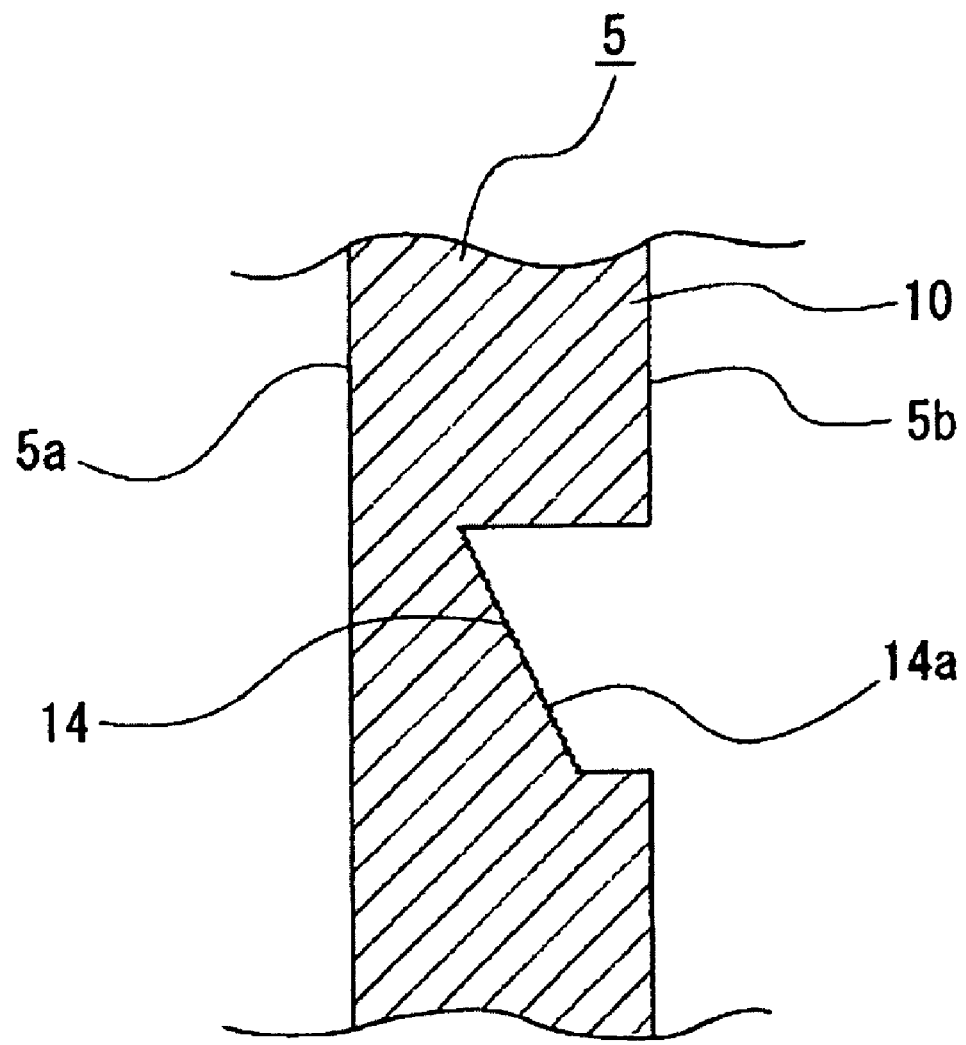
FIG. 9 is an enlarged sectional view taken along the line IX-IX of FIG. 7.

A rear surface section 14a of the arc section 14 is tilted so as to be displaced forward toward the upward direction, and a depth of the groove of the arc section 14 is formed to increase toward the upward direction (see FIGS. 8 and 9).

As shown in FIG. 8, a rear surface section 15a of the straight line section 15 is tilted so as to be displaced forward toward the upward direction, and a depth of the groove of the straight line section 15 is formed to increase toward the upward direction. The depth of the groove at a lower end of the straight line section 15 is formed to be the same as a depth of a groove of the arc section 14 at an upper end of a portion thereof right below the straight line section 15.

The rear surface section 14a of the arc section 14 and the rear surface section 15a of the straight line section 15 are subjected to grain processing or the like to form a fine concavoconvex shape, for example.

Figure 10:
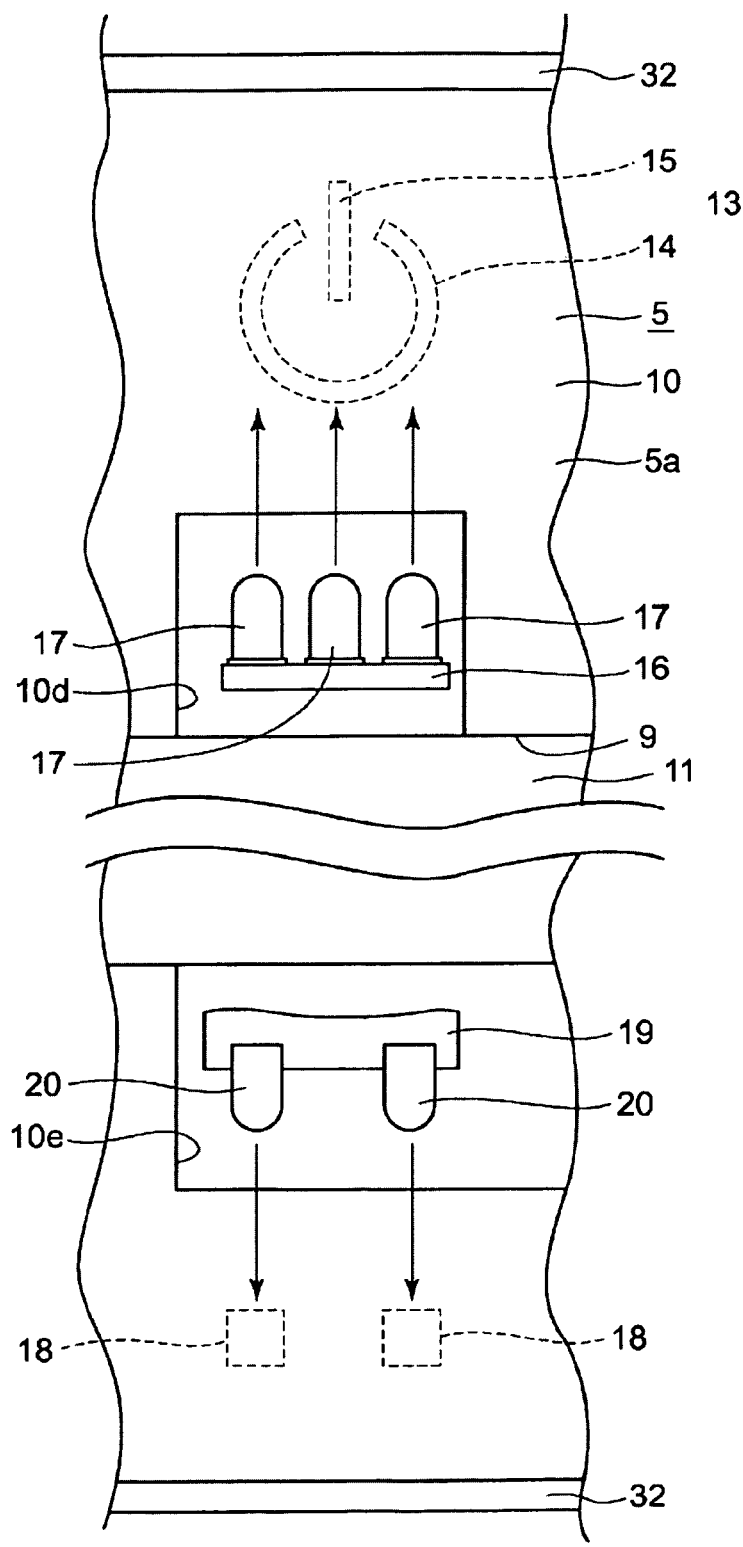
FIG. 10 is an enlarged front view showing a positional relationship of the semiconductor light-emitting device with a light-storing lamp section and a reflecting lamp section.

A first device mounting substrate 16 is disposed below the light-storing lamp section 13 (see FIGS. 8 and 10). The first device mounting substrate 16 is placed horizontally and is disposed such that a part of the first device mounting substrate 16 is inserted into an upper device arranging hole 10d (see FIG. 7) formed in the base chassis 5. The upper device arranging hole 10d is formed right below the light-storing lamp section 13.

For example, three first semiconductor light-emitting devices 17 each being isolated from each other in the lateral direction are mounted on an upper surface of the first device mounting substrate 16 (see FIG. 10), the first semiconductor light-emitting devices 17 disposed right below the light-storing lamp section 13. For example, the first semiconductor light-emitting device 17 in the middle is a device that emits orange light and the first semiconductor light-emitting devices 17 on both sides thereof are devices that emit green light.

Light P1 (see FIG. 8) emitted from the first semiconductor light-emitting devices 17 enters the rear surface sections 14a and 15a of the light-storing lamp section 13. However, as described above, by forming the light-storing lamp section 13 such that the rear surface sections 14a and 15a are tilted, the depth of the groove of each of the arc section 14 and the straight line section 15 increases toward the upward direction, and the depth of the groove at the lower end of the straight line section 15 is the same as that of the groove of the arc section 14 at the upper end of the portion thereof right below the straight line section 15, the light P1 is made incident on the rear surface sections 14a and 15a uniformly, whereby incidence efficiency of light can be improved.

When the light P1 enters the light-storing lamp section 13, the light P1 is reflected diffusely by the fine concavoconvex shape formed in the rear surface sections 14a and 15a, and the light P1 from the light-storing lamp section 13 then permeates through an inner portion of the base chassis 5 to exit toward the front.

In the electronic apparatus 1, for example, the light P1 is emitted from the first semiconductor light-emitting devices 17 positioned on both sides in a normal operation mode, and the light P1 is emitted from the first semiconductor light-emitting device 17 in the middle in a pause mode.

As described above, in the electronic apparatus 1, the light-storing lamp section 13 is provided in the base chassis 5 and the light P1 emitted from the first semiconductor light-emitting devices 17 is caused to exit through the light-storing lamp section 13. Thus, it is possible to improve visibility while securing a simple structure of merely forming the light-storing lamp section 13 in the base chassis 5.

The outer circumferential section 10 of the base chassis 5 is formed with reflecting lamp sections 18 at a lower right-hand section thereof (see FIG. 7). The reflecting lamp sections 18 are, for example, lamp sections that indicate a wireless LAN (Local Area Network) connection status, an HDD (hard disk drive) access status, and the like, and each of the reflecting lamp sections 18 is lit or flashes when a wireless LAN is connected or an HDD is accessed and is unlit when no connection or access is made.

Figure 11:
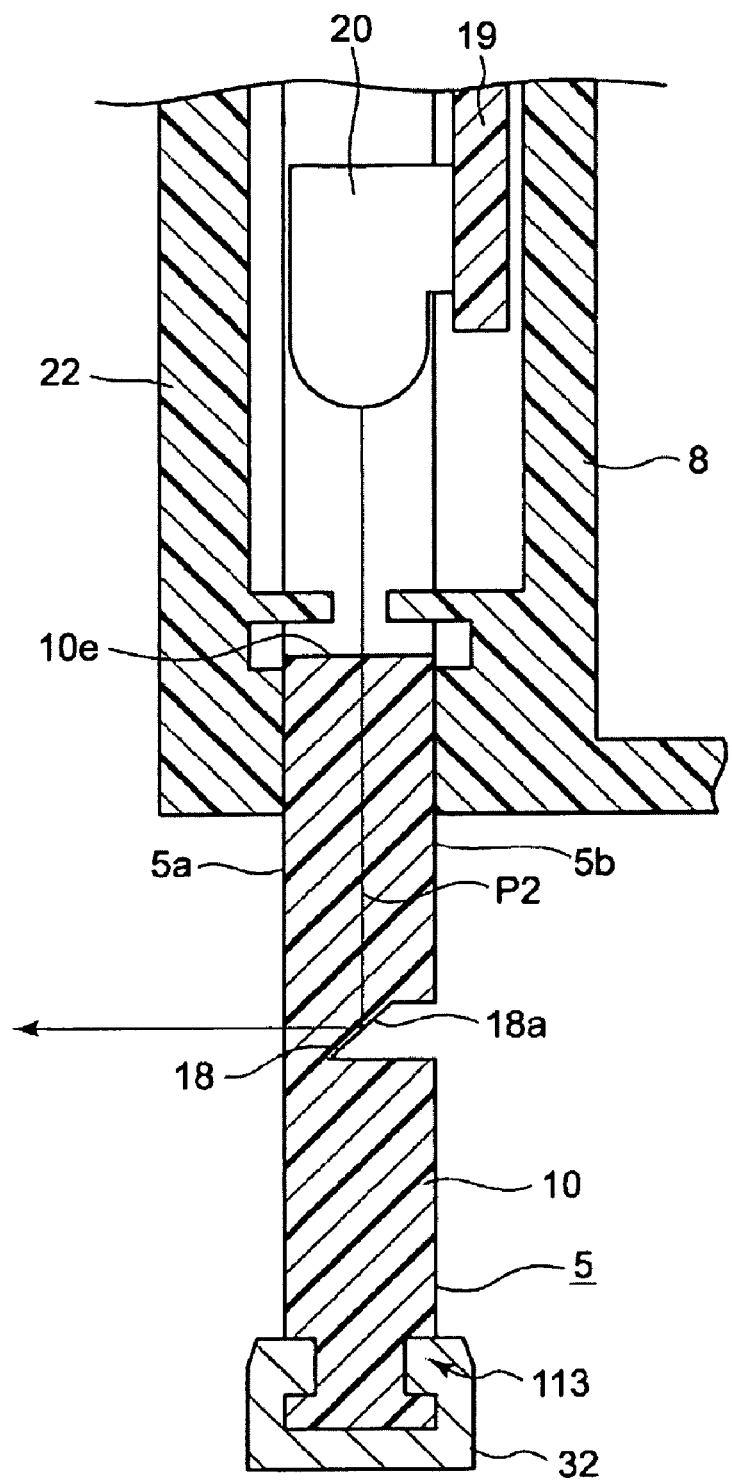

The reflecting lamp sections 18 are formed through formation of grooves each having a backward opening in the base chassis 5 (see FIG. 11).

Figure 12:
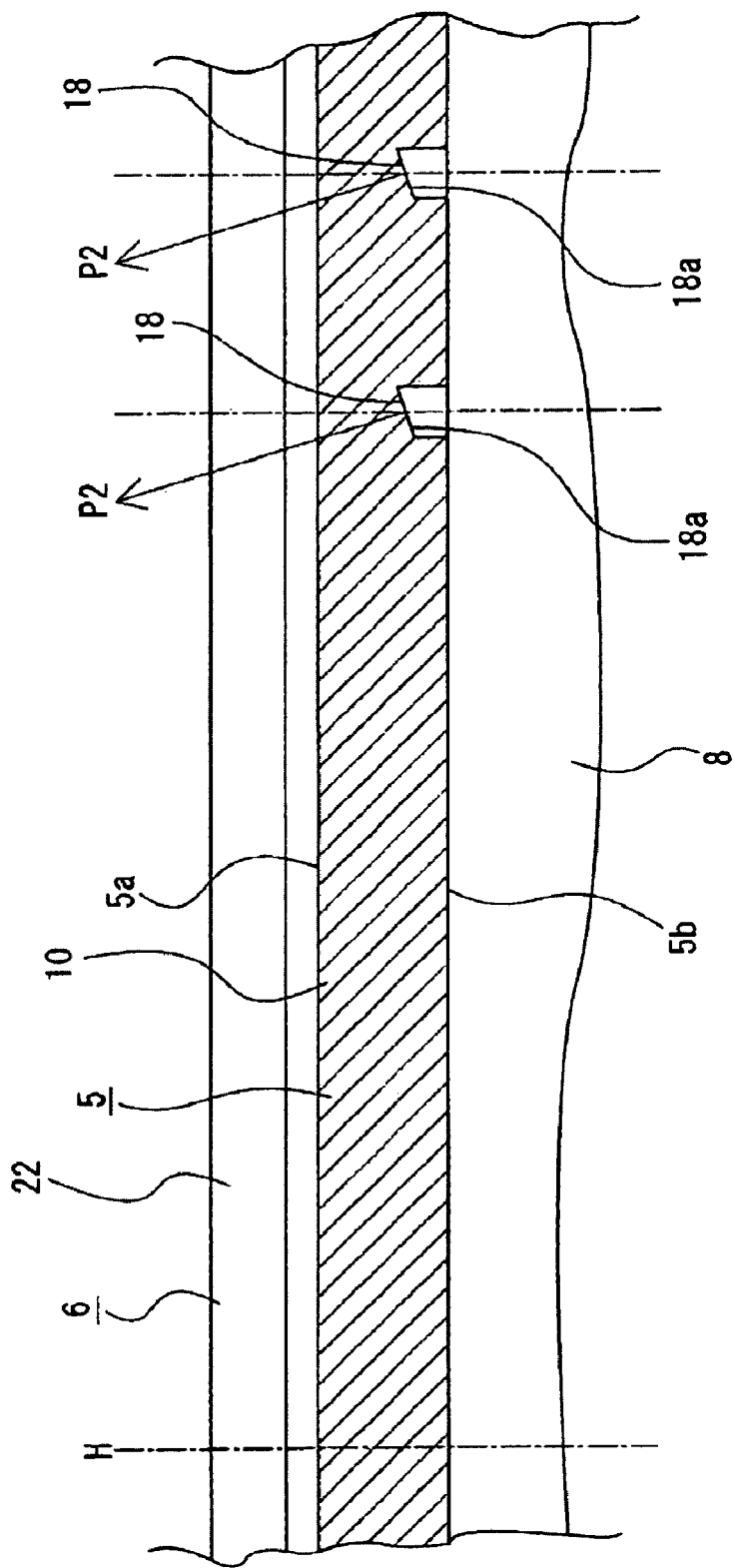
FIG. 12 is an enlarged sectional view showing a light emitting direction of light reflected by the reflecting lamp section.

Rear surface sections 18a of the reflecting lamp sections 18 are tilted so as to be displaced forward toward the downward direction (see FIG. 11). Further, the rear surface sections 18a of the reflecting lamp sections 18 are also tilted so as to be displaced forward toward the right-hand direction (see FIG. 12).

The rear surface sections 18a of the reflecting lamp sections 18 are formed as mirror surfaces. A vertically-placed second device mounting substrate 19 facing front is disposed above the reflecting lamp sections 18 (see FIGS. 10 and 11).

For example, two second semiconductor light-emitting devices 20 each being isolated from each other in the lateral direction are mounted on a front surface of the second device mounting substrate 19, and the second semiconductor light-emitting devices 20 are disposed inside a lower device arranging hole 10e (see FIG. 7) formed in the base chassis 5 and are positioned right above the respective reflecting lamp sections 18 (see FIG. 11). The lower device arranging hole 10e is formed right above the reflecting lamp sections 18.

Light P2 (see FIG. 11) emitted from the second semiconductor light-emitting devices 20 is made incident on the rear surface sections 18a of the reflecting lamp sections 18.

When the light P2 enters the reflecting lamp sections 18, the light P2 is caused of inner reflection by the rear surface sections 18a, and the light P2 from the reflecting lamp sections 18 then permeates through the inner portion of the base chassis 5 to exit toward the front.

At this time, as described above, because the rear surface sections 18a of the reflecting lamp sections 18 are tilted so as to be displaced forward toward the right-hand direction, the light P2 is reflected toward a center of the electronic apparatus 1, that is, in a direction toward a normal line H (see FIG. 12) that crosses the center of the display unit 6.

Therefore, the user of the electronic apparatus 1 can see the light P2 reflected by the reflecting lamp sections 18 with ease. As a result, visibility can be improved while securing a simple structure of merely forming the reflecting lamp sections 18 through formation of the grooves in the base chassis 5.

Speaker arranging holes 11a, a connecting wire through-hole 11b, cooling air circulating holes 11c, and the like are formed at predetermined positions on the bottom surface section 11 of the base chassis 5. In addition, components including a mounting boss for screwing, a positioning protruding section, a positioning hole, a mounting protrusion, a mounting hole, and the like are also formed at respective positions on the bottom surface section 11 and the coupling section 12.

The display unit 6 includes a display panel 21 and a front panel 22 (see FIGS. 1 to 4).

The display panel 21 is, for example, a liquid crystal panel, and an outline thereof is formed to be slightly smaller than that of the bottom surface section 11 of the base chassis 5.

The front panel 22 is formed as a rectangular frame, and an outline thereof is formed to be slightly larger than that of the bottom surface section 11 of the base chassis 5.

The display panel 21 is inserted into the concave mounting section 9 of the base chassis 5 and mounted on the bottom surface section 11 of the base chassis 5 by appropriate means such as screwing. While the display panel 21 is mounted on the base chassis 5, the front panel 22 is fixed to the base chassis 5 by appropriate means such as screwing in a state where the front panel 22 is covering the inner circumference of the outer circumferential section 10 from the front. An outer circumference of the display panel 21 is pressed by the front panel 22 from the front.

Driving of the display panel 21 generates heat along with the driving, but the generated heat is circulated to the back surface side of the base chassis 5 via the cooling air circulating holes 11c formed in the base chassis 5 to thus be discharged outside from a heat dissipating hole (not shown) formed in the rear cover 8. Therefore, an increase in temperature of the display panel 21 is suppressed.

The control circuit board 7 is a circuit board for carrying out controlling processing of the entire electronic apparatus 1. The control circuit board 7 includes a substrate 23 and predetermined electronic components 23a including a CPU (Central Processing Unit) or a chipset as a driving circuit mounted on the substrate 23 (see FIGS. 3 and 4).

The control circuit board 7 is mounted on a second mounting surface section 5b as a back surface of the base chassis 5 at a predetermined position by appropriate means such as screwing. While the control circuit board 7 is mounted on the second mounting surface section 5b, a connecting wire (not shown) is inserted through the connecting wire through-hole 11b formed in the base chassis 5, and the display panel 21 and a panel driving circuit of the control circuit board 7 are connected by the connecting wire.

Predetermined components such as a media driving section 24 including a disk drive and a card slot and a cooling fan 25 are mounted on the second mounting surface section 5b of the base chassis 5 by appropriate means such as screwing.

Speakers 26 are respectively inserted into the speaker arranging holes 11a formed in the base chassis 5, which are then fixed to the base chassis 5 by appropriate means such as screwing.

By inserting the speakers 26 into the speaker arranging holes 11a fix the speakers 26, as compared to the case where the speakers 26 are mounted on the first mounting surface section 5a of the base chassis 5, an amount by which the speakers 26 protrude forward is reduced, whereby an electronic apparatus 1 with a reduced thickness can be obtained.

As described above, while the predetermined components such as the control circuit board 7, the media driving section 24, and the cooling fan 25 and the necessary components such as the speakers 26 are mounted on the second mounting surface section 5b of the base chassis 5, the rear cover 8 is fixed to the second mounting surface section 5b by appropriate means such as screwing so as to cover those components from the back.

The rear cover 8 includes a base 27 placed vertically and facing almost the front and protruding sections 28 that protrude forward from both upper and lower ends of the base 27. The rear cover 8 is formed with a plurality of heat dissipating holes (not shown).

The base 27 has a stand supporting section 29 (see FIG. 4) at substantially the center thereof and a maintenance opening 27a below the stand supporting section 29. The maintenance opening 27a is opened and closed using a cover 30 detachable from the base 27.

The control circuit board 7 and the like are exposed when the cover 30 is removed from the base 27 to open the maintenance opening 27a. Consequently, maintenance can be carried out on the control circuit board 7 and the like.

Side covers 31 are respectively mounted on both sides of the rear cover 8.

As described above, the electronic apparatus 1 is constituted by mounting the necessary components on the first mounting surface section 5a of the base chassis 5 and the second mounting surface section 5b thereof, the components of the base chassis being integrally formed therein using a transparent material. Thus, a structure of the electronic apparatus 1 can be maintained simple with a reduced number of components and less assembling processes.

The frame-like retaining members 32 and 32' each made of an opaque material are mounted to the outer circumference of the outer circumferential section 10 of the base chassis 5 (see FIGS. 3, 4, and 7). Hereinafter, portions of the retaining members 32 and 32' will be referred to as outer frame structure 600, a detailed description of which will be given below.

(Regarding Structure of Outer Frame Structure 600)

Figure 29:
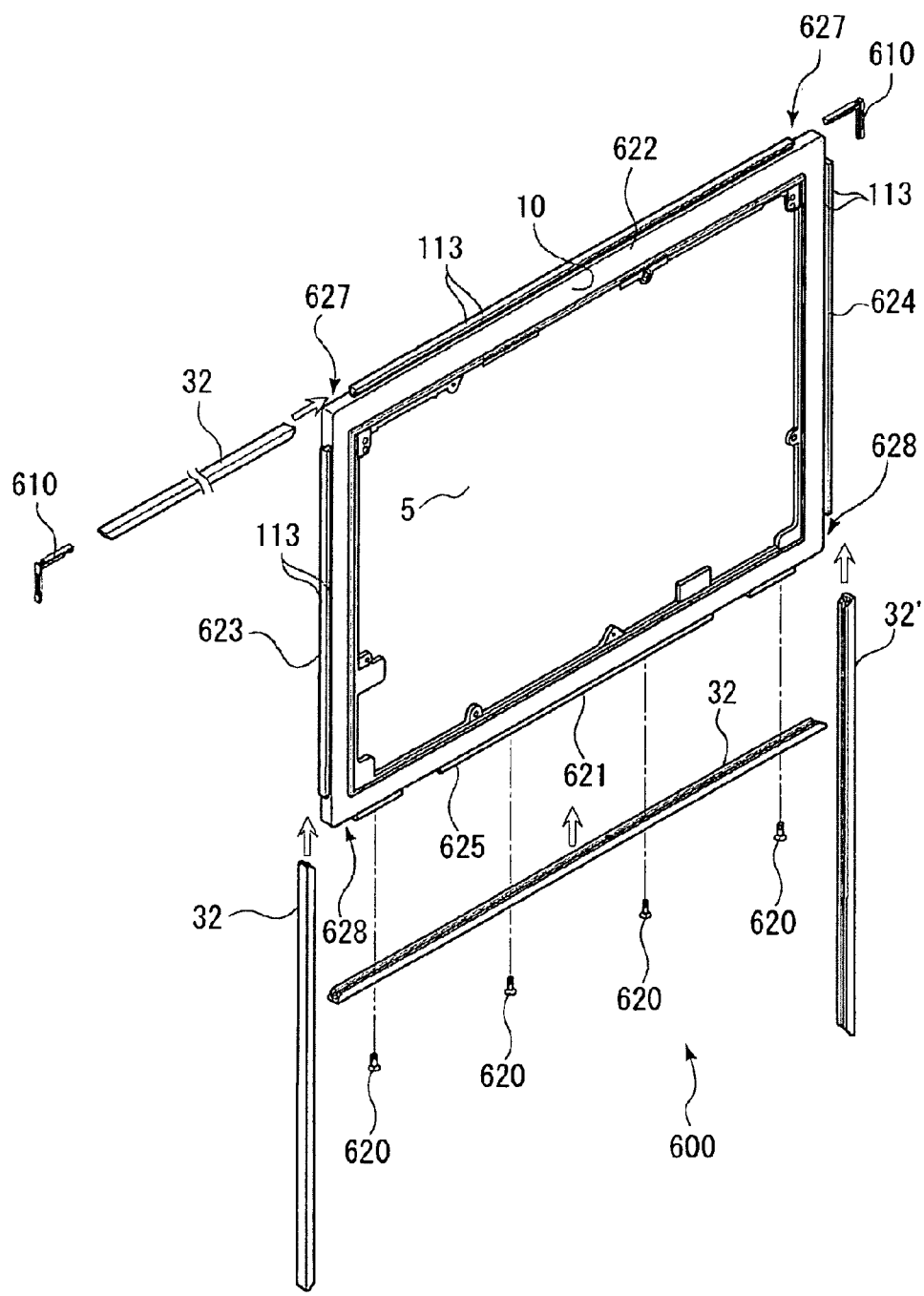
FIG. 29 is an exploded perspective view showing the base chassis and the retaining members according to this embodiment.

FIG. 29 is an exploded perspective view of the base chassis 5 and the retaining members 32 and 32'. The outer frame structure 600 includes the base chassis 5, an upper retaining member 32, a left-hand side retaining member 32, a right-hand side retaining member 32', a lower retaining member 32, an upper left-hand side coupling member 610, an upper right-hand side coupling member 610, and lower retaining member mounting screws 620.

The outer circumferential section 10 of the base chassis 5 is formed of a transparent acrylic material and is formed by injection molding, for example.

Figure 30:
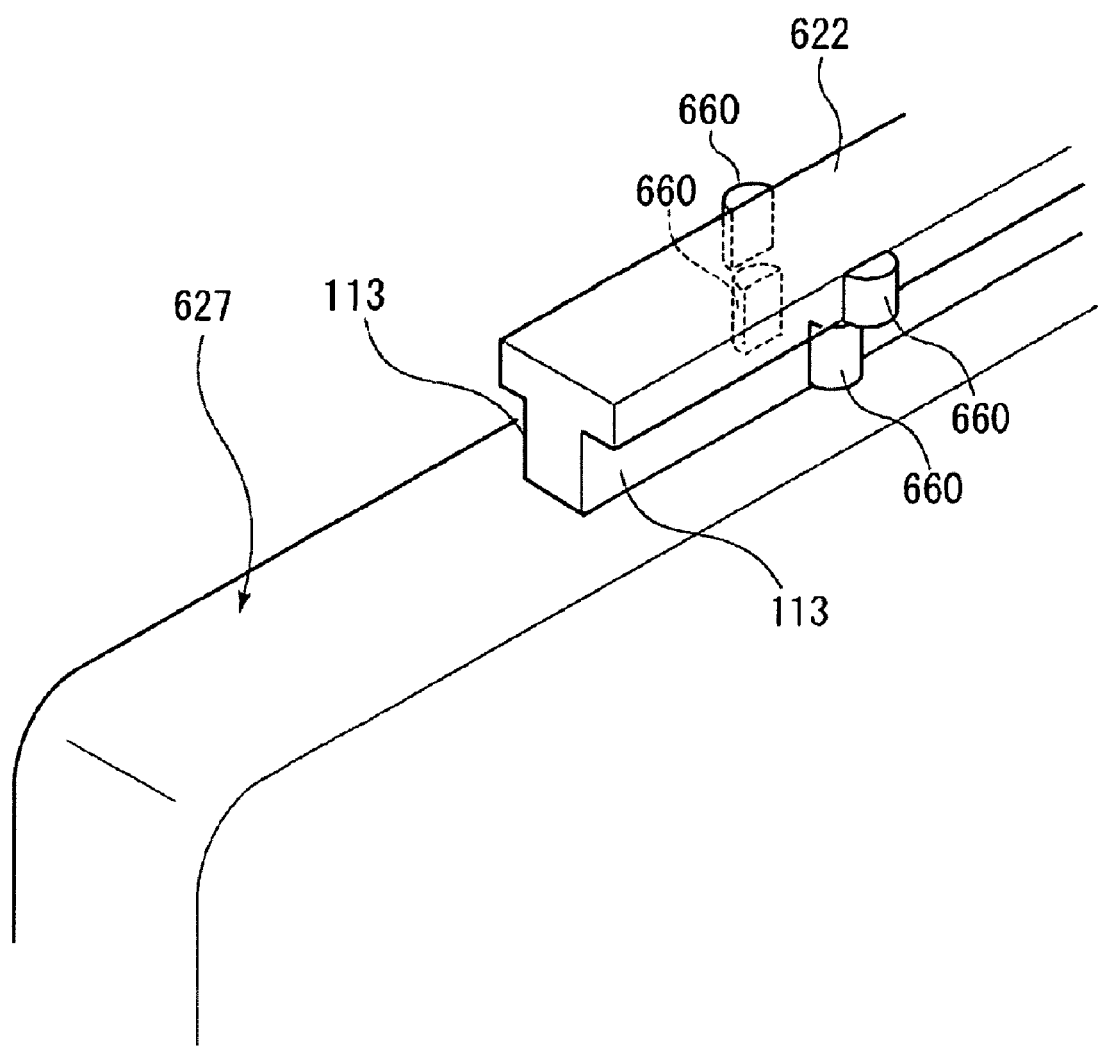
FIG. 30 is a perspective view showing a convex section for resonance prevention.

Along the outer circumference of the outer circumferential section 10 of the base chassis 5 (i.e., an upper outer circumference 622, a left-hand side outer circumference 623, and a right-hand side outer circumference 624 excluding a lower outer circumference 621), the concave sections 113 are provided on front and back surfaces of the outer circumferential section 10 of the base chassis 5, the concave sections 113 having a similar longitudinal shape as the outer circumferences 622 to 624 (see FIG. 6). Convex sections 660 for resonance prevention are provided at predetermined positions on each of the concave sections 113 (see FIG. 30). It should be noted that descriptions on the convex sections 660 for resonance prevention will be given later.

Figure 31:
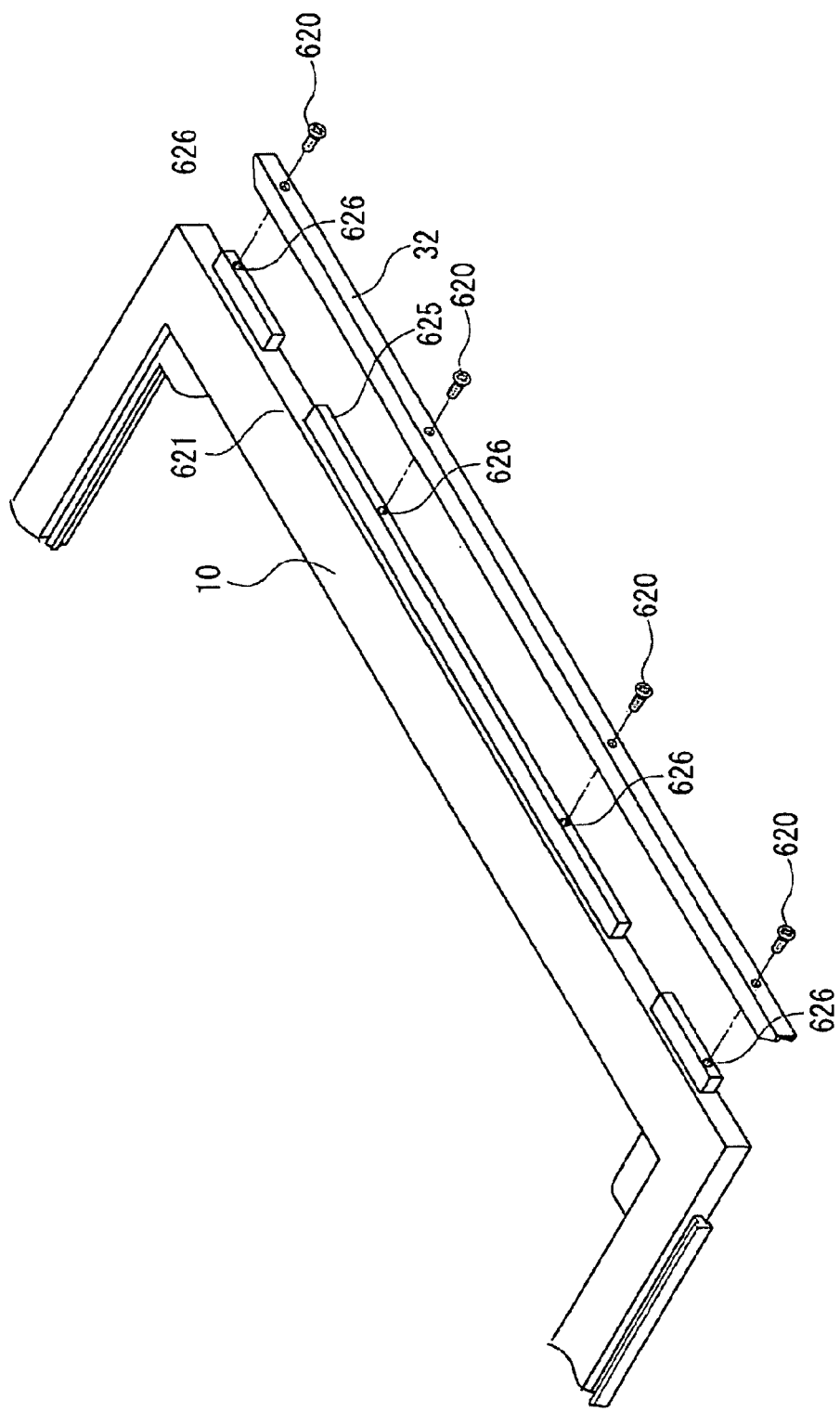
FIG. 31 is an exploded perspective view showing a lower outer circumference of an outer circumferential section of the base chassis.

Along the lower outer circumference 621 of the outer circumferential section 10 of the base chassis 5, a convex section 625 facing downward is provided on an end surface of the lower outer circumference 621. Holes 626 for screwing the lower retaining member mounting screws 620 are formed at, for example, four positions on the convex section 625 along the lower outer circumference 621 with predetermined gaps (see FIG. 31).

Figure 32:
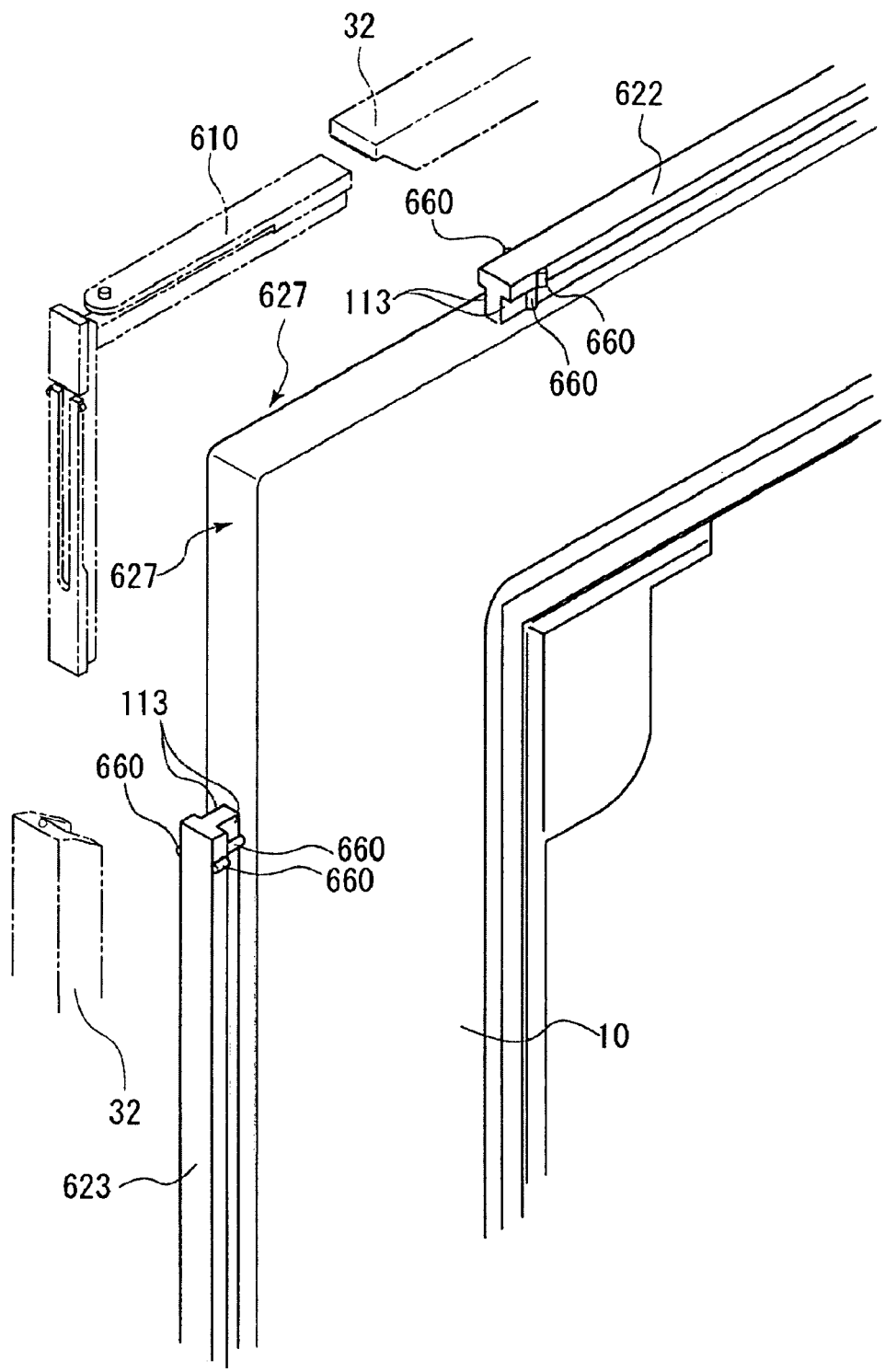
FIG. 32 is an enlarged exploded perspective view of an upper coupling space shown in FIG. 29.

Coupling spaces 627 are provided at positions corresponding to the concave sections 113 at the upper left- and right-hand corners of the base chassis 5 (see FIGS. 29 and 32). A length of each of the coupling spaces 627 is slightly longer than that on one side of each of the inverse-L-shaped upper left- and right-hand side coupling members 610.

Figure 33:
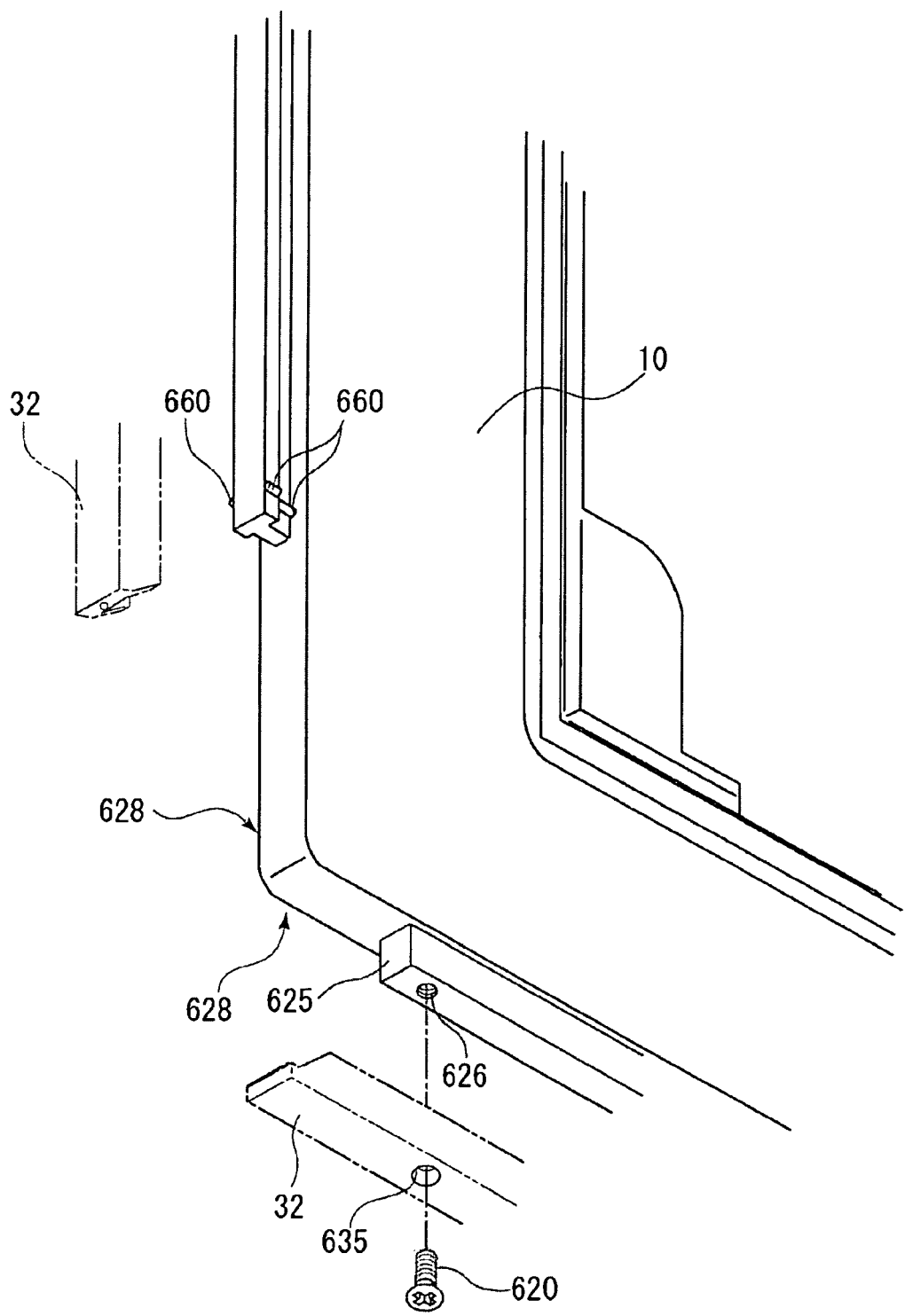
FIG. 33 is an enlarged exploded perspective view of a lower coupling space shown in FIG. 29.

Coupling spaces 628 are provided at positions corresponding to the concave sections 113 at the lower left- and right-hand corners and the convex section 625 of the base chassis 5 (see FIGS. 29 and 33). A length of each of the coupling spaces 628 in the longitudinal direction (corresponding to the concave section 113) is substantially the same as that on one side of the coupling space 627, and a length of each of the coupling spaces 628 in the lateral direction (corresponding to the convex section 625) is shorter than that on one side of the coupling space 627.

Figure 34A:
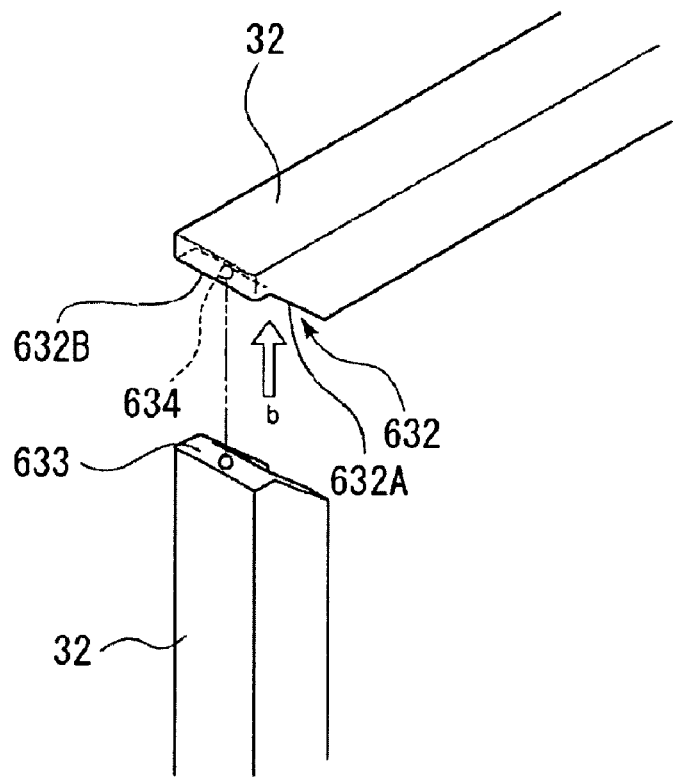
FIG. 34A is an enlarged exploded perspective view showing an upper-side retaining member and a left-hand side retaining member shown in FIG. 29.
Figure 34B:
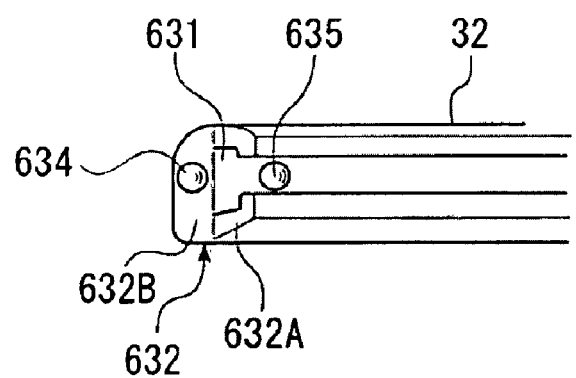
FIG. 34B is a bottom view of the upper-side retaining member.

For example, the upper retaining member 32 is made of a material containing aluminum as a main raw material, is formed by extrusion molding, and is provided with a groove section 631 having substantially the same length as that of the base chassis 5 in the lateral direction and whose cross-section is of a T-shape (see FIG. 34). The groove section 631 engages with the upper outer circumference 622 of the base chassis 5 provided with the concave sections 113 on the front and back thereof. At the left end section of the upper retaining member 32, a portion thereof corresponding to the groove section 631 is gouged up to an upper base section of the T-shaped groove section 631, to thereby provide an engaging surface 632 that engages with an upper end section of the left-hand side retaining member 32. The engaging surface 632 includes a tilting surface 632A and a horizontal surface 632B. The horizontal surface 632B of the engaging surface 632 is provided with a non-penetrating hole 634 that engages with a protruding section 633 formed on an upper end surface of the upper end section of the left-hand side retaining member 32. The upper base section of the T-shaped groove section 631 of the upper retaining member 32 in the vicinity of the left end section thereof is provided with a non-penetrating hole 635 that engages with a convex section 611 formed on the upper left-hand side coupling member 610. It should be noted that since the structure of the upper retaining member 32 on the left-hand side shown in FIG. 34 is symmetrical to that on the right-hand side, illustration and descriptions thereof will be omitted.

Figure 35:
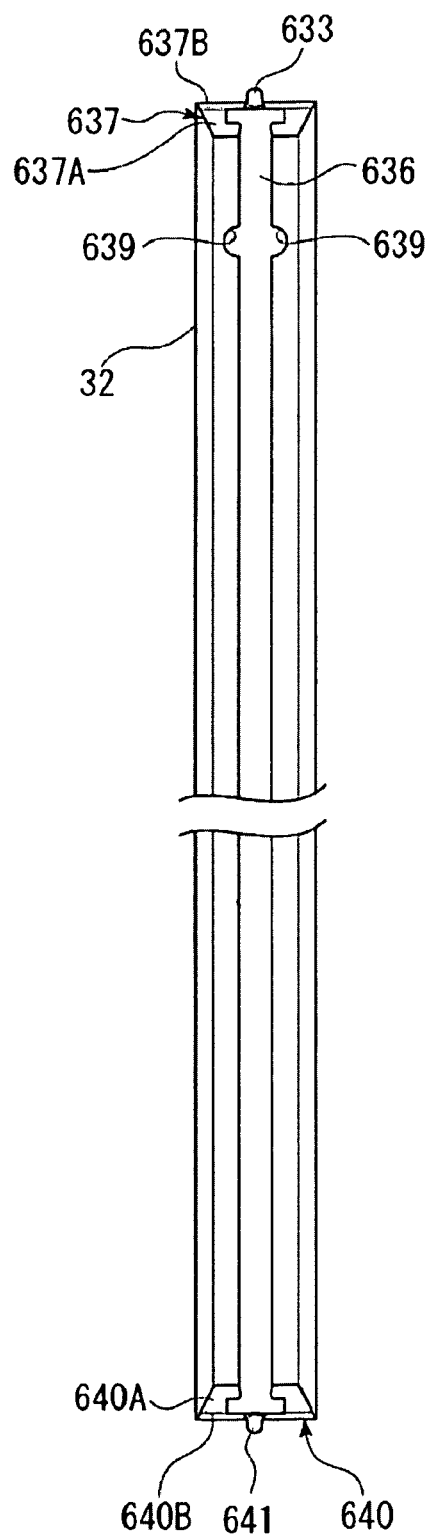
FIG. 35 is a right-hand side plan view showing the left-hand side retaining member shown in FIG. 29.

For example, the left-hand side retaining member 32 is made of a material containing aluminum as a main raw material, is formed by extrusion molding, and is provided with a groove section 636 having a length substantially the same as a height of the base chassis 5 and whose cross-section is of a T-shape (see FIG. 35). The groove section 636 engages with the left-hand side outer circumference 623 of the base chassis 5 provided with the concave sections 113 on the front and back thereof. The upper end section of the left-hand side retaining member 32 is provided with an engaging surface 637 that engages with the engaging surface 632 of the upper retaining member 32. The engaging surface 637 includes a tilting surface 637A and an upper end surface 637B. The upper end surface 637B of the left-hand side retaining member 32 is provided with the protruding section 633 that engages with the non-penetrating hole 634 of the upper retaining member 32. Wall surfaces on both sides of the T-shaped groove section 636 of the left-hand side retaining member 32 in the vicinity of the upper end section thereof are provided with engaging grooves 639 that respectively engage with convex sections 612 formed on the upper left-hand side coupling member 610. The lower end section of the left-hand side retaining member 32 is provided with an engaging surface 640 that engages with an engaging surface 645 of the lower retaining member 32. The engaging surface 640 includes a tilting surface 640A and a lower end surface 640B. The lower end surface 640B of the left-hand side retaining member 32 is provided with a protruding section 641 that engages with a non-penetrating hole 643 of the lower retaining member 32. It should be noted that since the structure of the left-hand side retaining member 32 shown in FIG. 35 is symmetrical to that of the right-hand side retaining member 32', illustration and descriptions thereof will be omitted.

Figure 36A:
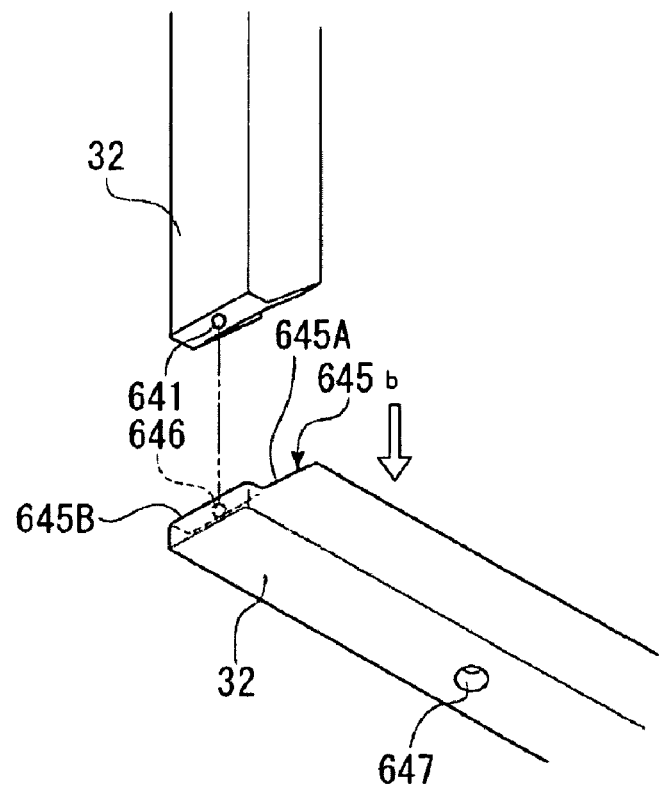
FIG. 36A is an enlarged exploded perspective view showing a lower-side retaining member and the left-hand side retaining member shown in FIG. 29.
Figure 36B:
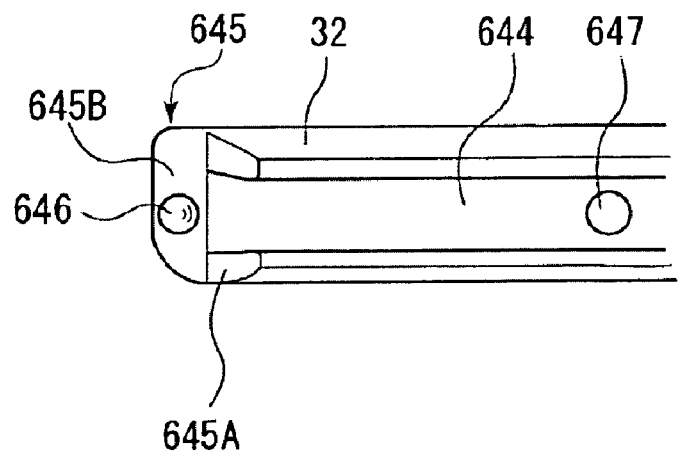
FIG. 36B is a bottom view of the lower-side retaining member.

For example, the lower retaining member 32 is made of a material containing aluminum as a main raw material, is formed by extrusion molding, and is provided with a groove section 644 having substantially the same length as that of the base chassis 5 in the lateral direction and whose cross-section is concave (see FIG. 36). The groove section 644 engages with the convex section 625 formed on the lower end of the lower outer circumference 621 of the base chassis 5. At the left end section of the lower retaining member 32, a portion thereof corresponding to the groove section 644 is gouged up to a lower base section of the concave groove section 644, thereby providing the engaging surface 645 that engages with the lower end section of the left-hand side retaining member 32. The engaging surface 645 includes a tilting surface 645A and a horizontal surface 645B. The horizontal surface 645B of the engaging surface 645 is provided with a non-penetrating hole 646 that engages with the protruding section 641 formed on the lower end surface of the lower end section of the left-hand side retaining member 32. Penetrating holes 647 through which the lower retaining member mounting screws 620 penetrate are formed at predetermined positions, e.g., four positions, on the lower base section of the concave groove section 644. It should be noted that since the structure of the lower retaining member 32 on the left-hand side shown in FIG. 36 is symmetrical to that on the right-hand side, illustration and descriptions thereof will be omitted.

Figure 37:
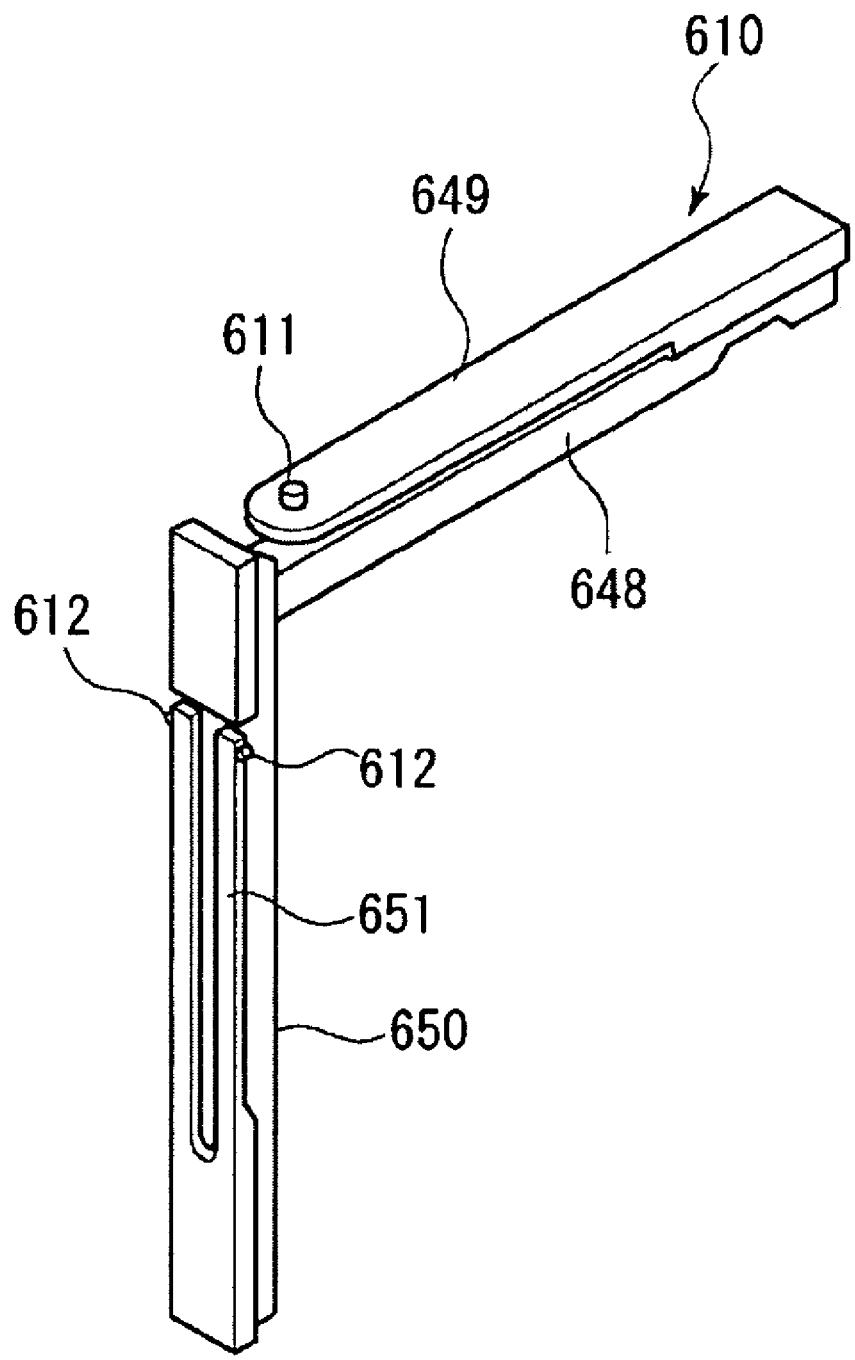
FIG. 37 is a perspective view showing a coupling member shown in FIG. 29.

The upper left-hand side coupling member 610 is made of a plastic material having a certain level of elastic force (e.g., POM), and has an inverse-L shape with a cross-section thereof having an inward convex structure (see FIG. 37). A horizontal section 648 of the inverse-L-shaped upper left-hand side coupling member 610 includes a cantilever supporting section 649 having an open end toward a corner of the inverse-L shape. The convex section 611 that engages with the non-penetrating hole 635 of the upper retaining member 32 is provided on an upper surface of a tip end section of the cantilever supporting section 649. The thus structured cantilever supporting section 649 enables the convex section 611 to be displaced in the vertical direction using elastic force.

A vertical section 650 of the inverse-L-shaped upper left-hand side coupling member 610 includes a cantilever supporting section 651 having an open end toward the corner of the inverse-L shape. The cantilever supporting section 651 is branched into two from the open-end side (it can also be considered that two cantilever supporting sections 651 are provided in parallel). The tip end section of the cantilever supporting section 651 is provided with on both sides thereof the convex sections 612 that respectively engage with the engaging grooves 639 of the left-hand side retaining member 32. The thus structured cantilever supporting section 651 enables the convex sections 612 to be displaced in both the vertical and lateral directions using elastic force. It should be noted that since the structure of the upper left-hand side coupling member 610 shown in FIG. 37 is symmetrical to that of the upper right-hand side coupling member 610, illustration and descriptions thereof will be omitted.

By providing the coupling members as positioning components at the upper sections as described above, the gaps between the retaining members can respectively be managed with the same components having short lengths. Accordingly, it becomes possible to manage small gaps with light insertions.

(Regarding Assembling Method of Outer Frame Structure 600)

Descriptions will be given on an example of an assembling method for the outer frame structure 600, the components of which being structured as described above (see FIG. 29).

(1) The groove section 631 of the upper retaining member 32 is engaged with the upper outer circumference 622 of the base chassis 5.

(2) The upper left-hand side coupling member 610 and the upper right-hand side coupling member 610 are respectively inserted on both sides of the upper retaining member 32, and the protruding section 633 is engaged with the non-penetrating hole 634 of the upper retaining member 32.

(3) The left-hand side retaining member 32 and the right-hand side retaining member 32' are respectively inserted upward to the left-hand side outer circumference 623 and the right-hand side outer circumference 624 of the base chassis 5 from below, and tips of the left-hand side retaining member 32 and the right-hand side retaining member 32' are respectively inserted to the upper left-hand side coupling member 610 and the upper right-hand side coupling member 610. The engaging surfaces 637 at the upper end sections of the left-hand side retaining member 32 and the right-hand side retaining member 32' respectively engage with the engaging surfaces 632 of the upper retaining member 32. At this time, the engaging grooves 639 of the left-hand side retaining member 32 and the right-hand side retaining member 32' respectively engage with the convex sections 612 of the upper left-hand side coupling member 610 and the upper right-hand side coupling member 610. Moreover, the protruding sections 633 at the upper end sections of the left-hand side retaining member 32 and the right-hand side retaining member 32' respectively engage with the non-penetrating holes 634 of the upper retaining member 32.

(4) The lower retaining member 32 is inserted upward to the lower outer circumference 621 of the base chassis 5 from below. At this time, the groove section 644 of the lower retaining member 32 engages with the convex section 625 of the base chassis 5. Moreover, the engaging surfaces 645 on both ends of the lower retaining member 32 respectively engage with the lower end sections of the left-hand side retaining member 32 and the right-hand side retaining member 32'. Then, the non-penetrating holes 646 of the engaging surfaces 645 respectively engage with the protruding sections 641 of the left-hand side retaining member 32 and the right-hand side retaining member 32'.

(5) The lower retaining member mounting screws 620 are screwed to the holes 626 of the base chassis 5 via the penetrating holes 647 of the lower retaining member 32, to thereby fix the lower retaining member 32 onto the base chassis 5. The screwing from the bottom as described above stabilizes all mountings since the bottom surface is solely an area invisible by the user in the set. Employment of self-tap screws made of a resin, for example, as the lower retaining member mounting screws 620 bears an effect that the left- and right-side retaining members 32 and 32' and the lower retaining member 32 can be fixed to the base chassis 5 even when there are overlaps to a certain degree. Thus, it becomes possible to slightly push the left- and right-side retaining members 32 and 32' and the lower retaining member 32 upward due to the screwing, with the result that the gaps at the lower section can also be managed and maintained at small vales.

(Regarding Effect of Outer Frame Structure 600)

In the case where the upper retaining member 32, the left-hand side retaining member 32, and the right-hand side retaining member 32' are screwed to the base chassis 5, for example, positional relationships of the upper retaining member 32 with the left-hand side retaining member 32 and the right-hand side retaining member 32' are determined based on positions of holes for screwing. However, the positional relationships cannot be made so precise with ordinary processing precision. Therefore, the possibility of gaps being generated at a portion where the upper retaining member 32 and the left-hand side retaining member 32 are connected and a portion where the upper retaining member 32 and the right-hand side retaining member 32' are connected is high, resulting in an impair in appearance. In addition, also the exposure of the screws to the user is highly likely to impair the appearance.

In view of the above, in the outer frame structure 600 according to this embodiment, because the upper retaining member 32 is fixed to the left-hand side retaining member 32 and the right-hand side retaining member 32' using the upper left-hand side coupling member 610 and the upper right-hand side coupling member 610, respectively, the positional relationships of the upper retaining member 32 with the left-hand side retaining member 32 and the right-hand side retaining member 32' are determined irrespective of the processing in the base chassis 5. Therefore, the possibility of gaps being generated at the portion where the upper retaining member 32 and the left-hand side retaining member 32 are connected and the portion where the upper retaining member 32 and the right-hand side retaining member 32' are connected becomes lower. In addition, because the coupling spaces 627 are respectively provided at the upper left- and right-hand corners of the base chassis 5 and the upper retaining member 32 is coupled to the left-hand side retaining member 32 and the right-hand side retaining member 32' at the coupling spaces 627, marginal spaces for coupling are generated that much, whereby the possibility of gaps being generated at the portion where the upper retaining member 32 and the left-hand side retaining member 32 are connected and the portion where the upper retaining member 32 and the right-hand side retaining member 32' are connected becomes additionally lower. Furthermore, since the screws are not used, the appearance is unimpaired.

Further, even though the lower retaining member 32 is structured to be screwed, because the screws are positioned at the lower end section, the screws are not seen from the user and the appearance is thus unimpaired. In addition, because the coupling spaces 628 are respectively provided at the lower left- and right-hand corners of the base chassis 5, certain amount of marginal spaces are generated by the coupling spaces 628 when the lower retaining member 32 is coupled to the left-hand side retaining member 32 and the right-hand side retaining member 32', whereby the possibility of gaps being generated at the portion where the lower retaining member 32 and the left-hand side retaining member 32 are connected and the portion where the lower retaining member 32 and the right-hand side retaining member 32' are connected becomes additionally lower. Thus, even when the lower retaining member 32 is structured to be screwed, the appearance is unimpaired.

(Regarding Convex Sections 660 for Resonance Prevention)

In the case of the outer frame structure 600 described above, the upper retaining member 32, the left-hand side retaining member 32, and the right-hand side retaining member 32' are not necessarily fixed firmly to the base chassis 5. Therefore, the upper retaining member 32, the left-hand side retaining member 32, and the right-hand side retaining member 32' resonate due to audible sounds output from the speakers, thereby generating abnormal noises. The object above has been newly found when the outer frame structure 600 is structured as described above.

The specifics are as follows. It should be noted that materials used are as already described.

(1) Upper Retaining Member 32
Length: 485 mm
Depth: 6 mm
Height: 5 mm
Maximum width of T-shaped groove: 3.3 mm
Minimum width of T-shaped groove: 2.0 mm (2) Left- and Right-hand Side Retaining Members 32 and 32'
Length: 375 mm
Depth: 6 mm
Height: 5 mm
Maximum width of T-shaped groove: 3.3 mm
Minimum width of T-shaped groove: 2.0 mm (3) Base Chassis 5
Maximum thickness of outer circumference: 3 mm
Minimum thickness of outer circumference (position at which front and back thereof correspond to concave sections): 1.5 mm An output of audible sounds from the speakers under the above conditions caused resonance at 160 Hz and 300 Hz. A resonance mode was in a rotational direction with longitudinal directions of the respective retaining members 32 and 32' as axes.

Here, a height of each of the convex sections 660 for resonance prevention is set to 0.15 mm, and the convex sections 660 are respectively provided at a bottom section and tip end section on both front and back of each of the concave sections 113 on the outer circumference.

Further, an interval between the convex sections 660 for resonance prevention in the longitudinal direction is set to 125 mm. The convex sections 660 for resonance prevention are provided at four places on the upper retaining member 32 and are provided at three places on the left-hand side retaining member 32 and the right-hand side retaining member 32'. Accordingly, no resonance is generated to cause abnormal noises. It should be noted that resonance is not caused as long as the interval between the convex sections 660 for resonance prevention in the longitudinal direction is within a range of 100 mm to 150 mm.

As described above, the frame-like retaining members 32 and 32' each made of an opaque material are mounted on the outer circumference of the base chassis 5 (see FIGS. 3, 4, and 7). The retaining members 32 and 32' are formed of a thin plate-like metal material such as aluminum (see FIGS. 6, 13, and 18). Each of the retaining members 32 and 32' is composed of a lower surface section 33 and protruding surface sections 34 protruding upward from both front and back ends of the lower surface section 33. Tip end sections of the protruding surface sections 34 opposite to lower surface sections thereof are structured to fit with the concave sections 113 of the base chassis 5.

By mounting the frame-like retaining members 32 and 32' to the base chassis 5, the concave sections 113 of the base chassis 5 and the outer circumference of the base chassis 5 positioned on an outer side of the concave sections 113 are covered by a space 39 defined by the lower surface section 33 and the protruding surface sections 34. As shown in FIGS. 3 and 4, four retaining members 32 and 32' are respectively provided to hems of the rectangular base chassis 5. The retaining member 32' corresponding to the hem provided with operation buttons 410 to 419 among the four retaining members has a shape partially different from that of the other retaining members 32. When looking at the electronic apparatus 1 plane-wise, a tip end section of each of the protruding surface sections 34 is formed such that a ground electrode 420 of a touchpad electrode substrate 400 is partially covered by the retaining member 32'.

Moreover, as described above, when assembling the electronic apparatus 1, the retaining members 32 and 32' are caused to slide along the respective hems of the base chassis 5 corresponding thereto as shown in FIG. 6, to thereby fit the retaining members 32 and 32' to the outer circumference of the base chassis 5 including the concave sections 113. Provision of the groove-like concave sections 113 as described above enables the retaining members 32 and 32' to be prevented from moving in the front-back direction.

Inserting holes 35 are formed three each at ends on both the left- and right-hand sides of the lower surface section 33 of the retaining member 32 corresponding to the lower hem of the base chassis 5. Each of the inserting holes 35 is formed by laterally coupling a broad section 35a and a narrow section 35b having a smaller width than the broad section 35a in the front-back direction.

Figure 14:
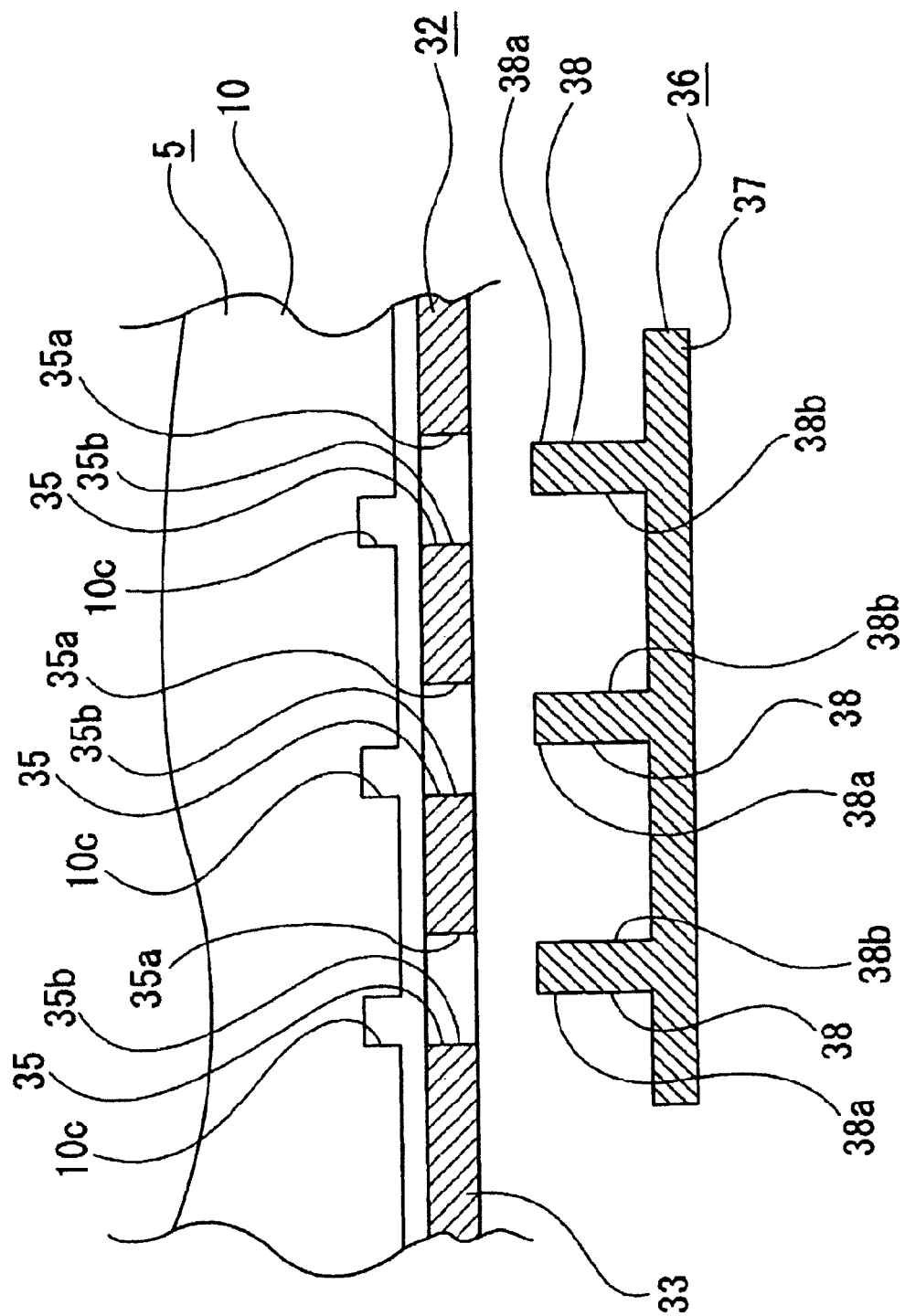
FIG. 14 is an enlarged sectional view showing the mounting pad and the retaining member before the mounting pad is mounted to the retaining member.

The retaining member 32 on the lower hem is mounted so as to cover a mounting notch 10b formed in the base chassis 5. In the state where the retaining member 32 is mounted to the base chassis 5, a certain gap is formed between the lower surface section 33 and the lower surface of the base chassis 5 (see FIG. 14). In the state where the retaining member 32 is mounted to the base chassis 5, the narrow sections 35b of the inserting holes 35 are positioned right below the respective concave retaining sections 10c of the base chassis 5.

A mounting pad 36 is mounted to the retaining member 32 (see FIG. 13). The mounting pad 36 has a horizontally-placed plate-like mounting surface section 37 facing upward and to-be-retained sections 38 integrally formed by using a material having elasticity, such as rubber, the to-be-retained sections 38 protruding upward from the mounting surface section 37. The to-be-retained sections 38 are isolated from each other in the lateral direction. Each of the to-be-retained sections 38 is formed by vertically coupling a to-be-inserted section 38a and a bundled section 38b having a smaller width than the to-be-inserted section 38a in the front-back direction. A width of the bundled section 38b in the front-back direction is formed to be substantially the same as that of the narrow section 35b of the retaining member 32.

The mounting pad 36 is mounted to the retaining member 32 as follows (see FIGS. 15 and 16).

First, while the retaining member 32 is mounted to the base chassis 5 (see FIG. 14), the to-be-retained sections 38 of the mounting pad 36 are respectively inserted into the broad sections 35a of the inserting holes 35 of the retaining member 32, and the to-be-retained sections 38 are firmly pushed upward against the lower surface of the base chassis 5.

Figure 15:
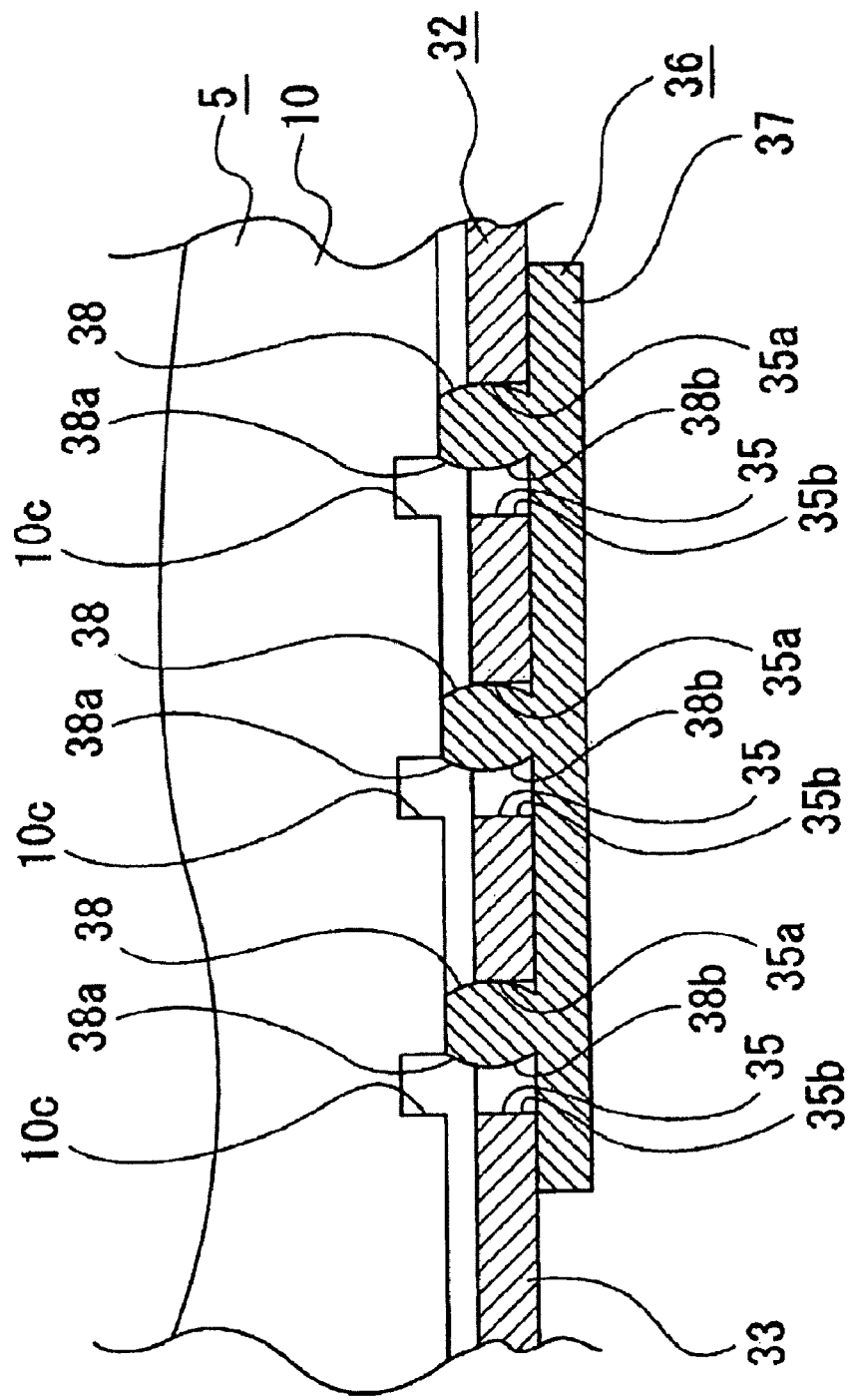
FIG. 15 is an enlarged sectional view showing the mounting pad and the retaining member in midst of mounting the mounting pad to the retaining member.
Figure 16:
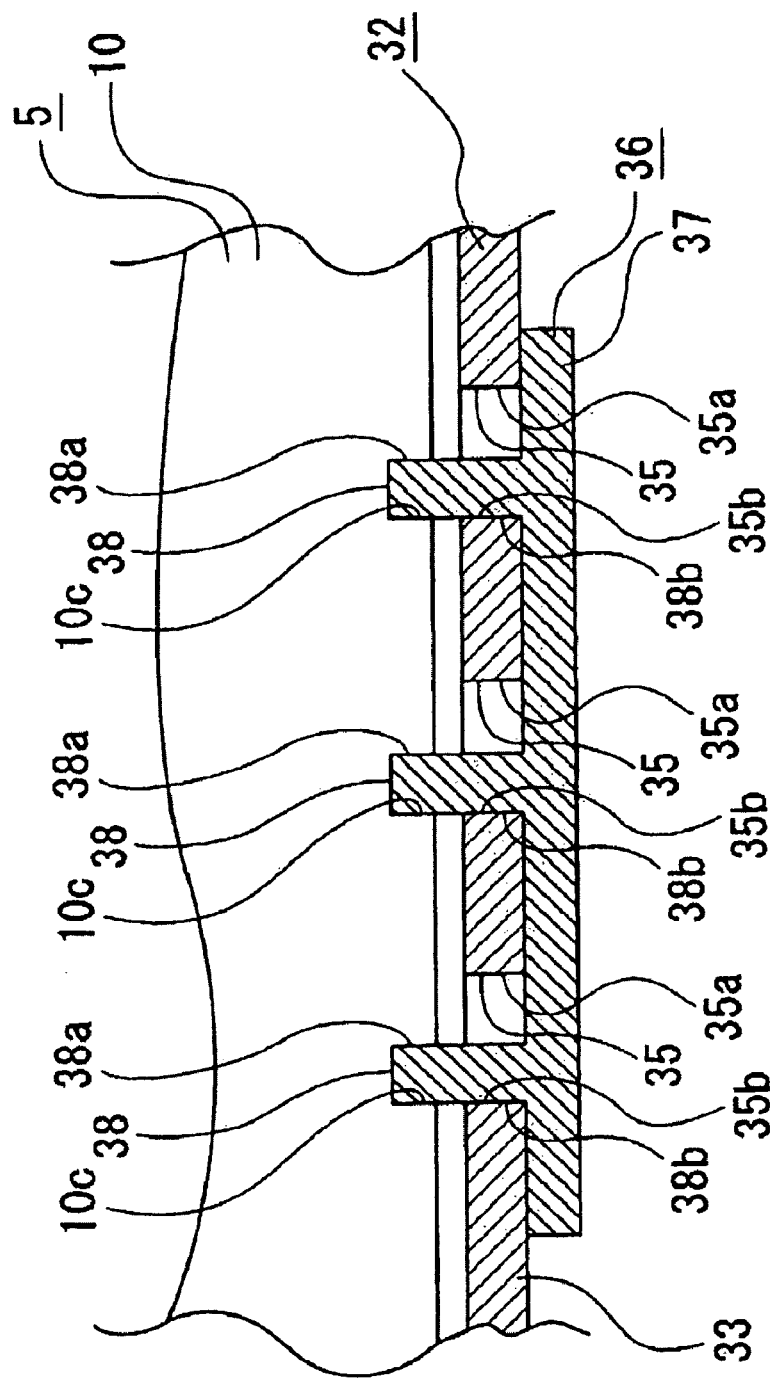
FIG. 16 is an enlarged sectional view showing the mounting pad and the retaining member after the mounting pad has been mounted to the retaining member.

When the to-be-retained sections 38 are firmly pushed upward against the lower surface of the base chassis 5, the to-be-retained sections 38 are elastically deformed to be squished from the upward and downward directions (see FIG. 15).

When sliding the mounting pad 36 sideways in this state, the bundled sections 38b are respectively inserted into the narrow sections 35b, and the to-be-inserted sections 38a are positioned in correspondence with the concave retaining sections 10c of the base chassis 5. Therefore, the to-be-retained sections 38 are restored from the elastic deformation, and the to-be-inserted sections 38a are respectively inserted into the concave retaining sections 10c (see FIG. 16). The mounting pad 36 is thus mounted to the retaining member 32.

As will be described later, the mounting surface section 37 of the mounting pad 36 mounted to the retaining member 32 is brought into contact with a mounting surface of a desk or the like on which the electronic apparatus 1 is mounted.

As described above, in the electronic apparatus 1, the retaining member 32 is mounted to the lower end section of the base chassis 5 and the mounting pad 36 having elasticity is mounted to the retaining member 32 so that the mounting surface section 37 is brought into contact with the mounting surface of the desk or the like on which the electronic apparatus 1 is mounted. Thus, it is possible to stabilize a mounting status of the electronic apparatus 1 on the mounting surface.

Further, because the mounting pad 36 is in contact with the mounting surface, the mounting surface and the lower end section of the base chassis 5 are prevented from being damaged.

As shown in FIGS. 1 and 2, the rectangular base chassis 5 made of a transparent material is of a shape that extends out from the outer circumference of the display unit 6 in the electronic apparatus 1, and the outer circumference of the base chassis 5 is positioned so as to surround the display unit 6. The operation buttons 410 to 419 are provided on the right-hand side of the display unit 6.

Although the operation buttons 410 to 419 are provided on the right-hand side of the display unit 6 in this embodiment, modifications in design can of course be suitably made, such as providing the operation buttons 410 to 419 on the left-hand side of the display unit 6 or above or below the display unit 6. Moreover, the base chassis 5 is not limited to the shape that extends out from the rectangular display unit 6 on all four hems thereof, and a shape in which the base chassis 5 partially extends out from the display unit 6, that is, a shape in which the base chassis 5 extends out from only the upper and lower hems or the left- and right-hand side hems may be employed, for example.

By thus providing the operation buttons 410 to 419 on the base chassis 5 adjacent to the display unit 6, intuitiveness in operation is enhanced. Further, because it is unnecessary to provide a music reproduction operation inputting section to the keyboard 3, the keyboard design can be maintained simple without the music reproduction operation inputting section, resulting in an improvement in keyboard design.

Figure 17:
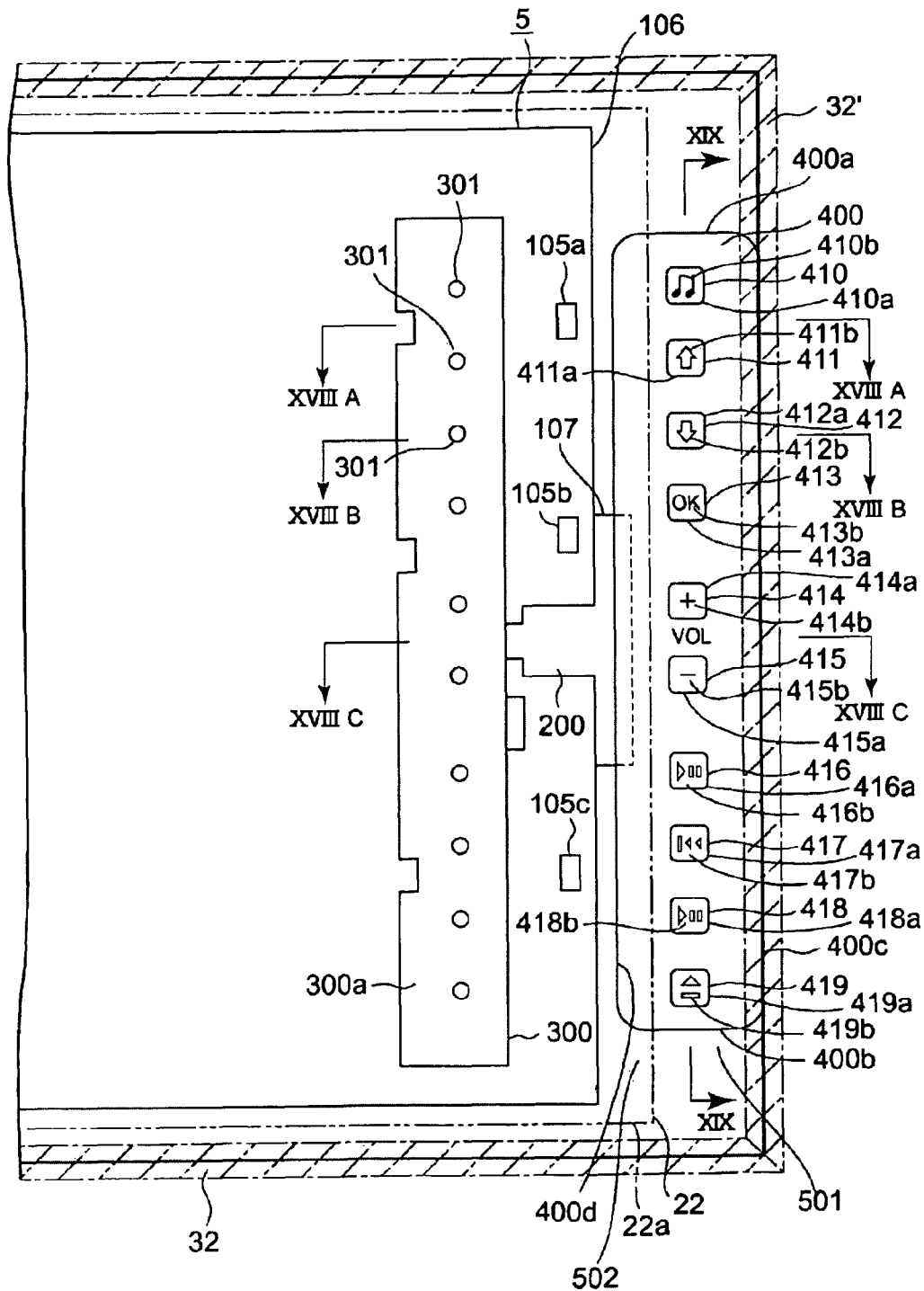
FIG. 17 is a partial plan view showing a vicinity of a touchpad electrode substrate provided with operation buttons of the base chassis, and also showing a state where a flexible wiring substrate is extended for the purpose of facilitating illustration of a structure of a circuit board and a configuration of the flexible wiring substrate.

FIG. 17 is a partially enlarged plan view showing a vicinity of the operation buttons 410 to 419 of the base chassis 5. In FIG. 17, the base chassis 5 is illustrated with a solid line, the retaining members 32 and 32' with dashed lines, and a circumferential section 22a of the front panel 22 with chain double-dashed lines. In the electronic apparatus 1, a flexible wiring substrate 200 for electrically connecting the circuit board 300 and the touchpad electrode substrate 400 on which a transparent electrode of each of the operation buttons 410 to 419 is provided is bent, and the circuit board 300 is provided such that a plane thereof becomes parallel to the coupling section 12 of the base chassis 5. For ease in describing the respective components, FIG. 17 illustrates a state where the flexible wiring substrate 200 is not bent, and the flexible wiring substrate 200, the circuit board 300, and the touchpad electrode substrate 400 are arranged on substantially the same plane.

Figure 18A:
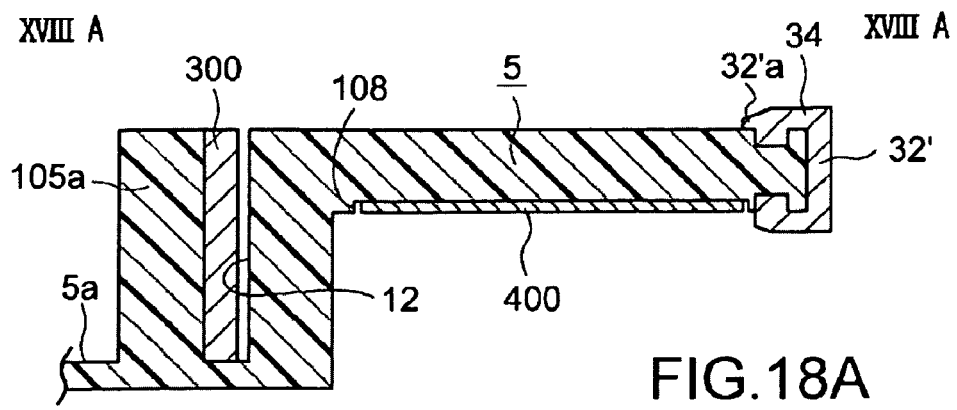
FIG. 18A is a schematic enlarged sectional view taken along the line XVIIIA-XVIIIA of FIG. 17.
Figure 18B:
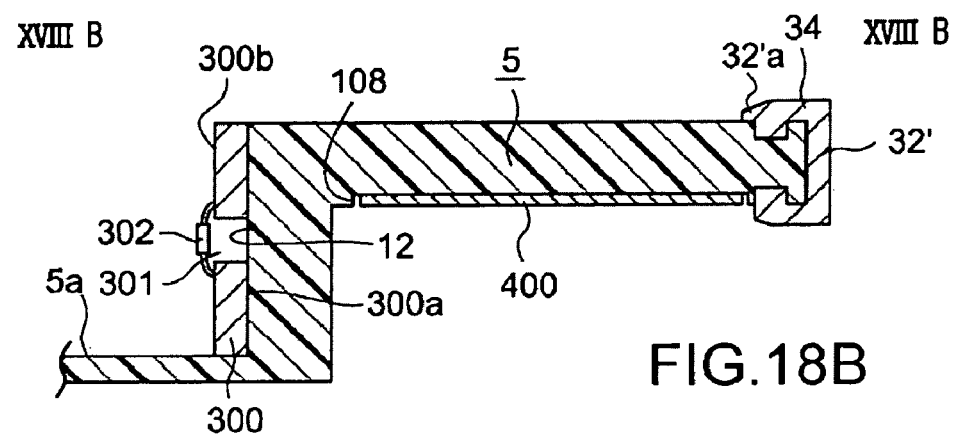
FIG. 18B is a schematic enlarged sectional view taken along the line XVIIIB-XVIIIB of FIG. 17.
Figure 18C:
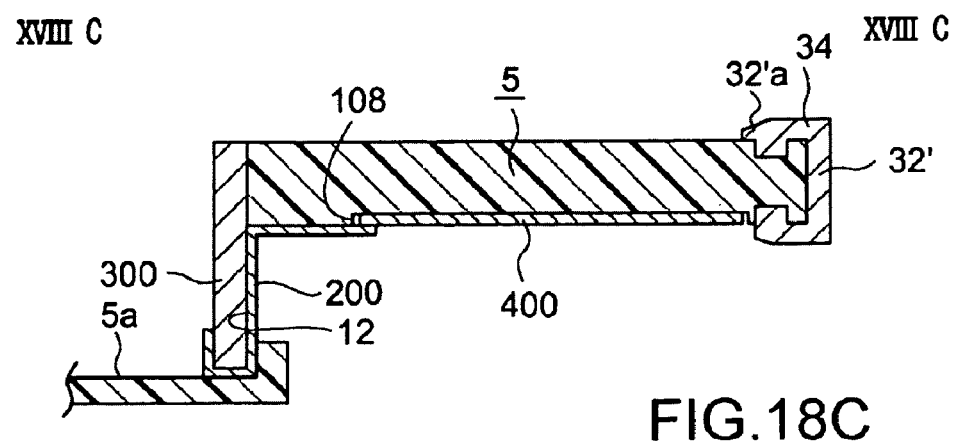
FIG. 18C is a schematic enlarged sectional view taken along the line XVIIIC-XVIIIC of FIG. 17, all of which illustrate a state where the flexible wiring substrate is folded.

FIG. 18A is a schematic sectional view taken along the line XVIIIA-XVIIIA of FIG. 17, FIG. 18B is a schematic sectional view taken along the line XVIIIB-XVIIIB of FIG. 17, and FIG. 18C is a schematic sectional view taken along the line XVIIIC-XVIIIC of FIG. 17, all of which illustrate a state where the electronic apparatus 1 is assembled. In FIG. 18, the flexible wiring substrate 200 is bent, and a plane of the circuit board 300 is arranged substantially in parallel to the plane of the coupling section 12.

Figure 19:
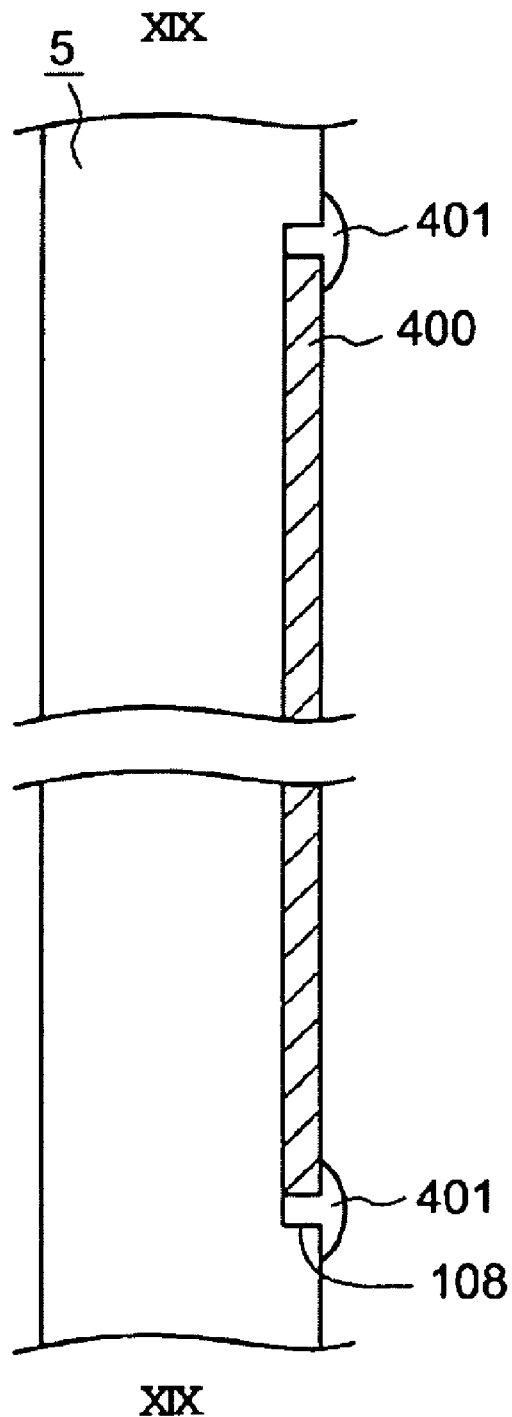
FIG. 19 is a schematic sectional view taken along the line XIX-XIX of FIG. 17.

FIG. 19 is a schematic sectional view taken along the line XIX-XIX of FIG. 17.

Figure 20:
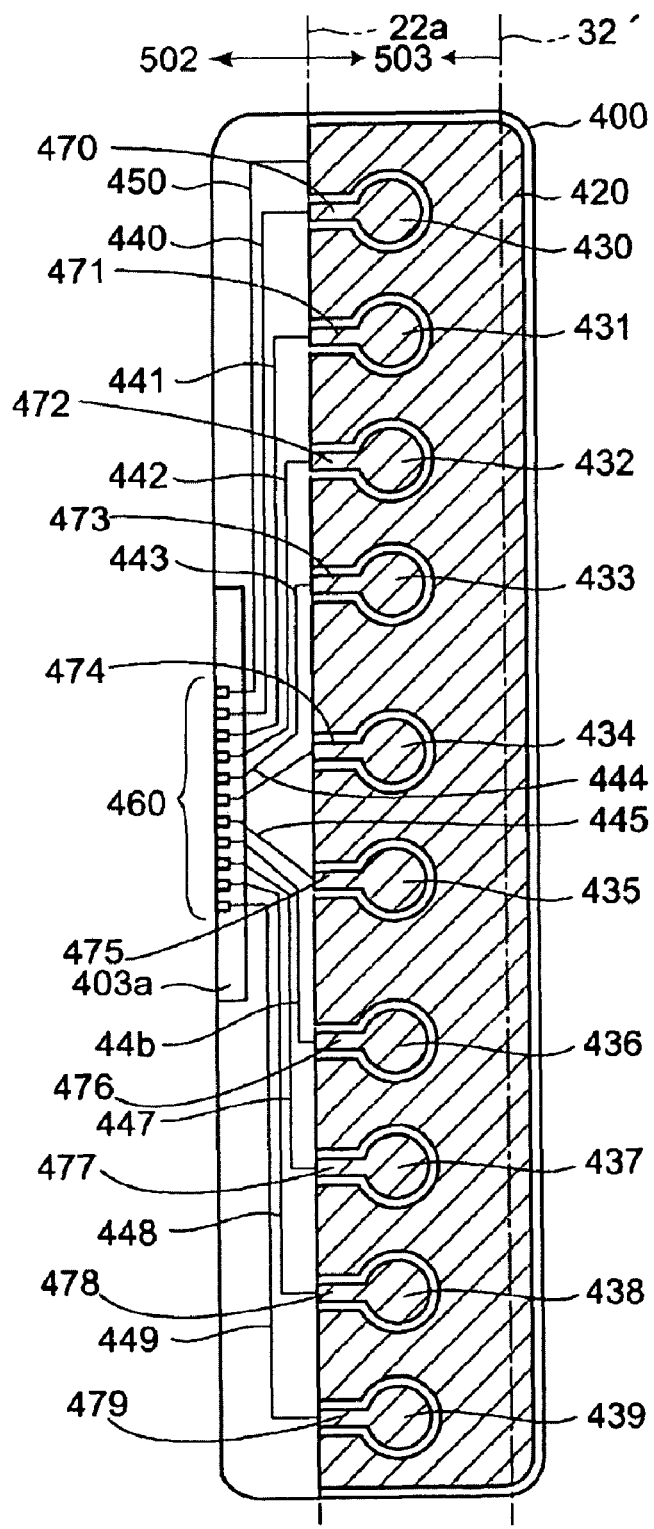
FIG. 20 is a schematic plan view showing a wiring status of the touchpad electrode substrate.

FIG. 20 is a plan view showing a wiring status of the touchpad electrode substrate 400.

Figure 21:
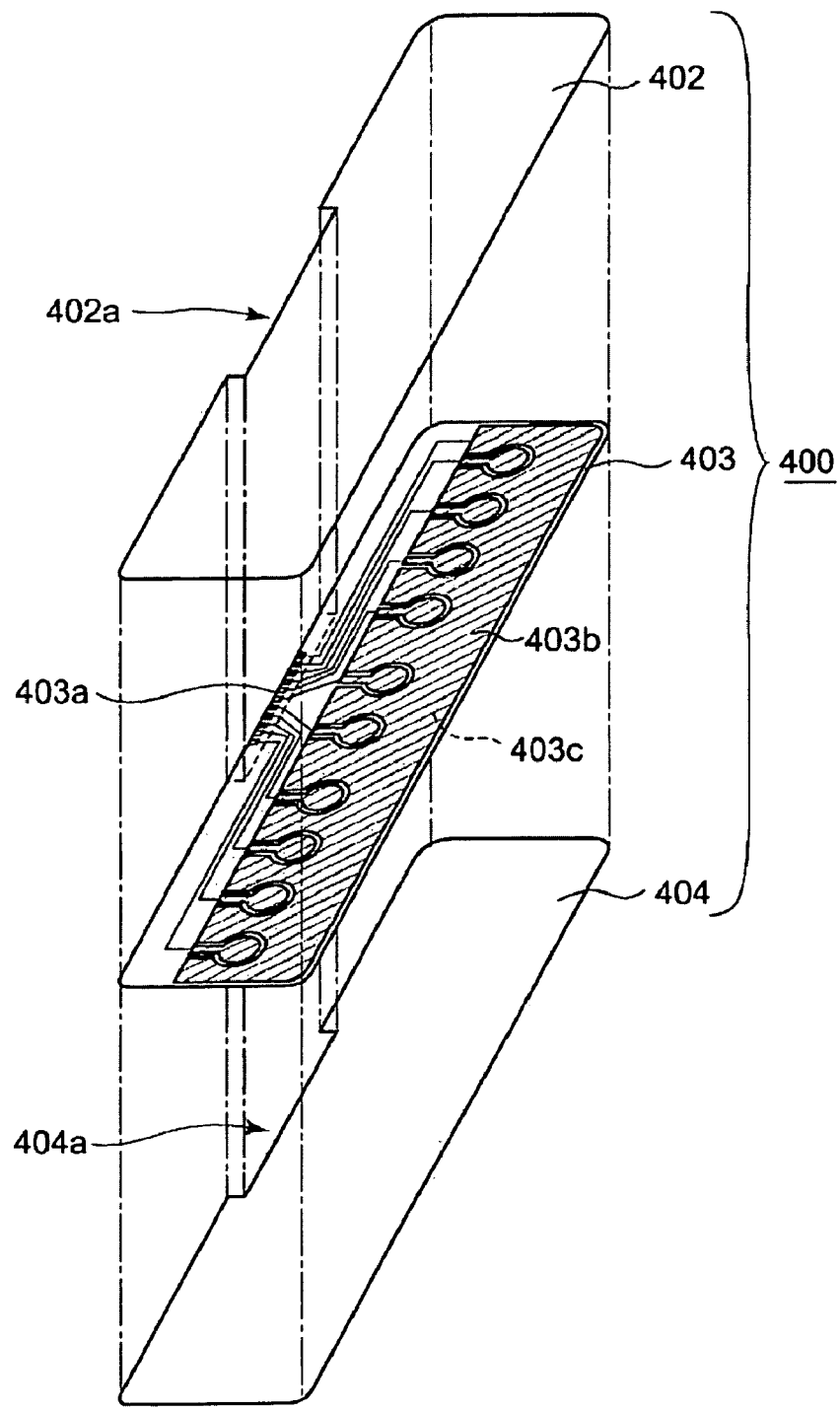
FIG. 21 is a perspective view showing the touchpad electrode substrate.

FIG. 21 is a schematic perspective view showing the touchpad electrode substrate 400.

Figure 22:
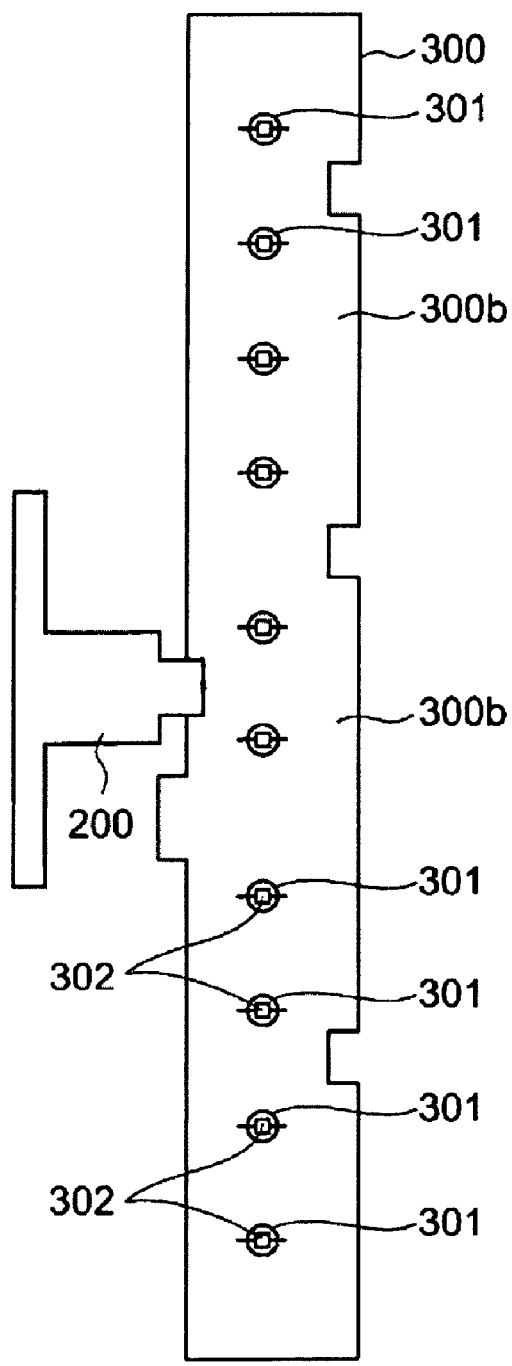
FIG. 22 is a plan view showing the flexible wiring substrate and the circuit board on a B surface side.

FIG. 22 is a schematic plan view showing the circuit board 300 and the flexible wiring substrate 200 of this embodiment. FIG. 17 illustrates an A surface 300a side of the circuit board 300, whereas FIG. 22 illustrates a B surface 300b side thereof opposed to the A surface 300a.

As shown in FIGS. 1 to 4 and 17, the base chassis 5 is provided with the operation buttons 410 to 419. As shown in FIGS. 17 and 20, the plurality of operation buttons 410 to 419 are provided along the outer circumference of a first region 501 of the base chassis 5, the first region 501 of the base chassis 5 extending out from one hem of the rectangular display unit 6. Further, the base chassis 5 includes a second region 502 that overlies the display unit 6 plane-wise.

In this embodiment, the operation button 410 is a button used for, for example, activating or shutting down music software set in the electronic apparatus 1. The operation buttons 411 and 412 are buttons used for selecting songs. The operation button 413 is a button used for deciding on the selected song. The operation buttons 414 and 415 are buttons used for adjusting volumes. The operation button 416 is a button used for reproduction and pause. The operation button 417 is a rewinding button and the operation button 418 is a fast-forwarding button. The operation button 419 is an eject button used for ejecting a disk.

In this embodiment, by employing a capacitance sensor for the input operation to the operation buttons, a switching operation can be carried out by pressing the operation buttons with a finger. The operation buttons 410 to 419 are composed of transparent electrodes 430 to 439 respectively provided in correspondence thereto. A region outside each of the transparent electrodes 430 to 439 is surrounded by the transparent ground electrode 420. In this embodiment, whether the operation button has been pressed is judged by using a technique that a capacitance between the transparent electrodes 430 to 439 and the ground electrode 420 changes when the corresponding operation buttons 410 to 419 are pressed with a finger. In other words, a region of the base chassis 5 where the operation buttons 410 to 419 are arranged serves as an operating surface, and the base chassis 5 thus partially functions as a touchpad due to the transparent electrodes 430 to 439 and the ground electrode 420. Detection of a change in capacitance is conducted in a detecting circuit incorporated into a driving IC 304. When the driving IC 304 judges that an input has been made to the operation button, a signal for activating the music software, for example, is transmitted to the control circuit board 7 from the driving IC 304. In addition, a controlling circuit for controlling lighting of LEDs is also incorporated into the driving IC 304.

As shown in FIG. 17, the operation buttons 410 to 419 respectively include white square frames 410a to 419a with round corners and marks 410b to 419b such as a musical notation or arrows printed in a charcoal color inside the white frames 410a to 419a, respectively. The white frames 410a to 419a and the marks 410b to 419b are printed on the back surface side of the base chassis 5, for example. For example, ink containing a medium as an irradiated-light diffusing member may be used as ink for the white frames 410a to 419a. Thus, irradiation of light to the operation buttons 410 to 419 causes the white frames 410a to 419a to glow in a whitish color.

The transparent electrodes 430 to 439, the ground electrode 420, and the like are provided on the touchpad electrode substrate 400 having a thickness of about 0.7 mm. As shown in FIG. 17, a plane of the touchpad electrode substrate 400 has a rectangular shape with round corners, the touchpad electrode substrate 400 including an upper hem section 400a, a lower hem section 400b, a right-hand side hem 400c, and a left-hand side hem 400d.

As shown in FIGS. 17 to 19, the touchpad electrode substrate 400 is arranged and attached inside a concave section 108 whose plane is of a rectangular shape and whose depth is about 0.7 mm, the concave section 108 provided on the back surface side of the base chassis 5. The input operations to the operation buttons 410 to 419 are made from the front surface side of the base chassis 5 opposed to the back surface thereof provided with the concave section 108.

As shown in FIGS. 17 and 18, the touchpad electrode substrate 400 and the right-hand side retaining member 32' partially overlap each other plane-wise, and a gap between the right-hand side hem 400c of the touchpad electrode substrate 400 and the concave section 108 is blocked by a tip end section 32'a of the protruding surface section 34 of the right-hand side retaining member 32'. In other words, there exists a portion where the ground electrode 420 formed on the touchpad electrode substrate 400 and the right-hand side retaining member 32' overlap each other.

In addition, the touchpad electrode substrate 400 and the front panel 22 of the display unit 6 partially overlap each other plane-wise, and a gap between the left-hand side hem 400d of the touchpad electrode substrate 400 and the concave section 108 is blocked by the front panel 22 plane-wise.

Therefore, because the gaps between the touchpad electrode substrate 400 and the concave section 108 at the right-hand side hem 400c and the left-hand side hem 400d are blocked by the right-hand side retaining member 32' and the display unit 6, the gaps cannot be seen and transparency of the entire base chassis 5 is thus visually unimpaired by those gaps. Thus, favorable design of the electronic apparatus 1 can be maintained.

Moreover, as shown in FIG. 19, a transparent resin 401 is applied to the gaps formed between the touchpad electrode substrate 400 and the concave section 108 at the upper hem section 400a and the lower hem section 400b. Accordingly, in the case of the electronic apparatus 1, boundaries between the touchpad electrode substrate 400 and the concave section 108 at the upper hem section 400a and the lower hem section 400b can hardly be seen. Thus, favorable design of the electronic apparatus 1 as well as transparency of the entire base chassis 5 can be maintained.

As shown in FIG. 21, the touchpad electrode substrate 400 has a 3-layered structure in which three transparent PET (Polyethylene terephthalate) films 402 to 404 are laminated. The transparent PET films 402 and 404 placed on top and bottom of the touchpad electrode substrate 400 respectively include notches 402a and 404a at portions thereof corresponding to respective regions to which the flexible wiring substrate 200 is connected. The transparent PET film 403 in the middle is not provided with a notch, so a region thereof corresponding to the notches 402a and 404a is exposed when the three layers are laminated. Thus, this region serves as a flexible wiring substrate adhering region 403a to which the flexible wiring substrate 200 is adhered. The transparent PET film 403 in the middle includes an upper surface 403b and a lower surface 403c facing each other. Although the white frames and marks of the operation buttons have been printed on the base chassis 5 in this embodiment, the white frames and marks may be printed on any of the transparent PET films constituting the touchpad electrode substrate 400.

As shown in FIGS. 20 and 21, the lower surface 403c of the transparent PET film 403 in the middle is provided with the circular transparent electrodes 430 to 439 respectively constituting the operation buttons 410 to 419, first wirings 470 to 479 respectively connected to the transparent electrodes 430 to 439, the ground electrode 420, a pad section 460 for electrically connecting each of the first wirings 470 to 479 with the ground electrode 420, and lead-out wirings 440 to 450 as second wirings for electrically connecting the ground electrode 420, the transparent electrodes 430 to 439, and the pad section 460 corresponding thereto.

The plurality of operation buttons 410 to 419 are drawn to the second region 502 by the transparent first wirings 470 to 479 having equal lengths. The first wirings 470 to 479 are respectively connected to the corresponding lead-out wirings 440 to 450 having higher conductivity than the first wirings 470 to 479. The lead-out wirings 440 to 450 are provided in the second region 502. It should be noted that in FIGS. 20 and 21, even though the transparent electrodes and wirings formed on the transparent PET film 403 in the middle are formed on the lower surface 403c side thereof and not on the upper surface 403b, the transparent electrodes and wirings thereof are illustrated with solid lines for ease in describing arrangements thereof in the figures.

The transparent electrodes 430 to 439, the first wirings 470 to 479, and the ground electrode 420 are each formed of a transparent conductive material containing ITO (Indium Tin Oxide), and the lead-out wirings 440 to 450 and the pad section 460 are each formed of a material having higher conductivity than ITO, such as silver.

The pad section 460 is exposed since the portion of the flexible wiring substrate adhering region 403a is exposed by the notch 404a of the transparent PET film 404 at the bottom. The lead-out wirings 440 to 450 are aggregated in the flexible wiring substrate adhering region 403a as one point in the second region 502.

The ground electrode 420 is formed so as to surround the outer region of the transparent electrodes 430 to 439 and the first wirings 470 to 479 while being electrically separated from the transparent electrodes 430 to 439 and the first wirings 470 to 479.

Parts of the transparent electrodes 430 to 439, the first wirings 470 to 479, and the ground electrode 420 formed on a third region 503 adjacent to the second region 502 are arranged in a region visible by the user. As described above, by using a transparent material to form the transparent electrodes 430 to 439, the first wirings 470 to 479, and the ground electrode 420 provided in the visible region, the transparent electrodes 430 to 439, the first wirings 470 to 479, and the ground electrode 420 can hardly be seen in the electronic apparatus 1, whereby favorable design of the electronic apparatus 1 as well as transparency of the entire base chassis 5 can be maintained.

On the other hand, the lead-out wirings 440 to 450 and the pad section 460 formed of silver in the second region 502 are blocked by the front panel 22 of the display unit 6 in the electronic apparatus 1, which means that the lead-out wirings 440 to 450 and the pad section 460 are arranged in a region invisible by the user. When using chromatic silver or copper having higher conductivity than ITO, which is used for the transparent electrodes, for the lead-out wirings, by arranging the display unit over the lead-out wirings so that the display unit overlies the lead-out wirings plane-wise, the lead-out wirings are blocked by the display unit to become invisible. Accordingly, transparency of the base chassis 5 in the visible region is maintained.

The first wirings 470 to 479 are formed short at equal lengths. By thus forming the first wirings 470 to 479 short at equal lengths, response velocities between the operation buttons can be made uniform, and a favorable response can be obtained. Therefore, response precision is stabilized to realize favorable operability.

The pad section 460 and the lead-out wirings 440 to 450 are formed of silver having higher conductivity than the transparent electrodes 430 to 439 and the like formed in the third region 503 as the visible region. By thus forming the lead-out wirings 440 to 450 of silver having high conductivity, a response time required for starting processing after judging that the operation buttons 410 to 419 have been pressed can be shortened as compared to the case of using ITO, resulting in a favorable operational response. In addition, an effect of variations in signal delays caused by the variations in wiring lengths of the lead-out wirings 440 to 450 can be suppressed as compared to the case of using ITO. Therefore, the response time required for starting processing after judging that the operation buttons 410 to 419 have been pressed can be made substantially uniform between the operation buttons 410 to 419, resulting in favorable operability. It should be noted that the material used in the present invention is not limited to silver as in this embodiment, and copper and the like may be used instead.

As described above, in this embodiment, the electrodes and the like formed in the visible region are formed of a transparent material, the first wirings formed in the visible region are formed short at equal lengths, and the second wirings (lead-out wirings) formed in the invisible region are formed of a material having higher conductivity than the material used for the electrodes formed in the visible region. Thus, favorable operability of the operation buttons can be obtained while maintaining favorable design of the electronic apparatus 1 as well as transparency of the entire base chassis 5.

As described above, inputs to the operation buttons 410 to 419 are detected by the detecting circuit using a change in capacitance caused when an object to be detected such as a finger comes into contact with the operation buttons. The detecting circuit is incorporated into the driving IC 304 mounted on the B surface 300b of the circuit board 300. The driving IC 304 is electrically connected with the transparent electrodes 430 to 439 and the ground electrode 420 via the flexible wiring substrate 200. Capacitance that increases along with the pressing of the operation buttons 410 to 419 by the finger or the like is output to the driving IC 304, and the driving IC 304 judges whether the operation button has been pressed based on the change in capacitance. When judged that the operation button has been pressed, a signal thereof is output from the driving IC 304 to the control circuit board 7, and control including activation of music reproducing software is performed in response to the signal. Further, the driving IC 304 also controls lighting of LEDs mounted on the circuit board 300 based on the input to the operation buttons.

In this embodiment, provision of the operation buttons to the base chassis 5 enables operations to be directly made on the apparatus main body including the display unit, thus widening a selection range in usage of the electronic apparatus 1. For example, in the electronic apparatus 1 in which the keyboard 3 is closable as shown in FIG. 2, even when the keyboard 3 is closed, it is possible to carry out selection of songs, volume adjustment, and the like using the operation buttons provided on the base chassis 5. The provision of the operation buttons to the base chassis 5 as described above enables not only operations using the keyboard 3 but also operations using the base chassis 5 adjacent to the display unit 6. As a result, it is possible to enhance intuitiveness in operation using the operation buttons and widen a selection range in usage of the electronic apparatus 1.

The flexible wiring substrate 200 is electrically connected to the circuit board 300 and the pad section 460. As shown in FIG. 18C, in the electronic apparatus 1, the flexible wiring substrate 200 is bent and the circuit board 300 is arranged such that a plane thereof is substantially perpendicular to the first mounting surface section 5a of the base chassis 5. As shown in FIGS. 17 and 18, the circuit board 300 is supported to be substantially perpendicular to the first mounting surface section 5a by rectangular-parallelepipedonal supporting protrusions 105a, 105b, and 105c protruding vertically with respect to the first mounting surface section 5a, that is, supported to be substantially parallel to the coupling section 112. The circuit board 300 is positioned between the display unit 6 and the base chassis 5. Because the circuit board 300 is arranged so as not to overlie the visible region of the base chassis 5 plane-wise, transparency of the base chassis 5 is not impaired due to the circuit board 300.

As shown in FIGS. 17 and 22, the circuit board 300 includes the A surface 300a and the B surface 300b facing each other. The circuit board 300 includes ten holes 301 respectively corresponding to the operation buttons 410 to 419. The driving IC 304 and white LEDs (Light Emitting Diodes) 302 as illuminating means provided in correspondence to the holes 301 are mounted on the B surface 300b side. It should be noted that when looking at the circuit board 300 from the A surface 300a side, it can be seen that the white LEDs 302 are actually provided at substantially the center of the respective holes 301. However, illustration of the white LEDs 302 is omitted in FIG. 17. As shown in FIG. 18B, when the white LED 302 is lit, light thereof passes through the hole 301 to illuminate the corresponding operation button from below and thus illuminate the vicinity of the corresponding operation button.

In this embodiment, control is performed so that the white LED is lit only when any of the operation buttons 410 to 419 is pressed. The LED having a function of lighting up when the operation button is pressed is referred to as function LED, and the white LED 302 functions as the function LED. The white LED 302 is controlled such that glowing thereof fades in when being lit and gradually fades out when turned off. In this embodiment, the holes 301 are provided and the white LEDs 302 are provided so that light thereof passes through the respective holes 301. However, the white LEDs 302 may be provided on the A surface 300a side without providing the holes.

Unicolor LEDs have been provided in this embodiment, but it is also possible to provide bicolor LEDs to change illumination colors depending on the operation status, descriptions of which will be given hereinafter with reference to FIGS. 23 and 24.

FIG. 23 are schematic plan views respectively showing an A surface 1300a and B surface 1300b of a circuit board 1300 in a case of providing bicolor LEDs. FIG. 24 are diagrams for illustrating operation examples in the case of using bicolor LEDs.

Figure 23A:
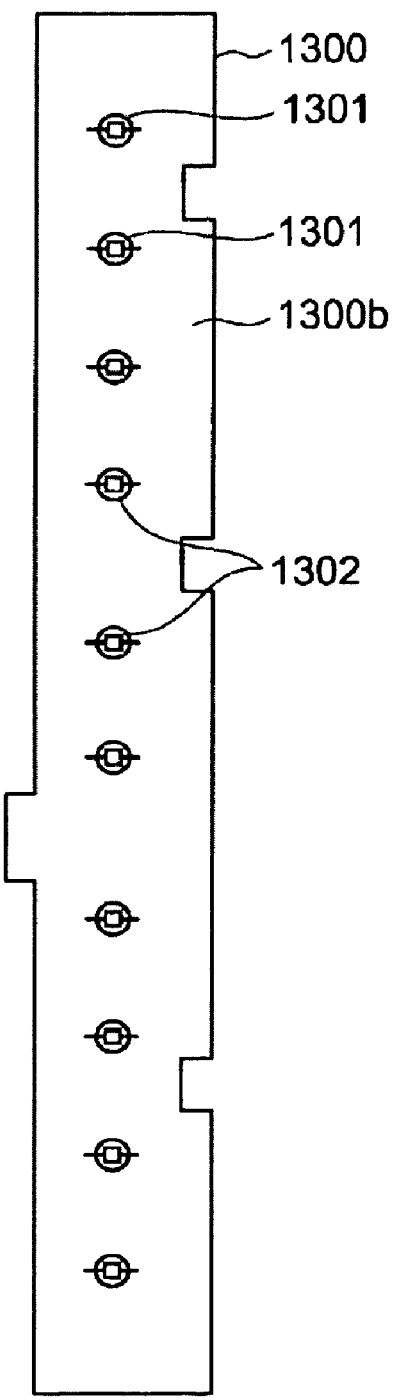
FIG. 23A shows the circuit board from the B surface side and FIG. 23B shows the circuit board from an A surface side.
Figure 23B:
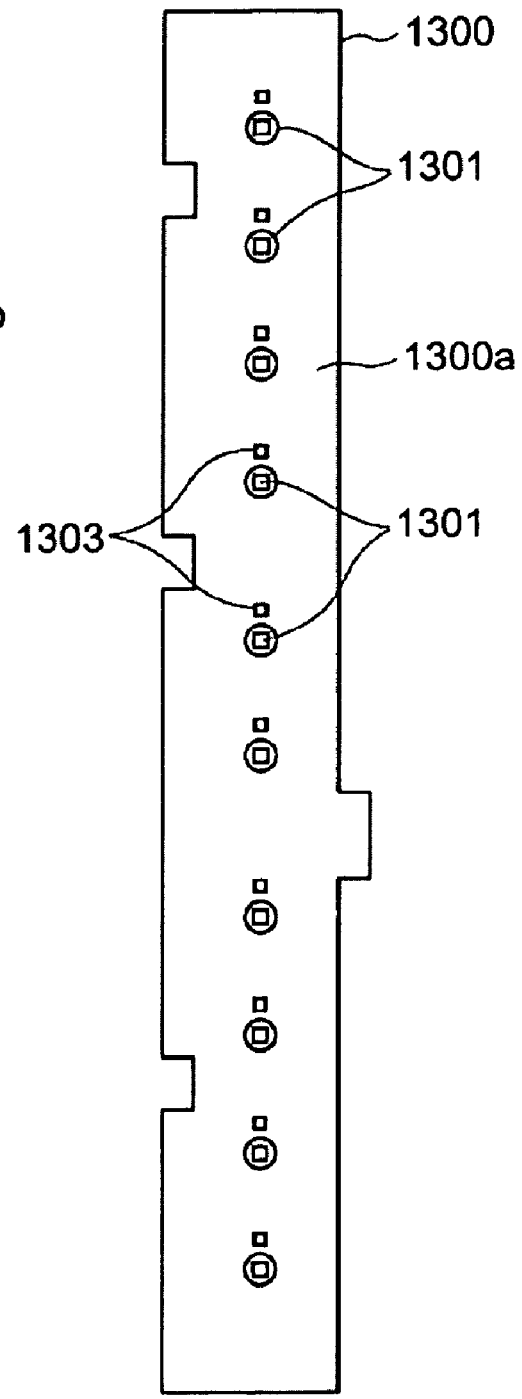

As shown in FIG. 23, the circuit board 1300 includes holes 1301 respectively corresponding to the operation buttons. As shown in FIG. 23A, the circuit board 1300 is provided with, on the B surface 1300*b* side thereof, white LEDs 1302 as first-color illuminating means respectively corresponding to the holes 1301, and a driving IC 1304. On the other hand, as shown in FIG. 23B, the circuit board 1300 is provided with, on the A surface 1300*a* side thereof, blue LEDs 1303 as second-color illuminating means, the blue LEDs 1303 provided adjacent to the respective white LEDs 1302. In other words, the white LEDs 1302 and the blue LEDs 1303 correspond one by one for each of the operation buttons.

Figure 24A:
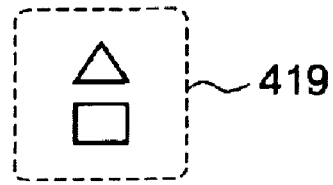
FIG. 24 are plan views showing operation statuses of an operation button according to the modification.
Figure 24B:
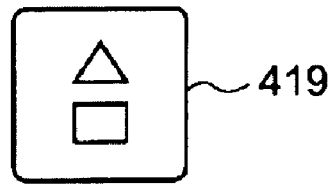
Figure 24C:
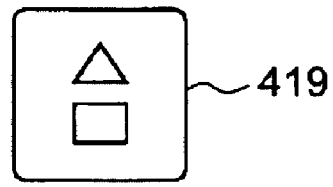

When using the bicolor LEDs, illumination colors of each of the operation buttons can be displayed distinguishably depending on the operation status. For example, it is possible to provide the function of the function LED for lighting the operation button only when the operation button is pressed to the blue LEDs 1303 as the second-color illuminating means and provide a function of a backlight LED for lighting only the operable operation button to the white LED 1302 as the first-color illuminating means. Here, the LED for lighting only the operable operation button is referred to as backlight LED. As shown in FIG. 24A, for example, the eject button 419 is unlit due to an inoperable status since a musical disk is not inserted. As shown in FIG. 24B, when the disk is inserted, due to an operable status of the eject button 419, the white LED 1302 is lit to illuminate the eject button 419 with white light. In other words, an inserted status and an uninserted status of a disk can be visually recognized such that the disk is inserted when the eject button 419 is lit in white and the disk is uninserted when the eject button 419 is unlit. As shown in FIG. 24C, when the eject button 419 is pressed while the disk is inserted, the blue LED 1303 is lit to illuminate the eject button 419 with blue light. Operability is improved by thus distinguishably displaying the illumination colors of the operation buttons depending on the operation status.

Moreover, in this embodiment, because the retaining member 32' made of aluminum that reflects light is mounted to the outer circumference of the base chassis 5, light from the LEDs 302, 1301, or 1302 is reflected by the retaining member 32', whereby it is possible to enhance luminance of light for illuminating the operation buttons as compared to the case in which the retaining member 32' is not provided.

Figure 25:
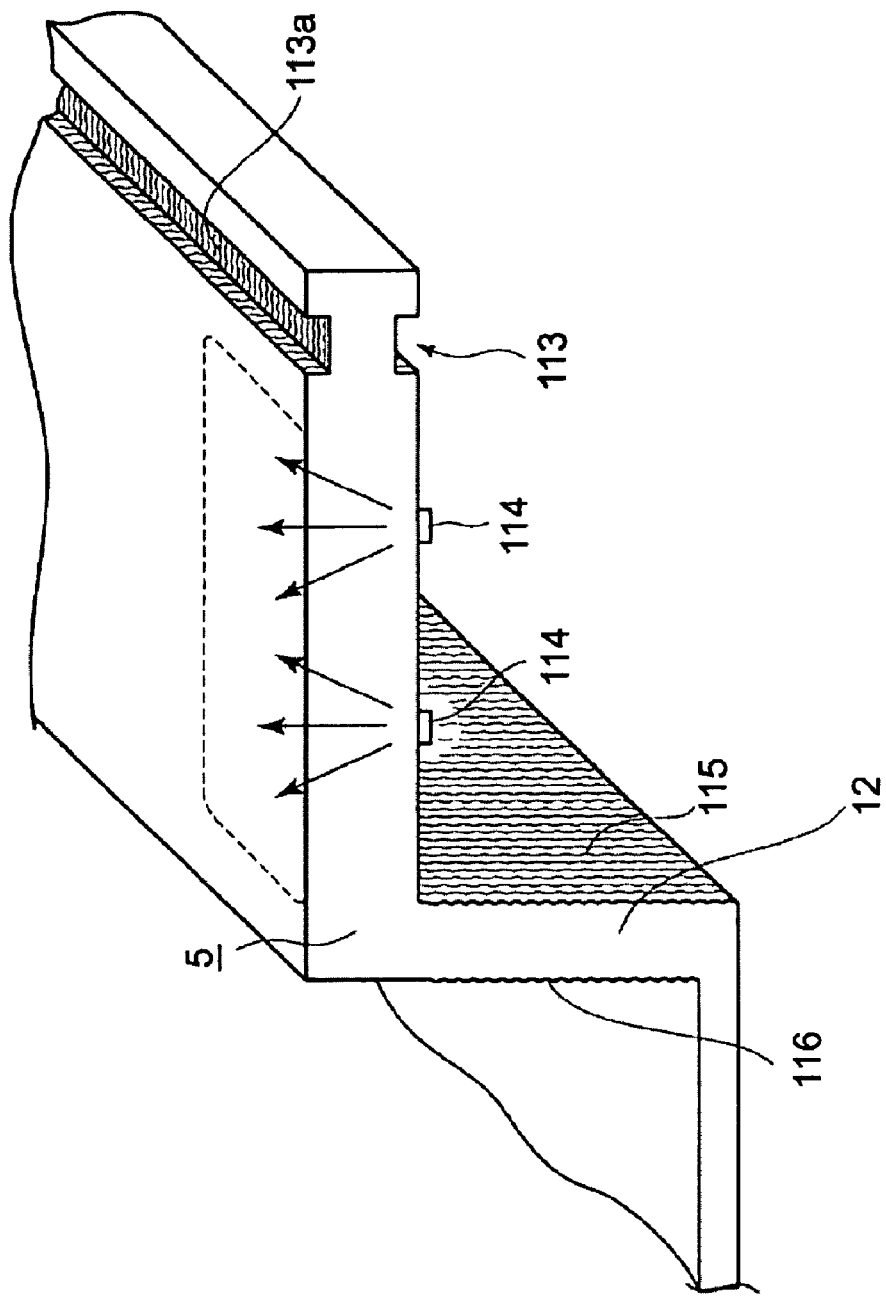
FIG. 25 is a partially enlarged perspective view showing a base chassis according to another modification.

Furthermore, as shown in FIG. 25, surfaces 115 and 116 of the coupling section 112 and a surface 113*a* of each of the groove-like concave sections 113 to which the retaining member 32' is fit, through each of which light irradiated from the LED passes before reaching an illuminating region, may be subjected to grain processing as light diffusing processing so that light is diffused to enhance luminance of light for illuminating the operation buttons. Regions on which the grain processing is to be carried out are regions corresponding to the operation buttons, for example. Surface roughness after the grain processing is, for example, around 100 μm.

Further, luminance of illumination light can be enhanced by applying a diffusing member 114 for diffusing light onto back surfaces of the operation buttons opposed to the operating surfaces thereof.

Figure 26A:
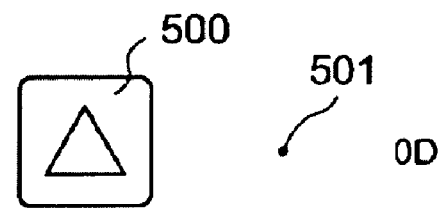
FIG. 26 are diagrams for illustrating various operational forms of operation buttons according to another modification.
Figure 26B:
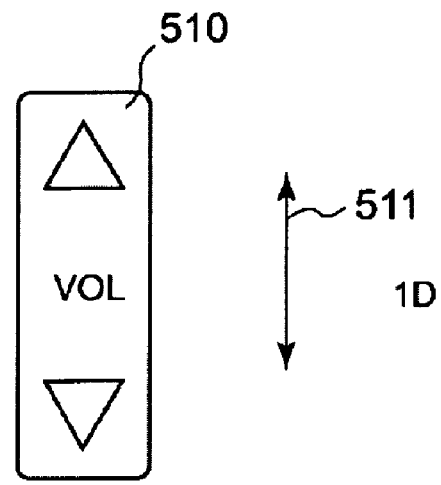
Figure 26C:
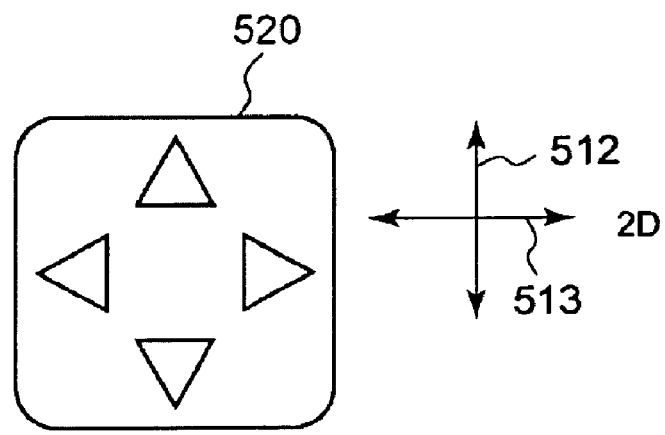

As shown in FIG. 26A, in the above embodiment, an operation button 500 is operated by being pressed at one point 501 on the operating surface thereof, that is, the operation button 500 is operated 0-dimensionally (0-D). In contrast, as shown in FIG. 26B, an operation button 510 may be operated by moving a finger or the like on an operating surface thereof in a direction of a line 511 while the finger is in contact with the operating surface, that is, the operation button 510 may be operated 1-dimensionally (1-D). This can be applied to the operation button for adjusting volume of music, for example, and only needs to be carried out such that the finger is moved upward on the operating surface while in contact therewith for turning up the volume and the finger is moved downward on the operating surface while in contact therewith for turning down the volume. Moreover, as shown in FIG. 26C, an operation button 520 may be operated by moving the finger or the like on an operating surface thereof in directions along mutually orthogonal lines 512 and 513 while the finger is in contact with the operating surface, that is, the operation button 520 may be operated 2-dimensionally (2-D). This can be applied to the operation button for selecting songs, for example. For example, in a case where a plurality of song titles are displayed on a display panel in an n row-m line arrangement and display of a selected song is made by changing a display color thereof (highlighting), the operation only needs to be carried out such that the finger is moved along the line 512 while in contact with the operating surface when moving the highlighted display in a line direction, and the finger is moved along the line 513 while in contact with the operating surface when moving the highlighted display in a row direction.

The stand 4 is rotatably supported by the stand supporting section 29 of the rear cover 8 using a rotating mechanism 39 (see FIGS. 1 to 4). Thus, the stand 4 can be closed in an unused status, resulting in an improvement in convenience in transfer and the like.

Figure 27:
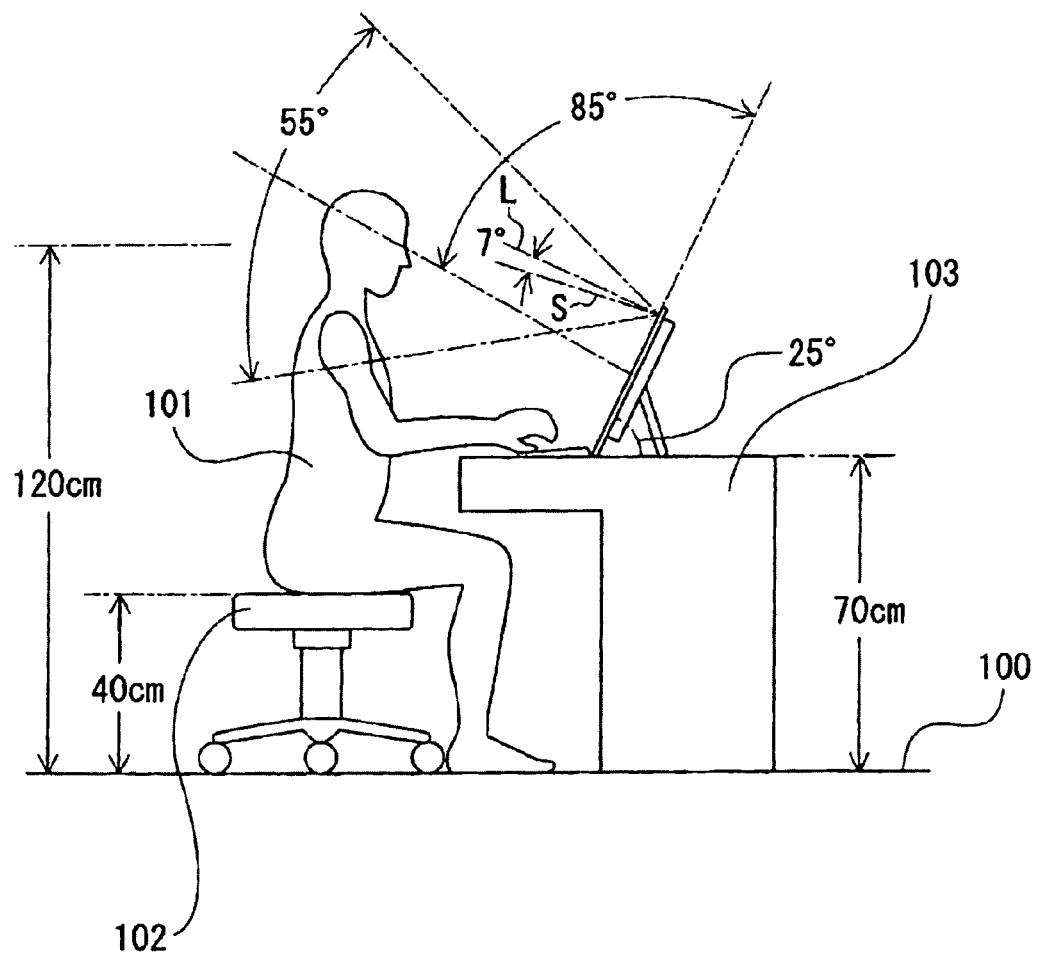
FIG. 27 is a schematic diagram showing optical-axis directions of a photographing lens of a camera unit in a standard use status and a reference status when a user uses the electronic apparatus.

Generally, as shown in FIG. 27, in a standard use status when a user 101 uses the electronic apparatus 1, a height of a chair 102 is 40 cm, a height of a desk 103 is 70 cm, and an eye level of the user 101 from a floor 100 is 120 cm.

A display surface of the display panel of the electronic apparatus 1 placed on the desk 103 is tilted by an angle of 250 with respect to the vertical direction, and the user 101 views the display surface of the display panel from an angle of 85° with respect to the displaying surface.

As shown in FIGS. 1 to 4, a camera hole 22*b* is formed in the front panel 22, and a camera 60 is provided to the camera hole 22*b*. The camera is, for example, a camera for TV phones.

(Regarding Display and Operation Controlling Method)

Display and operations of the electronic apparatus 1A shown in FIG. 2 will be described in detail.

Figure 38:
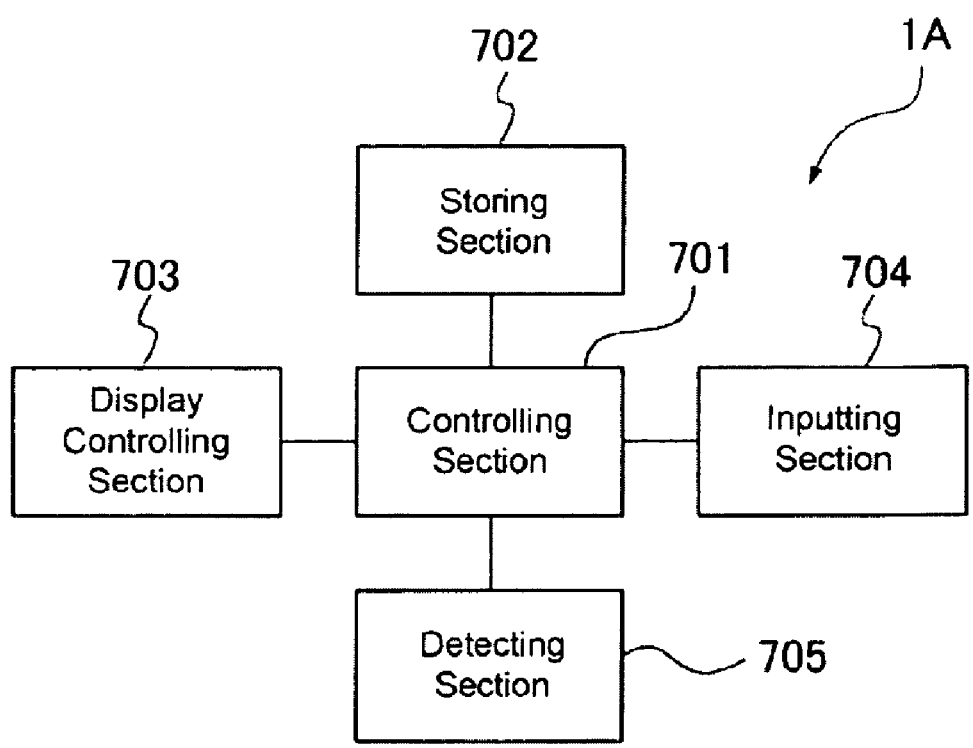
FIG. 38 is a block diagram showing a functional structure of the electronic apparatus according to this embodiment.

FIG. 38 is a block diagram showing a schematic structure of the electronic apparatus 1A as a personal computer.

As shown in FIG. 38, the electronic apparatus 1A includes a controlling section 701 for controlling the entire apparatus, a storing section 702 as a working region for programs necessary for performing control, a display controlling section 703 for controlling display of the display panel 21, an inputting section 704 including the operation buttons 410 to 419, and a detecting section 705 for detecting opened/closed status (closing operation) of the keyboard 3. It should be noted that as the detecting section 705, a switch that is turned on when coming into contact with the closed keyboard 3 may be provided to the apparatus main body 2, or a non-contact type switch may of course be provided instead. Moreover, such switches may be provided on the keyboard 3 side, or another means may of course be used instead.

Meanings of terms used in descriptions below are as follows.

"Half-skin" refers to a screen displayed on the display panel 21 when the keyboard 3 is closed. In the "half-skin" mode, a screen is not displayed in a region hidden by the closed keyboard 3, and the screen is displayed in a remaining region, that is, the upper region of the display panel 21.

"Full screen" refers to a normal screen displayed on the display panel 21 that displays a screen of an OS (Operating System) such as Windows (Registered Trademark), for example.

"Mini-player" refers to one of programs for reproducing music and the like in the electronic apparatus 1A. This program is operated on the OS such as Windows (registered trademark), for example.

"Clear-touch button" refers to each of the operation buttons 410 to 419. A "clear-touch button No. 1" corresponds to the operation button 410, a "clear-touch button No. 2" corresponds to the operation button 411, and so on.

(Operation for Switching Between Full-screen Display and Half-skin Display)

Figure 39:
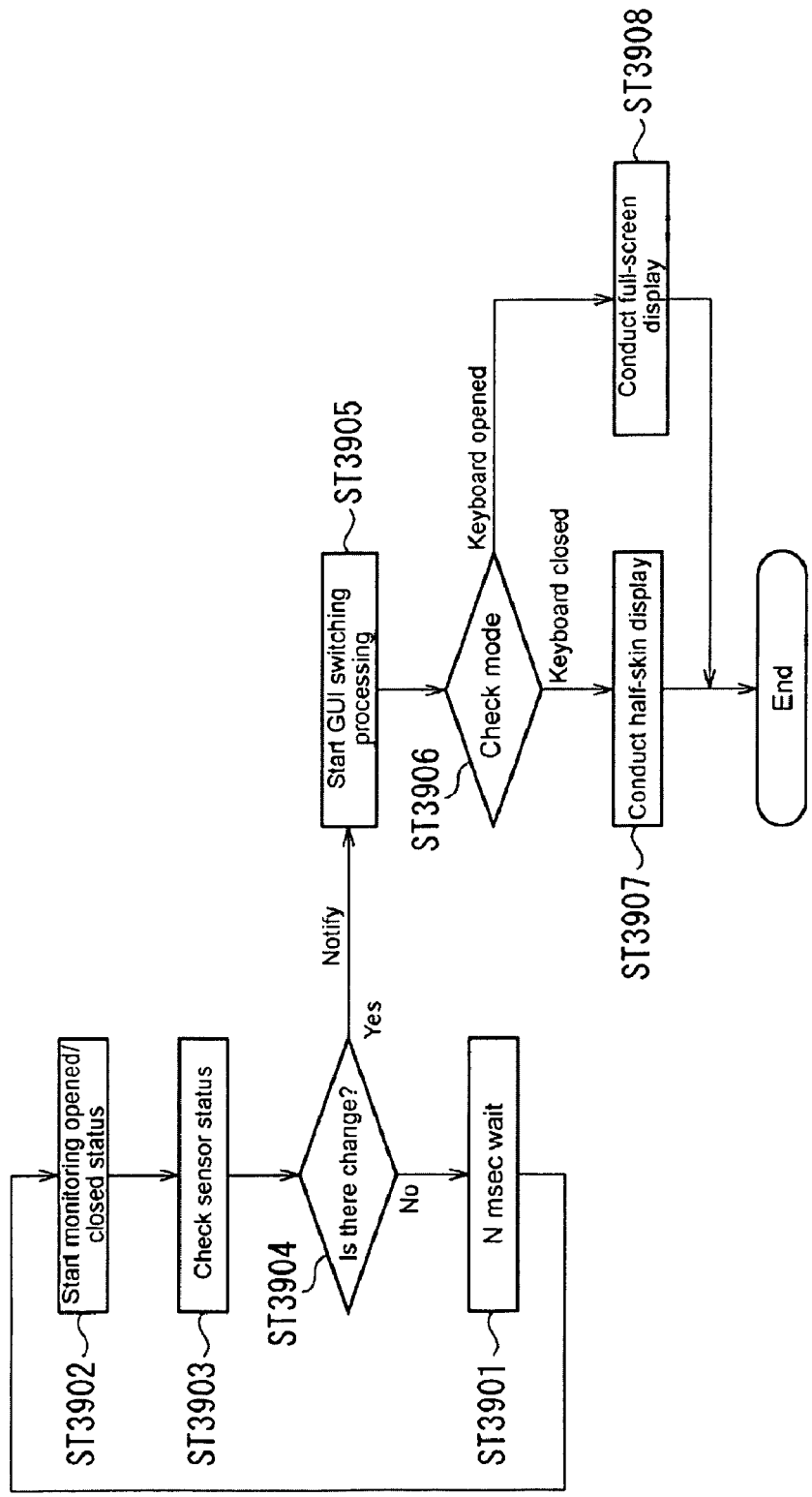
FIG. 39 is a flowchart showing a display operation regarding opening/closing of a keyboard.

FIG. 39 is a flowchart showing an operation for switching between full-screen display and half-skin display.

The controlling section 701 monitors opening/closing of the keyboard 3 via the detecting section 705. Specifically, the controlling section 701 starts a monitoring operation every Nm sec to check if a change has been detected by the detecting section (sensor) 705 (Steps 3901 to 3904). Upon detecting the change by the detecting section 705, the controlling section 701 notifies the fact to the OS, and the OS starts GUI switching processing (Step 3905).

In the GUI switching processing, a mode is checked first (Step 3906). In other words, whether the keyboard 3 has been closed (or opened) is checked. When the keyboard 3 is closed, the full-screen display conducted up until then is switched to the half-skin display (Step 3907), and when the keyboard 3 is opened, the half-skin display conducted up until then is switched to the full-screen display (Step 3908).

(Switching from Full-screen Display to Half-skin Display)

Figure 40:
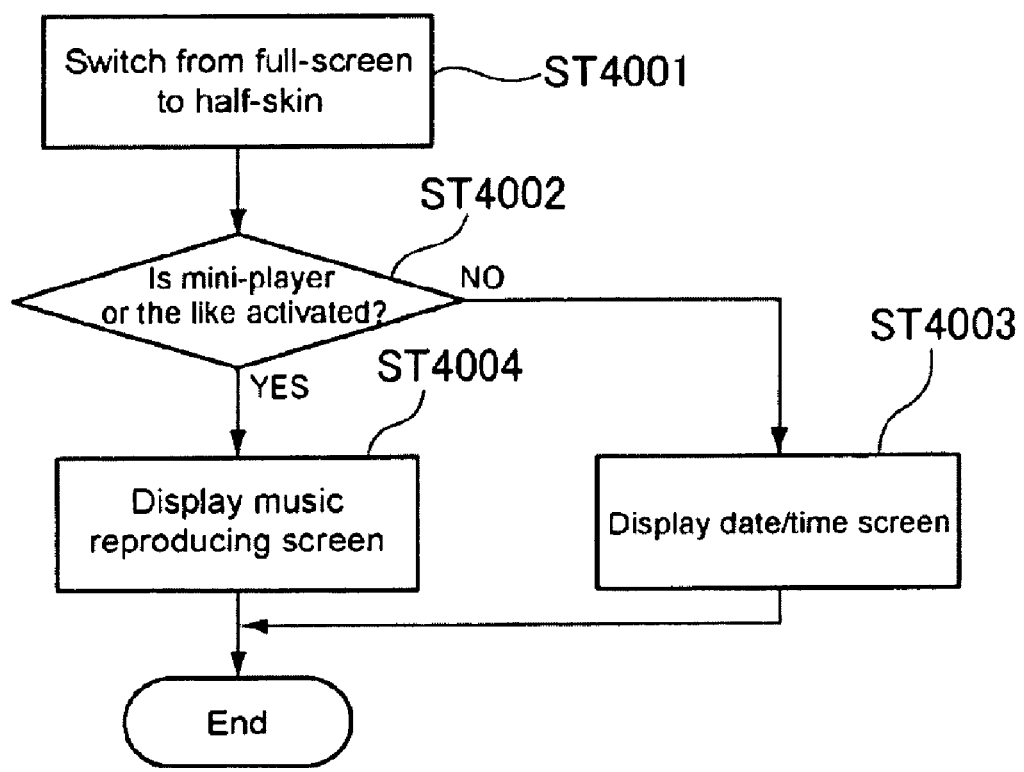
FIG. 40 is a flowchart showing an operation carried out when half-skin display is switched to full-screen display.

FIG. 40 is a flowchart showing an operation carried out when the full-screen display is switched to the half-skin display.

Upon switch from the full-screen display to the half-skin display (Step 4001), it is judged whether the mini-player or other music reproducing programs has/have been activated during the full-screen display (Step 4002).

When judged that the mini-player or other music reproducing programs has/have not been activated during the full-screen display, a date/time screen (see FIG. 41) is displayed (Step 4003).

When judged that the mini-player or other music reproducing programs has/have been activated during the full-screen display, a music reproducing screen (see FIGS. 42 to 44) corresponding to the mini-player or other music reproducing programs is displayed (Step 4004). When music is reproduced by the mini-player or other music reproducing programs during the full-screen display, reproduction of music is continued on even when display is switched to the half-skin display. Further, even in the case where another application program has been activated in addition to the mini-player during the full-screen display, display and reproduction thereof are as described above. Here, FIG. 42 shows a "CD reproducing screen", FIG. 43 shows an "album reproducing screen", and FIG. 44 shows an "entrusted channel reproducing screen". Any of these screens depends on a reproducing screen of the mini-player in the full-screen display. The "entrusted channel reproducing screen" is, for example, a reproducing screen obtained by determining certain types of attributes on the apparatus side by carrying out a predetermined classification by a musical frequency analysis or the like, and allocating a channel for each of the attributes.

(Switching from Half-skin Display to Full-screen Display)

Figure 45:
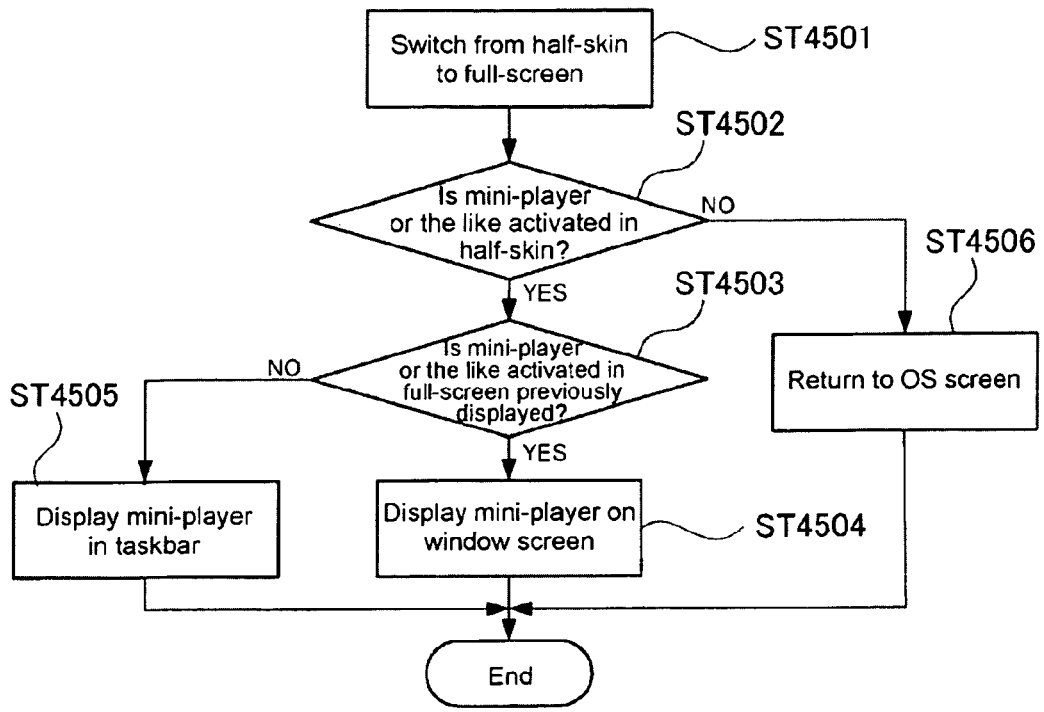
FIG. 45 is a flowchart showing an operation carried out when the full-screen display is switched to the half-skin display.

FIG. 45 is a flowchart showing an operation carried out when the half-skin display is switched to the full-screen display.

Upon switch from the half-skin display to the full-screen display (Step 4501), it is judged whether the mini-player or other music reproducing programs has/have been activated during the half-skin display (Step 4502).

When judged that the mini-player or other music reproducing programs has/have been activated during the half-skin display, it is judged whether the mini-player or other music reproducing programs has/have been activated during the full-screen display before switching to the half-skin display (Step 4503).

When judged that the mini-player or other music reproducing programs has/have been activated during the full-screen display before switching to the half-skin display, a screen corresponding to the mini-player or the like (see FIGS. 46 to 49) is displayed on a window screen (Step 4504), and when not activated, a bar of the mini-player or the like is displayed in a taskbar (Step 4505). When music is reproduced by the mini-player or other music reproducing programs during the half-skin display, reproduction of music is continued on even when display is switched to the full-screen display.

When judged in Step 4502 that the mini-player or other music reproducing programs has/have not been activated during the half-skin display, the normal OS screen in which the mini-player or other music reproducing programs is/are not displayed is displayed again (Step 4506).

Figure 46:
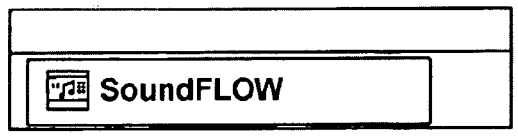
FIG. 46 is a diagram showing a minimized status of a mini-player.
Figure 47:
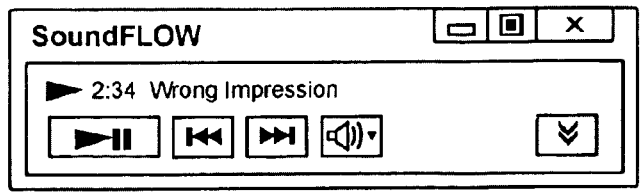
FIG. 47 is a diagram showing a state where no list is displayed on an OS screen of the mini-player.
Figure 48:
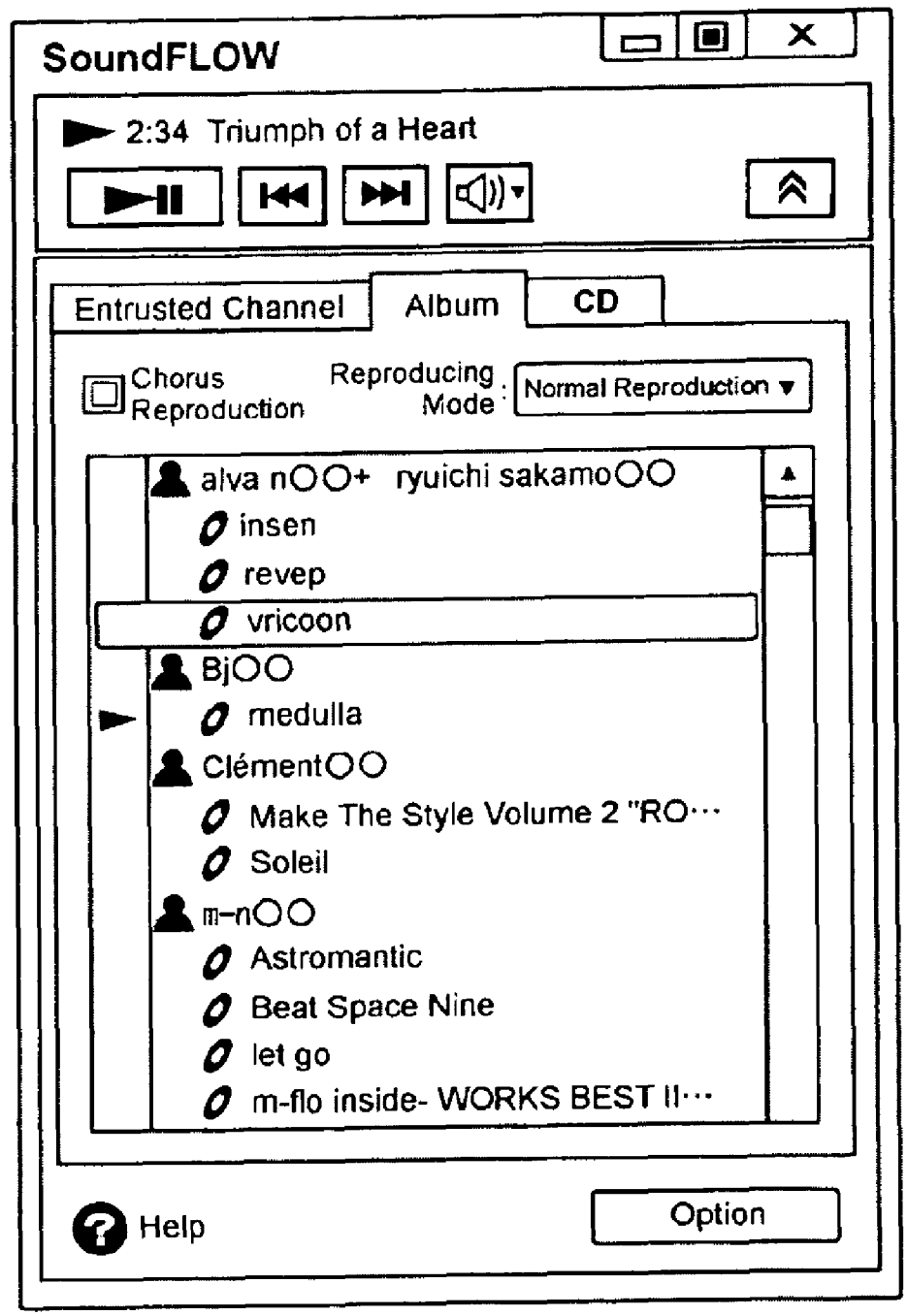
FIG. 48 is a diagram showing a state where a list is displayed on the OS screen of the mini-player.
Figure 49:
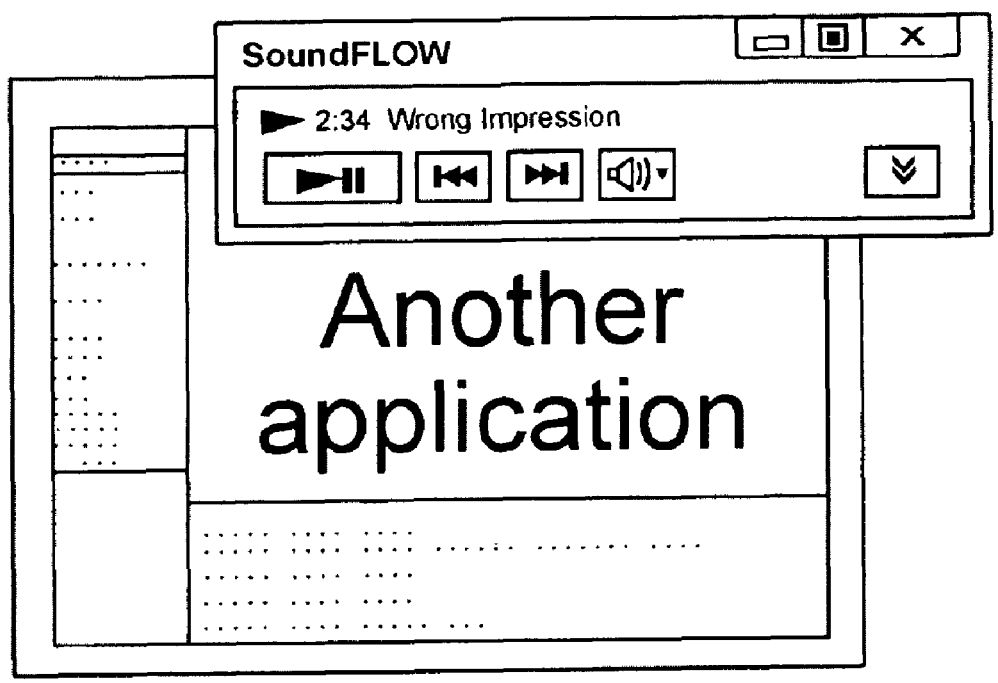
FIG. 49 is a diagram showing a state where the mini-player with no list display is displayed in the very front on top of other application.

Here, FIG. 46 shows a status of a minimized mini-player. FIG. 47 shows a status of the mini-player in the OS screen with no list display. FIG. 48 shows a status of the mini-player in the OS screen with list display. FIG. 49 shows a status where the mini-player with no list display is displayed at the very front above another application. In this embodiment, even when another application is displayed at the very front in the full-screen display before switching to the half-skin display, the mini-player with no list display is displayed at the very front. Accordingly, more direct musical operations can be made. It should be noted that the same holds true in the case of the mini-player with list display. When the mini-player and an option screen or a help screen is displayed in the full-screen display before switching to the half-skin display, the option screen or the help screen is displayed at the very front. This is because, for users, a higher priority is placed on the option screen or the help screen than the mini-player in most cases.

(Allocation of Clear-touch Buttons)

In the half-skin display and the full-screen display, clear-touch buttons are functionally allocated as follows.

In the Case of Half-skin Display

No. 1: Select display/non-display of menu screen.

No. 2: Move upward on menu screen. Press-and-hold to move at accelerated speed.

No. 3: Move downward on menu screen. Press-and-hold to move at accelerated speed.

No. 4: Decide on item on menu screen.

No. 5: Turn up volume 5%. When mute function is ON, cancel mute.

No. 6: Turn down volume 5%. When mute function is ON, cancel mute.

No. 7: Reproduce/pause song.

No. 8: Cue up song being reproduced. Double-click to return to previous song.

No. 9: Advance to next song.

No. 10: Eject inserted CD.

In the Case of Full-screen Display

No. 1: Activate mini-player on main screen (with list display).

No. 2: Move upward in list.
No. 3: Move downward in list.
No. 4: Decide on item on menu screen.
No. 5: Turn up volume 5%. When mute function is ON, cancel mute.
No. 6: Turn down volume 5%. When mute function is ON, cancel mute.
No. 7: Reproduce/pause song.
No. 8: Cue up song being reproduced. Double-click to return to previous song.
No. 9: Advance to next song.
No. 10: Eject inserted CD.

Operation Carried Out by Operation Made to Clear-touch Button

Hereinafter, descriptions will be given on an operation on the controlling section side that is carried out when the clear-touch button is operated.

Figure 50:
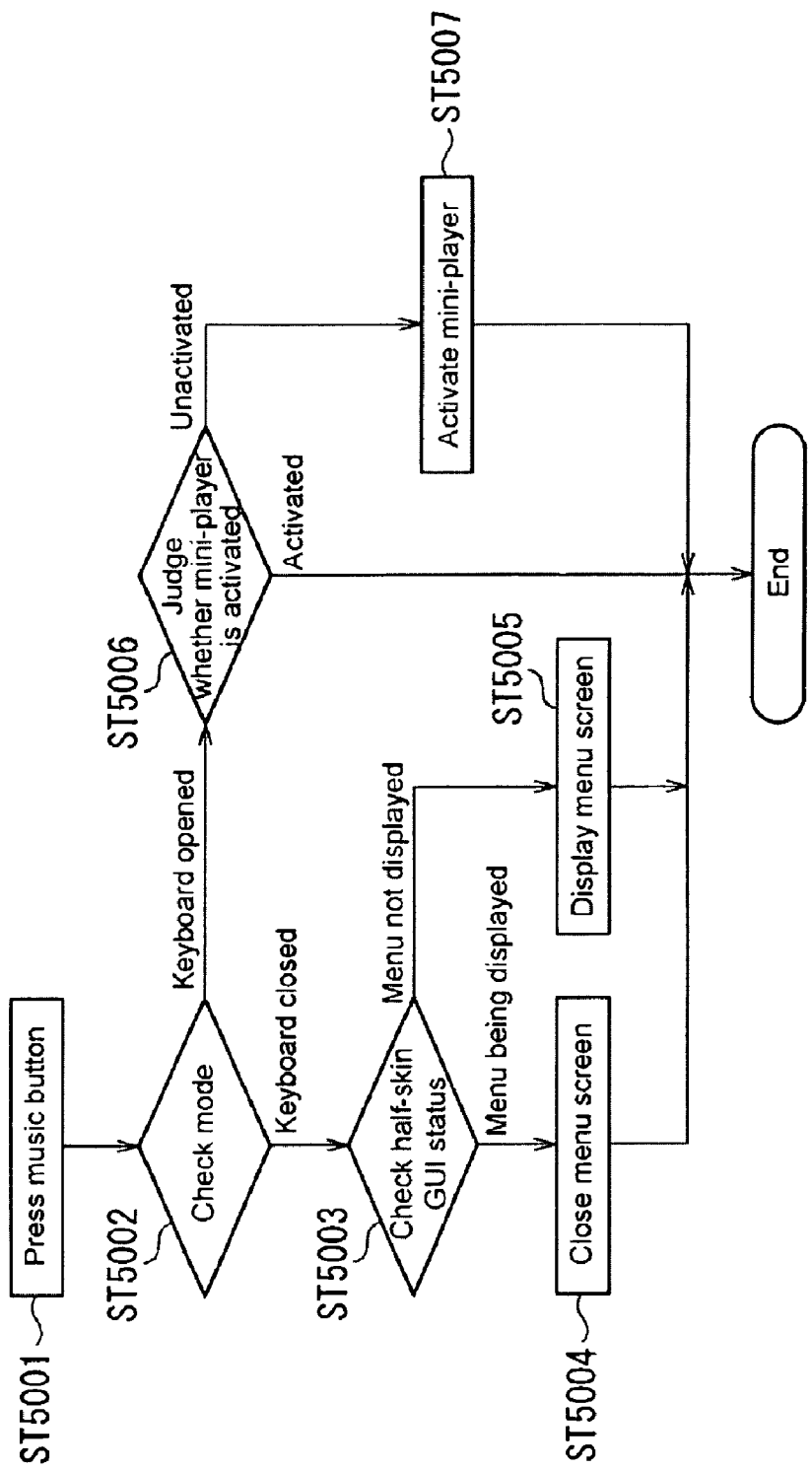
FIG. 50 is a flowchart showing an operation carried out when a music button is pressed.

FIG. 50 is a flowchart showing an operation carried out when the clear-touch button No. 1 (music button) is pressed.

When the music button is pressed (Step 5001), a mode is checked first (Step 5002). In other words, whether the keyboard 3 is closed (or opened) is checked.

When judged that the keyboard 3 is closed, it is judged whether the menu screen has been displayed during the half-skin display (Step 5003). When judged that the menu screen has been displayed, the menu screen is closed (Step 5004), and when not displayed, the menu screen is displayed (Step 5005).

When judged that the keyboard 3 is opened, it is judged whether the mini-player has been activated (Step 5006). When judged that the mini-player has not been activated, the mini-player is activated (Step 5007).

It should be noted that the menu screen will be described later.

Figure 51:
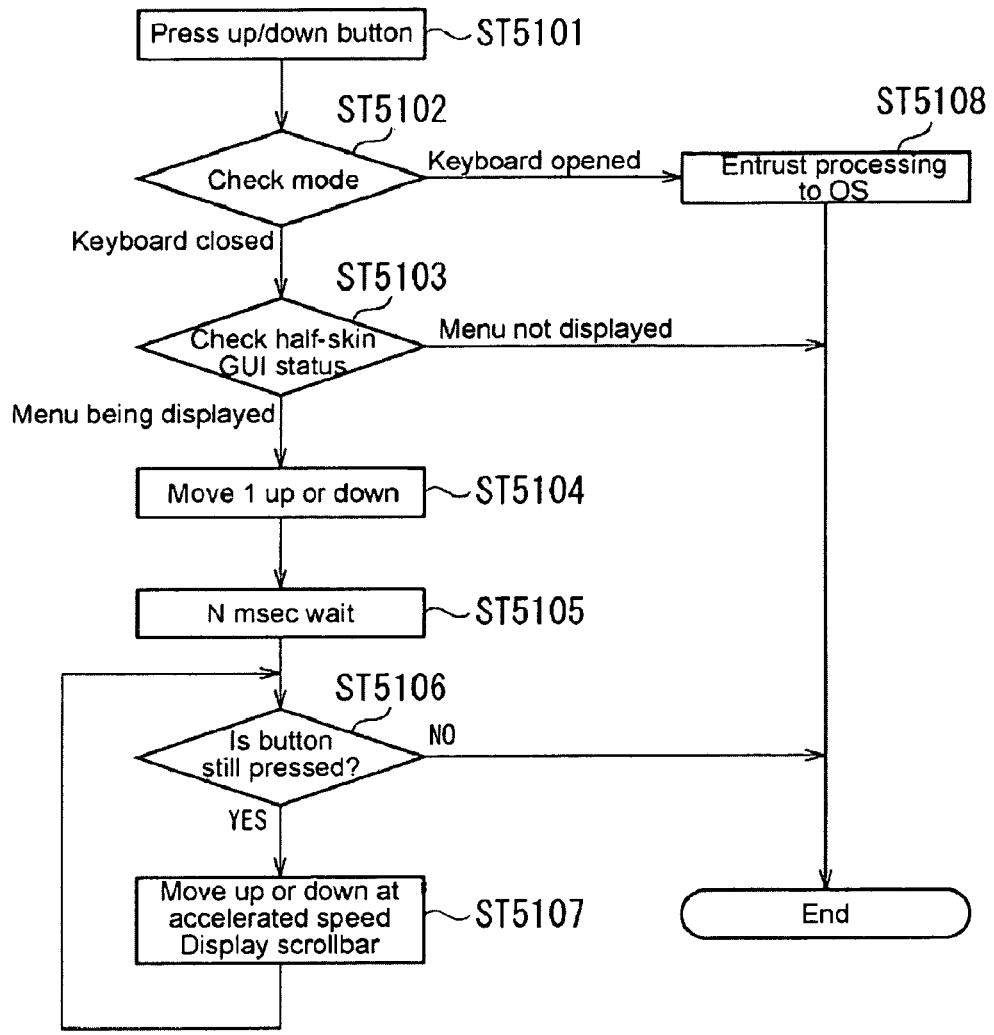
FIG. 51 is a flowchart showing an operation carried out when upward and downward arrow buttons are pressed.

FIG. 51 is a flowchart showing an operation carried out when the clear-touch buttons Nos. 2 and 3 (up/down buttons) are pressed.

When the up or down button is pressed (Step 5101), the mode is checked first (Step 5102). In other words, whether the keyboard 3 is closed (or opened) is checked.

When judged that the keyboard 3 is closed, it is judged whether the menu screen has been displayed during the half-skin display (Step 5103).

When judged that the menu screen has been displayed, a cursor is moved up or down by one on the menu screen (Step 5104).

When the button is still being pressed after Nm sec (Steps 5105 and 5106), the cursor is moved up or down at an accelerated speed and a scrollbar is displayed (Step 5107).

When judged that the keyboard 3 is opened in Step 5102, processing of key codes of up/down arrow keys in a Windows standard keyboard is handed over to the OS (Step 5108). Specifically, the OS carries out the same operation as that carried out when the normal up/down arrow keys are pressed.

Figure 52:
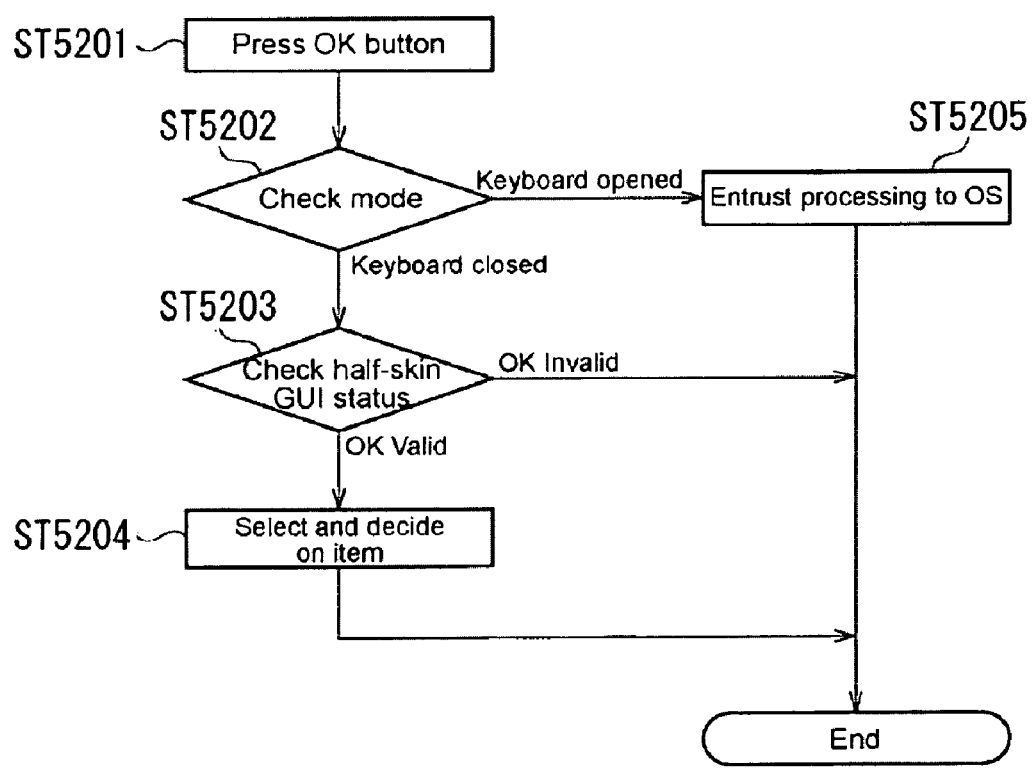
FIG. 52 is a flowchart showing an operation carried out when an OK button is pressed.

FIG. 52 is a flowchart showing an operation carried out when the clear-touch button No. 4 (OK button) is pressed.

When the OK button is pressed (Step 5201), the mode is checked first (Step 5202). In other words, whether the keyboard 3 is closed (or opened) is checked.

When judged that the keyboard 3 is closed, it is judged whether selection of an object (item) made by the OK button in a GUI status of the half-skin display is valid (Step 5203). When a valid object is selected, the selected item is decided upon (Step 5204).

When judged in Step 5202 that the keyboard 3 is opened, processing of a key code of an Enter key in the Windows standard keyboard is handed over to the OS (Step 5205). Specifically, the OS carries out the same operation as that carried out when the normal Enter key is pressed.

Figure 53:
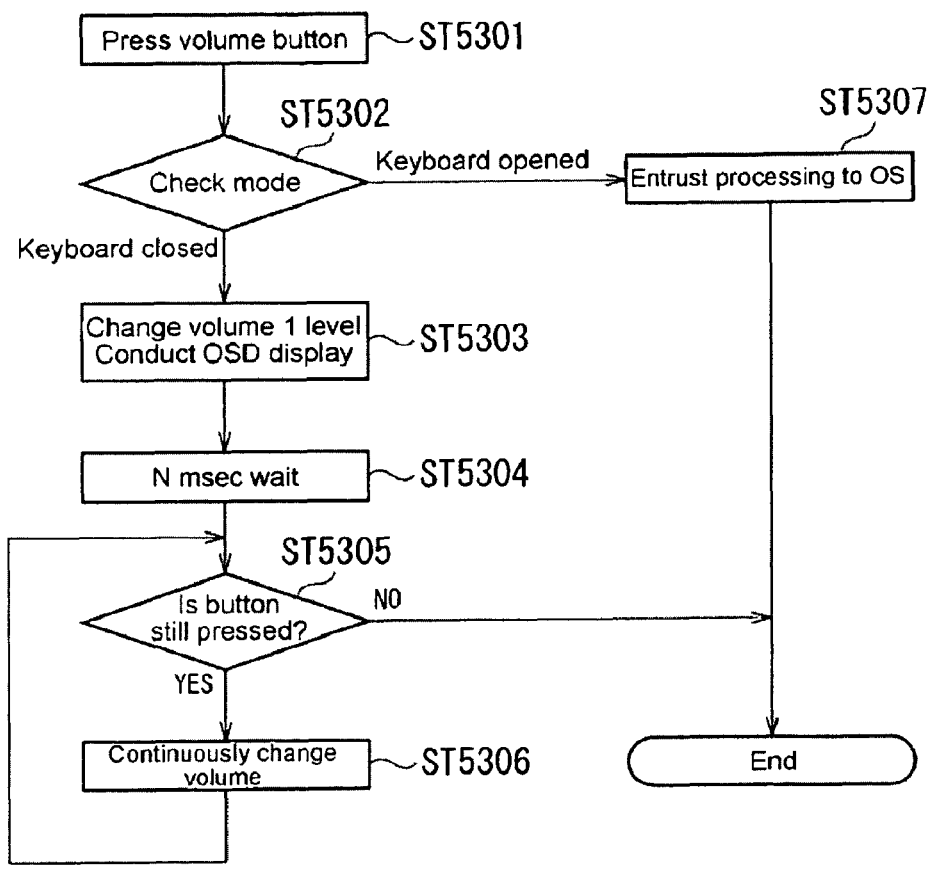
FIG. 53 is a flowchart showing an operation carried out when a volume button is pressed.

FIG. 53 is a flowchart showing an operation carried out when the clear-touch buttons Nos. 5 and 6 (volume buttons) are pressed.

When the volume button is pressed (Step 5301), the mode is checked first (Step 5302). In other words, whether the keyboard 3 is closed (or opened) is checked.

When the keyboard 3 is closed, the volume is turned up or down by 1 level, and an icon indicating the change in volume is displayed on an OSD (On-screen display) for 3 seconds, for example (Step 5303).

When the button is still being pressed after Nm sec (Steps 5304 and 5305), the volume is changed continuously (Step 5306).

When judged that the keyboard 3 is opened in Step 5302, processing is handed over to the OS (Step 5307).

Figure 54:
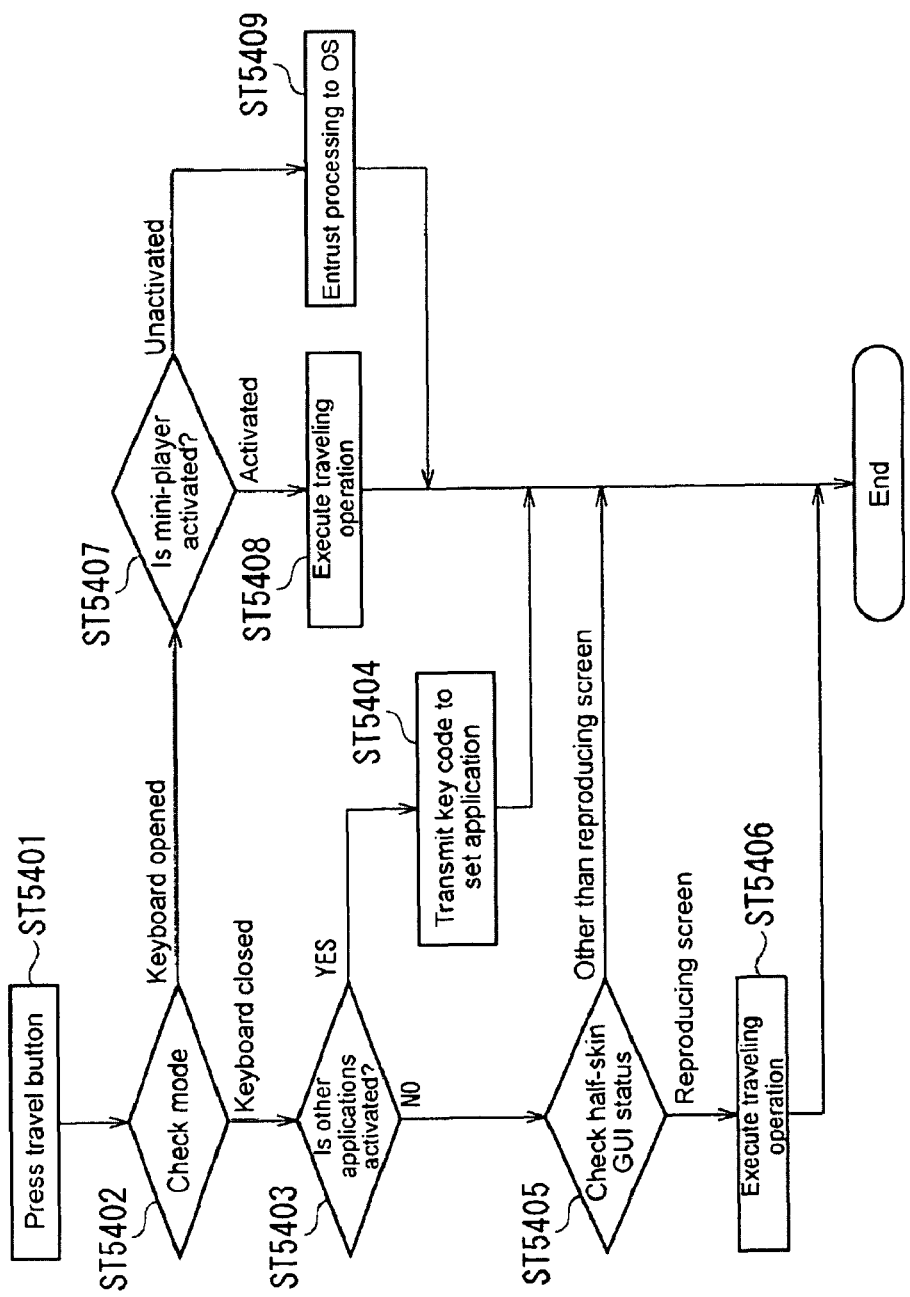
FIG. 54 is a flowchart showing an operation carried out when a program-run button is pressed.

FIG. 54 is a flowchart showing an operation carried out when the clear-touch buttons Nos. 7 to 9 (travel buttons) are pressed.

When the travel button is pressed (Step 5401), the mode is checked first (Step 5402). In other words, whether the keyboard 3 is closed (or opened) is checked.

When judged that the keyboard 3 is closed, it is judged whether a mode of another application (other than the mini-player) is set (Step 5403), and when the mode of another application is set, a key code corresponding to that button is transmitted to the set application (Step 5404).

When not set to another application, it is judged whether the reproducing screen is displayed in the GUI status of the half-skin display (Step 5405). When the reproducing screen is displayed, a traveling operation corresponding to that button is executed (Step 5406).

When judged that the keyboard 3 is opened in Step 5402, it is judged whether the mini-player is activated (Step 5407). When activated, the traveling operation corresponding to that button is executed (Step 5408), and when not activated, processing of key codes of traveling operation keys in the Windows standard keyboard is handed over to the OS (Step 5409). Specifically, the OS carries out the same operation as that carried out when the normal traveling operation keys are pressed.

Figure 55:
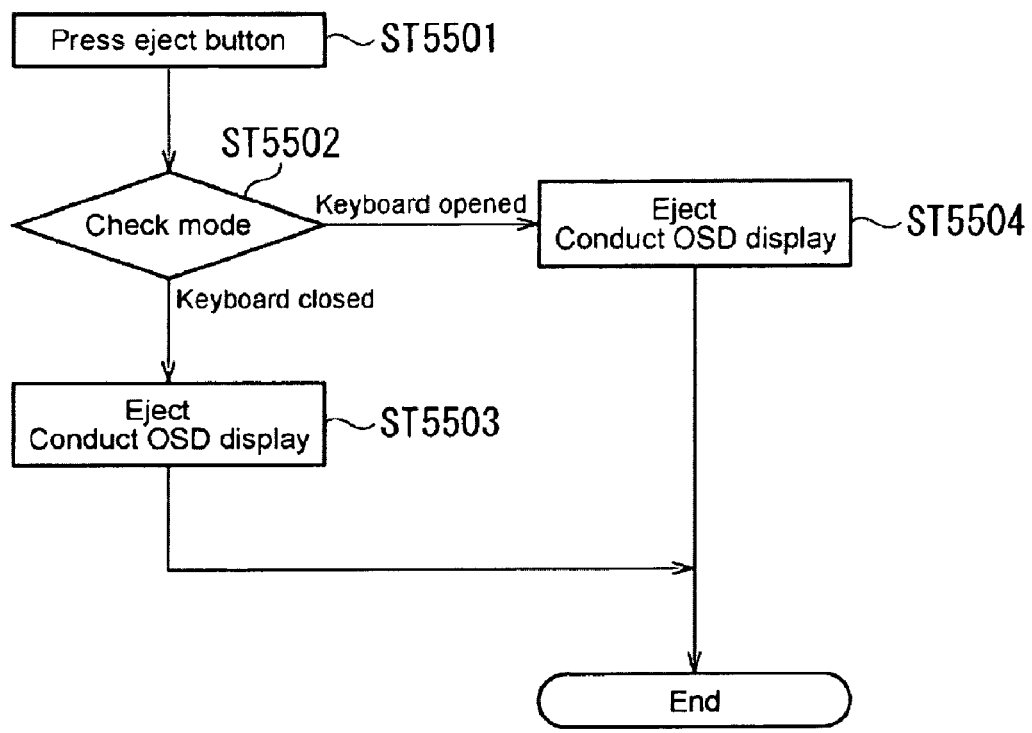
FIG. 55 is a flowchart showing an operation carried out when an eject button is pressed.

FIG. 55 is a flowchart showing an operation carried out when the clear-touch button No. 10 (eject button) is pressed.

When the eject button is pressed (Step 5501), the mode is checked first (Step 5502). In other words, whether the keyboard 3 is closed (or opened) is checked.

When judged that the keyboard 3 is closed, a disk is ejected and an icon indicating the ejection is displayed on the OSD for 3 seconds, for example (Step 5503).

Also when judged that the keyboard 3 is opened, the disk is ejected and the icon indicating the ejection is displayed on the OSD for 3 seconds, for example (Step 5504).

(Menu Screen)

Figure 56:
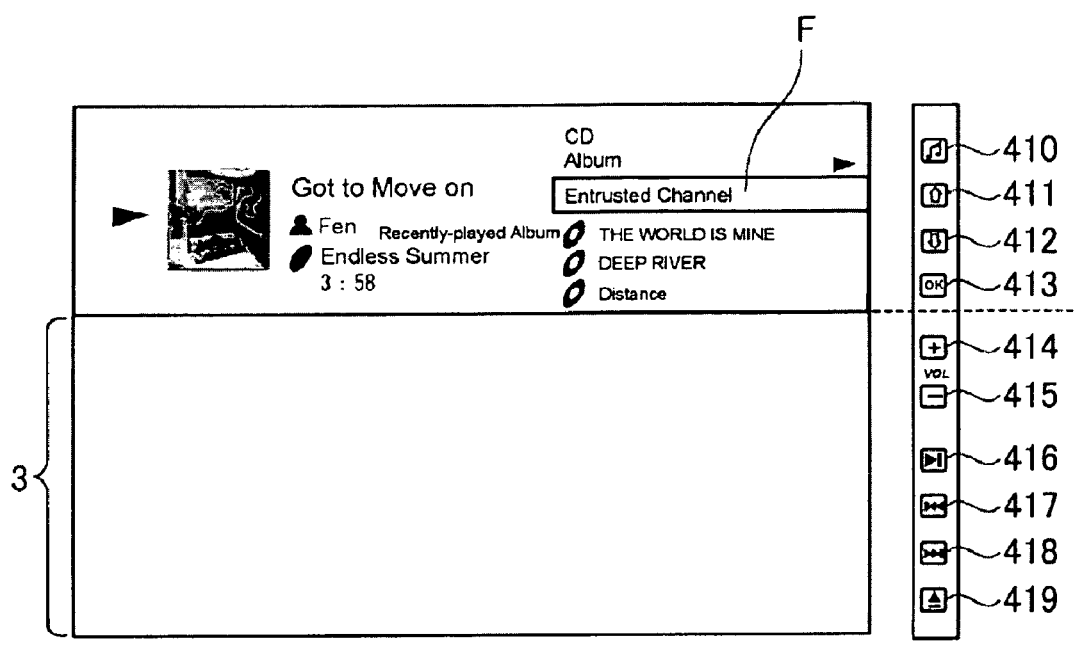
FIG. 56 is a diagram showing a menu screen.

FIG. 56 is a diagram showing the menu screen in the half-skin display.

The menu screen shown in FIG. 56 is displayed when the music button is pressed as described above.

An example of an arrangement of menu items is as follows.
(1) "CD"
(2) Album+right-pointing triangular mark
(3) Entrusted channel
(4) Recently-played album
  Recently-played album title 1 (most recently-played album title)
  Recently-played album title 2
  Recently-played album title 3

Recently-played album title 4
Recently-played album title 5
(5) Recently-added album
Recently-added album title 1 (most recently-added album title)
Recently-added album title 2
Recently-added album title 3
(6) Setting
Reproducing mode: Normal reproduction/Repeat/single-song repeat/Shuffle/Invalid Right-pointing triangular mark
Chorus reproduction: ON/OFF/Invalid
Sleep timer: OFF/Set timeRight-pointing triangular mark
Alarm: OFF/Set time Right-pointing triangular mark
Background selection: Right-pointing triangular mark
Here, a focus F (position of cursor) on the menu screen is a center focus that focuses on substantially the center. The maximum number of display items in this case is 6, and items other than that are displayed by looping.

It should be noted that when not all items can be displayed on the menu screen, a scrollbar is set to be displayed on a right-hand side thereof. Thus, the user is capable of easily grasping the number and positions of all items when the number of items is increased.

In FIG. 56, among the operation buttons 410 to 419, the operation buttons 410 to 413 necessary for operations on the menu screen are positioned so as to correspond to a half-skin display region including the displaying portion of the menu screen (refer to the section "In the case of half-skin display" in "Allocation of clear-touch buttons" above). Specifically, the operation buttons 410 to 413 necessary for operations on the menu screen are positioned at the right-hand side of the half-skin display region in FIG. 56, and the rest of the operation buttons 414 to 419 are positioned on the right-hand side of the closed keyboard 3. Thus, the user is capable of intuitively grasping the operation buttons 410 to 413 necessary for operations on the displayed menu screen, resulting in an improvement in operability.

(Method of Drawing Wirings)

Figure 57:
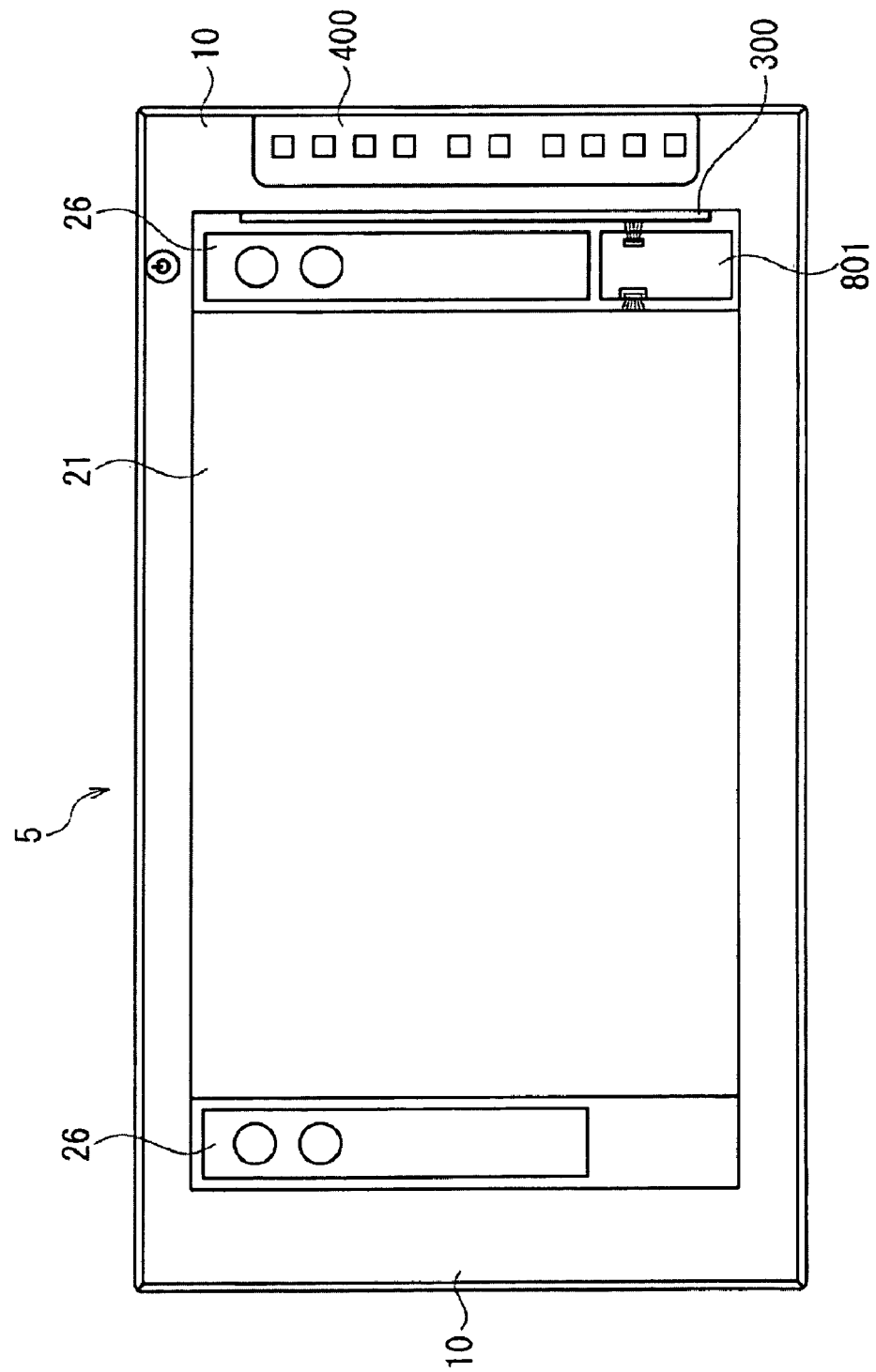
FIG. 57 is a diagram for illustrating a method of drawing wiring.

In the personal computer according to this embodiment, the function of reproducing music and the like is an extremely important function as has already been described above. Thus, the size of each of the speakers 26 is desired to be increased for improving acoustic performance thereof. FIG. 57 is a diagram for illustrating a method of drawing wirings to arrange the speakers 26 in view of the above-mentioned object.

As shown in FIG. 57, the rectangular display panel 21 is arranged at substantially the center of the base chassis 5. Gaps of about 30 to 50 mm are respectively provided between the display panel 21 and the outer circumferential section 10 of the base chassis 5 on both the left- and right-hand side of the display panel 21. The elongated speakers 26 are respectively arranged at upper sections of the gaps (regions occupying 60 to 80% of the gaps in a longitudinal direction). A USB interface substrate 801 is disposed in a remaining region at a lower section of the right-hand side speaker 26. Two USB ports (not shown), for example, are provided at the right end section of the interface substrate. The USB ports are exposed on the right-hand side surface of the base chassis 5. The wiring from the circuit board 300 connected to the touchpad electrode substrate 400 is also drawn to the USB interface substrate 801. In other words, the USB interface substrate 801 is also used as a touchpad wiring substrate in addition to the USB interface substrate. The USB interface substrate 801 is connected to the control circuit board 7 arranged on the back surface side of the display panel 21. Input signals of the touchpad are transmitted to the control circuit board 7 via the touchpad electrode substrate 400 and the USB interface substrate 801.

Because the touchpad electrode substrate 400 is arranged on the right end surface, when attempting to connect the wirings thereof directly to the control circuit board 7, the regions for arranging the respective speakers 26 are reduced, but because the wirings are connected to the control circuit board 7 via the USB interface substrate 801 in this embodiment, the regions for arranging the respective speakers 26 are increased that much, resulting in an improvement in acoustic performance.

It should be noted that the front-back/upward-downward/left- and right-hand directions in the above descriptions are merely used for convenience, and the present invention is not limited to those directions in any application thereof.

Figure 28:
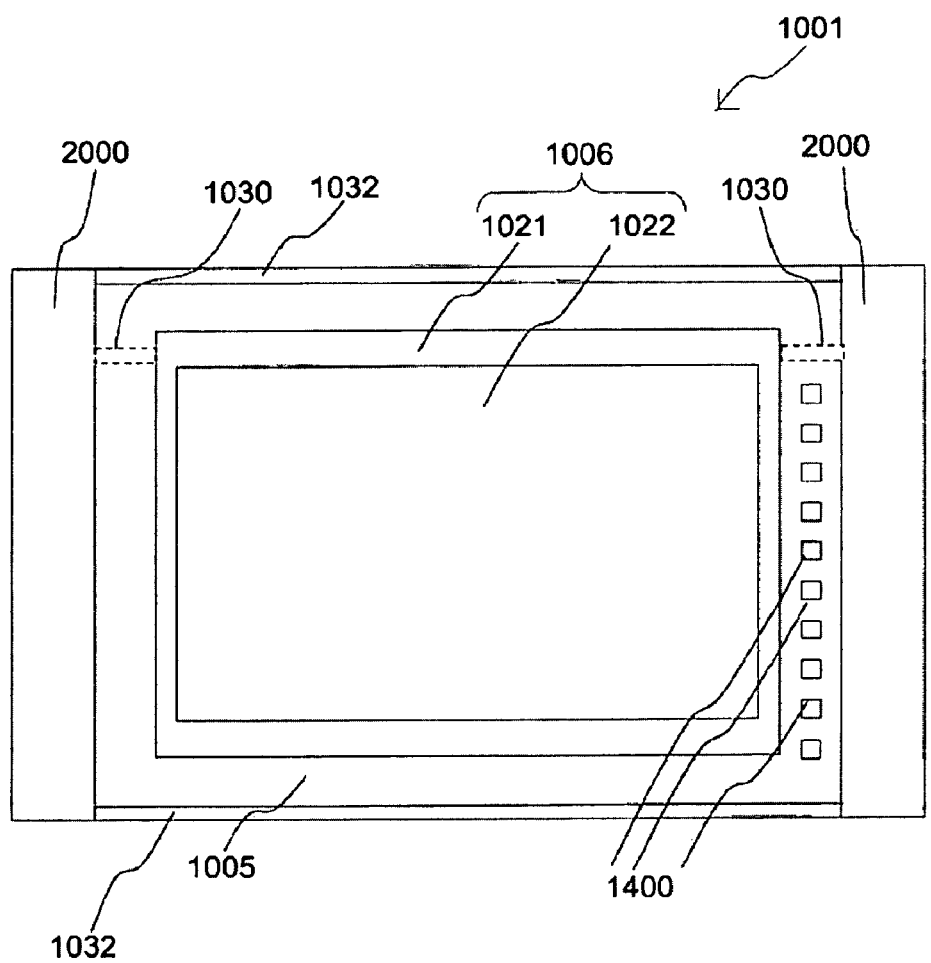
FIG. 28 is a schematic plan view showing an electronic apparatus according to another modification.

In the above embodiment, although the speakers 26 have been arranged at positions unseen from the user, a pair of speakers 2000 may be provided so as to sandwich a base chassis 1005 as in a television 1001 as the electronic apparatus shown in FIG. 28. In this case, transparency of the entire base chassis 1005 can be maintained by forming wirings 1030 for electrically connecting the apparatus main body and the respective speakers 2000 of a transparent material, and favorable design of the electronic apparatus 1001 can thus be maintained. As shown in FIG. 28, in the television 1001, the base chassis 1005 is positioned to surround a display unit 1006 including a display panel 1021 and a front panel 1022. As in the above embodiment, transparent electrodes are used for the electrodes corresponding to operation buttons 1400 in a visible region.

Configurations and structures of respective components specifically described in the above embodiment are mere examples for embodying the present invention, and a technical scope of the present invention shall thus not be interpreted as limitative.

What is claimed is:

1. An electronic apparatus, comprising:
   a display unit;
   a driving circuit configured to drive the display unit; and
   a base chassis made of a transparent material and including
      a first region that extends outward from at least one end on a circumference of the display unit, the first region provided with an operation button used for operating the driving circuit, wherein
   the operation button is composed of a transparent electrode disposed in the base chassis,
   the base chassis includes a second region that overlaps the display unit plane-wise,
   the operation button is provided in a plurality of numbers along an outer circumference of the first region of the base chassis, the plurality of operation buttons drawn to the second region by transparent first wirings, and
   the first wirings are respectively connected to corresponding second wirings arranged in the second region.

2. An electronic apparatus, comprising:
   a display unit;
   a driving circuit configured to drive the display unit; and
   a base chassis made of a transparent material and including
      a first region that extends outward from at least one end on a circumference of the display unit, the first region provided with an operation button used for operating the driving circuit, wherein
   the operation button is composed of a transparent electrode disposed in the base chassis,
   the base chassis includes a second region that overlaps the display unit plane-wise, the operation button is provided in a plurality of numbers along an outer circumference of the first region of the base chassis, the plurality of operation buttons drawn to the second region by transparent first wirings having equal lengths, the first wirings are respectively connected to corresponding second wirings arranged in the second region, each of the second wirings having higher conductivity than the first wirings, and the second wirings are aggregated at least one point in the second region.

3. The electronic apparatus according to claim 2, wherein each of the first wirings is made of indium tin oxide, and each of the second wirings is made of one of silver and copper.

4. An electronic apparatus, comprising:

a display unit;

a driving circuit configured to drive the display unit;

a base chassis made of a transparent material and including a first region that extends outward from at least one end on a circumference of the display unit, the first region provided with an operation button used for operating the driving circuit, wherein the operation button is composed of a transparent electrode disposed in the base chassis, a region outside the transparent electrode is surrounded by a transparent ground electrode, and the base chassis partially functions as a touchpad due to the transparent electrode and the ground electrode; and a retaining member made of an opaque material, which is provided to cover at least the one end on the outer circumference of the base chassis, wherein the base chassis includes a concave section, the transparent electrode and the ground electrode are arranged inside the concave section, and the ground electrode and the retaining member have portions that overlap each other plane-wise.

5. The electronic apparatus according to claim 4, further comprising:

a substrate mounted with a detecting circuit configured to detect a change in capacitance of the touchpad, the substrate disposed between the display unit and the base chassis.

6. An electronic apparatus, comprising:

a display unit;

a driving circuit configured to drive the display unit;

a base chassis made of a transparent material and including a first region that extends outward from at least one end on a circumference of the display unit, the first region provided with an operation button used for operating the driving circuit, wherein the base chassis includes guide grooves provided along the outer circumference thereof;

first to fourth retaining members each made of an opaque material and guided through the guide grooves respectively provided along an upper outer circumference of the base chassis, a left-hand side outer circumference thereof, a right-hand side outer circumference thereof, and a lower outer circumference thereof; and coupling members configured to respectively couple the first retaining member guided along the upper outer circumference with the second retaining member guided along the left-hand side outer circumference and the third retaining member guided along the right-hand side outer circumference in the vicinity of an upper left-hand corner and upper right-hand corner of the base chassis, respectively.

7. The electronic apparatus according to claim 6, wherein the fourth retaining member is screwed to the base chassis at a lower end section of the base chassis such that the second retaining member and the third retaining member are pushed upward.

8. The electronic apparatus according to claim 6, wherein coupling spaces from which the guide grooves have been removed are provided in the vicinity of the upper left-hand corner and upper right-hand corner of the base chassis, respectively.

9. The electronic apparatus according to claim 6, wherein the coupling members each have an inverse-L shape, and the coupling members are engaged at ends thereof with respective ends of the first retaining member, and the other end of each of the coupling members is engaged with one end of one of the second retaining member and the third retaining member.

10. The electronic apparatus according to claim 9, wherein each of the coupling members having the inverse-L shape is structured to have an elastic force in a vertical direction at the one end thereof, the one end having on an upper surface thereof a first convex section configured to engage with a first concave section formed on the guide grooves, and is structured to have an elastic force in at least a lateral direction at the other end thereof, the other end having on one of a left-hand side surface and a right-hand side surface thereof a second convex section configured to engage with a second concave section formed on the guide grooves.

11. The electronic apparatus according to claim 10, wherein the guide grooves each have at predetermined positions thereof third convex sections for resonance prevention.

* * * * *